United States Patent
Seed et al.

(10) Patent No.: US 11,483,086 B2
(45) Date of Patent: Oct. 25, 2022

(54) SERVICE LAYER TIME SYNCHRONIZATION

(71) Applicant: Convida Wireless, LLC, Wilmington, DE (US)

(72) Inventors: Dale N. Seed, Allentown, PA (US); Quang Ly, North Wales, PA (US); Catalina Mihaela Mladin, Hatboro, PA (US); Zhuo Chen, Claymont, DE (US); Rocco Di Girolamo, Laval (CA); William Robert Flynn, IV, Schwenksville, PA (US); Michael F. Starsinic, Newtown, PA (US)

(73) Assignee: Convida Wireless, LLC, Wilmington, DE (US)

(*) Notice: Subject to any disclaimer, the term of this patent is extended or adjusted under 35 U.S.C. 154(b) by 231 days.

(21) Appl. No.: 17/069,145

(22) Filed: Oct. 13, 2020

(65) Prior Publication Data
US 2021/0044369 A1     Feb. 11, 2021

Related U.S. Application Data

(63) Continuation of application No. 16/339,387, filed as application No. PCT/US2017/055341 on Oct. 5, 2017, now Pat. No. 10,841,032.

(60) Provisional application No. 62/404,640, filed on Oct. 5, 2016.

(51) Int. Cl.
*H04J 3/06*     (2006.01)
*H04W 4/70*     (2018.01)
*H04L 69/28*     (2022.01)
*H04L 69/321*     (2022.01)
*H04W 56/00*     (2009.01)

(52) U.S. Cl.
CPC ............ *H04J 3/0658* (2013.01); *H04L 69/28* (2013.01); *H04L 69/321* (2013.01); *H04W 4/70* (2018.02); *H04W 56/001* (2013.01)

(58) Field of Classification Search
None
See application file for complete search history.

(56) References Cited

U.S. PATENT DOCUMENTS

| | | | |
|---|---|---|---|
| 7,577,169 B1 | 8/2009 | Dinh et al. | |
| 2006/0083265 A1* | 4/2006 | Jordan | H04J 3/0682 370/410 |
| 2012/0263195 A1* | 10/2012 | Li | G04G 7/02 370/510 |
| 2014/0095918 A1* | 4/2014 | Stahl | G06F 21/725 713/500 |

FOREIGN PATENT DOCUMENTS

WO     2015/013559 A1     1/2015

OTHER PUBLICATIONS

Ganeriwal, et al., "Estimating Clock Uncertainty for Efficient Duty-Cycling in Sensor Networks", IEEE/ACM Transactions on Networking, vol. 17, No. 3, Jun. 2009, 14 pages.

(Continued)

*Primary Examiner* — Anh Ngoc M Nguyen
(74) *Attorney, Agent, or Firm* — BakerHostetler

(57) ABSTRACT

Methods and systems may be used to synchronize time across multiple IoT related entities, such as a network of resource constrained sensor and actuator type devices, IoT gateways, IoT cloud services, or IoT applications.

18 Claims, 35 Drawing Sheets

(56) References Cited

OTHER PUBLICATIONS

Ganeriwal, et al., "Timing-sync Protocol for Sensor Networks", Proceedings of the 1st. International Conference on Embedded Networked Sensor Systems, Nov. 2003, 12 pages.
NICT "Proposal for Updates in Clause 7 in D2.1", International Telecommunication Union, Focus Group on Machine-to-Machine Service Layer, Telecommunication Standardization Sector, Dec. 2013, 11 pages.
OneM2M Technical Specification TS-0001 V2.3.0, "Functional Architecture", Aug. 7, 2015, 352 pages.
OneM2M Technical Specification, TS-0004 V1.0.1, "Service Layer Core Protocol Specification" Jan. 30, 2015, 217 pages.
Wikipedia, "Global Positioning System (GPS), Time Overview Description", Last updated on Apr. 6, 2020, 34 pages.
Wikipedia, "Network Time Protocol", Overview Description, Last editied on Mar. 25, 2020, 14 pages.
Wikipedia, "Precision Time Protocol", Overview Description, Last updated Mar. 23, 2020, 9 pages.
Yi, et al., "Nest: Networked Smartphones for Target Localization", Consumer Communications and Networking Conference, Jan. 2012, 5 pages.

\* cited by examiner

SERVICE LAYER TIME SYNCHRONIZATION

CROSS-REFERENCE TO RELATED APPLICATIONS

This application is a continuation of U.S. patent application Ser. No. 16/339,387 filed Apr. 4, 2019 which is the National Stage Application of International Patent Application No. PCT/US2017/055341 filed Oct. 5, 2017 which claims the benefit of U.S. Provisional Patent Application No. 62/404,640, filed Oct. 5, 2016, entitled "Service Layer Time Synchronization," the contents of which are hereby incorporated by reference herein.

BACKGROUND

From a protocol stack perspective, middleware service layers are typically layered on top of existing network protocol stacks and provide value added services to client applications as well as other services. Hence, service layers are often categorized as 'middleware' service layers. For example, FIG. 1 shows a service layer located in between an IP networking stack and applications. Note another example may involve layering a service layer directly over a transport protocol such as TCP or UDP or over a non-RESTful protocol such as SOAP (not shown in FIG. 1).

An example deployment scenario of middleware service layer instances within a network is shown in FIG. 2. In this example, the service layer instances are deployed on various network nodes (gateways and servers) and are providing value-added services to network applications, device applications, and to the network nodes themselves.

An M2M/IoT service layer is an example of one type of middleware service layer specifically targeted towards providing value-added services for M2M/IoT type devices and applications. Several industry standards bodies (e.g., oneM2M, ETSI M2M, and OMA LWM2M) have been developing M2M/IoT service layers to address the challenges associated with the integration of M2M/IoT types of devices and applications into deployments such as the Internet/Web, cellular, enterprise, and home networks.

An M2M/IoT service layer may provide applications and devices access to a collection of M2M/IoT centric capabilities supported by the service layer. A few examples include security, charging, data management, device management, discovery, provisioning, and connectivity management. These capabilities are made available to applications via APIs which make use of message formats, resource structures and resource representations supported by the M2M/IoT service layer.

The oneM2M standard (oneM2M-TS-0001 oneM2M Functional Architecture—V2.8.0—incorporated by reference in its entirety) defines a Service Layer called a "Common Service Entity (CSE)". A use of the Service Layer is to provide "horizontal" services that may be utilized by different "vertical" M2M/IoT systems and applications.

A CSE supports four reference points as shown in FIG. 3. The Mca reference point interfaces with the Application Entity (AE). The Mcc reference point interfaces with another CSE within the same service provider domain and the Mcc' reference point interfaces with another CSE in a different service provider domain. The Mcn reference point interfaces with the underlying Network Service Entity (NSE). An NSE provides underlying network services to the CSEs, such as device management, location services, and device triggering.

A CSE contains multiple logical functions called "Common Service Functions (CSFs)", such as "Discovery" and "Data Management & Repository". FIG. 4 illustrates the CSFs currently defined by oneM2M Release 1.

oneM2M defines several resource attributes and request and response parameters that are time-based. The following provide a summary of these constructs.

The following is a list of time-based oneM2M resource attributes that may be expressed in absolute format (e.g., 20141003T112032): creationTime, lastModifiedTime, expirationTime, createdBefore, createdAfter, modifiedSince, unmodifiedSince, expireBefore, expireAfter, startTime, completeTime, eventStart, eventEnd, and dynamicAuthorizationLifetime.

The following is a list of time-based oneM2M request/response parameters that may be expressed in absolute format (e.g., 20141003T112032): originatingTimestamp, requestExpirationTimestamp, resultExpirationTimestamp, operationExecutionTime, resultPersistence, createdBefore, createdAfter, modifiedSince, unmodifiedSince, expireBefore, and expireAfter.

There are multiple existing time synchronization technologies, such as NTP, GPS, PTP, and UTC, but they may not be ideal for certain implementations of an M2M environment. Below are additional details with regard to the existing time synchronization technologies.

The Network Time Protocol (NTP) is a networking protocol for clock synchronization between computer systems over IP-based networks. NTP is used to synchronize network nodes to within a few milliseconds of Coordinated Universal Time (UTC). NTP may maintain time to within tens of milliseconds over the public Internet. The protocol is a client-server model that sends and receives timestamps over top of the User Datagram Protocol (UDP). As shown in FIG. 5, NTP works in a hierarchical layered system of time sources. NTP works in unicast, multicast or broadcast modes. In unicast mode, a NTP client sends a time request to an NTP server. In multicast mode, a NTP client sends time requests and listens for NTP responses from NTP servers. In broadcast mode, NTP servers broadcast periodic time updates. NTP encourages the use of NTP message authentication to prevent threats such as denial of service attacks on NTP servers. NTP clients must not use NTP polling intervals less than 15 seconds.

While many networked devices derive their time using protocols such as NTP and PTP, some devices having GPS receivers may use GPS time. GPS time relies on the atomic clocks hosted on satellites. The difference is that GPS time is not corrected to match the rotation of the Earth, so it does not contain leap seconds or other corrections that are periodically added to UTC based atomic clocks hosted on earth. In addition, GPS based time synchronization is not well suited for indoor applications due to the inability for GPS signaling to penetrate buildings and structures.

The Precision Time Protocol (PTP) is used to synchronize clocks throughout a computer network. On a local area network, it achieves clock accuracy in the sub-microsecond range, making it suitable for measurement and control systems. PTP was originally defined in the IEEE 1588-2002 standard, officially entitled "Standard for a Precision Clock Synchronization Protocol for Networked Measurement and Control Systems" and published in 2002. In 2008, IEEE 1588-2008 was released as a revised standard; also known as PTP Version 2, and it improves accuracy, precision and robustness but is not backward compatible with the original 2002 version. PTP is designed to fill a niche not well served by either of the two dominant time synchronization protocols, NTP and GPS. IEEE 1588 is designed for local systems requiring accuracies beyond those attainable using NTP. It is also designed for applications that cannot bear the cost of a GPS receiver at each node, or for which GPS signals are inaccessible.

UTC divides time into days, hours, minutes and seconds. Each day contains 24 hours and each hour contains 60 minutes. The number of seconds in a minute is usually 60, but with an occasional leap second, it may be 61 or 59 instead. Decisions to introduce a leap second are announced at least six months in advance by the International Earth Rotation and Reference Systems Service. The leap seconds cannot be predicted far in advance due to the unpredictable rate of rotation of the Earth.

The format for expressing UTC time is specified in ISO 8601 which uses a format of YYYY-MM-DDThh:mm:ss.sTZD where, the following is a description of the individual fields.

YYYY—four-digit year
MM—two-digit month (01=January, etc.)
DD—two-digit day of month (01 through 31)
hh—two digits of hour (00 through 23) (am/pm NOT allowed)
mm—two digits of minute (00 through 59)
ss—two digits of second (00 through 59)
s—one or more digits representing a decimal fraction of a second
TZD—time zone designator (Z or +hh:mm or –hh:mm)
For example, 1997-07-16T19:20:30.45+01:00.

SUMMARY

Disclosed are several time synchronization mechanisms and procedures that may be realized as capabilities of an internet of things service layer (IoT SL). These mechanisms and procedures may be used to synchronize time across multiple IoT related entities, such as a network of resource constrained sensor and actuator type devices, IoT gateways, IoT cloud services, or IoT applications. As a result, end-to-end time synchronization between IoT endpoint devices and IoT applications communicating to these devices through IoT cloud services and IoT gateways may be achieved. This disclosure defines the following SL mechanisms and procedures to support end-to-end time synchronization of time across IoT network deployments. These disclosed mechanisms may be used together or independently.

A first exemplary mechanism may include customizable SL beaconing. SL may be configured to send SL beacons in a RESTful manner and at specified frequencies (e.g., every 5 minutes) or under certain conditions (e.g., certain synchronization offset has been exceeded) based on the preferences of its individual registrants. SL beacons may contain information such as the local time of the SL along with communication scheduling information for a SL registrant. Offset, synchronization offset, and time synchronization offset are generally used interchangeably herein.

A second exemplary mechanism is SL time advertising. A SL may support an attribute or resource that it makes accessible to its registrants such that they may retrieve or subscribe to the SL in a RESTful manner and receive updates of the SL's local time at a specified frequency or under certain specified conditions. Similarly SL registrants themselves may advertise their local time to a SL such that the SL is aware of it.

A third exemplary mechanism may include SL time compensation. A SL may detect when there is an offset in time between its own local time reference and the local time of one of its registrants and then compensate for this offset by adjusting time-based SL metadata exchanged between itself and a registrant. For example, adjust time-based SL request parameters and adjust time-based fields contained within application data.

A fourth mechanism may include SL based network latency determination. A SL may determine the network transmission latency of a SL message that flows between the SL and a SL registrant. This latency may be taken into account when determining the offset between the local time of the SL and a SL registrant. This procedure is based on the use of a SL ping mechanism.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EXAMPLES

Figure 1:
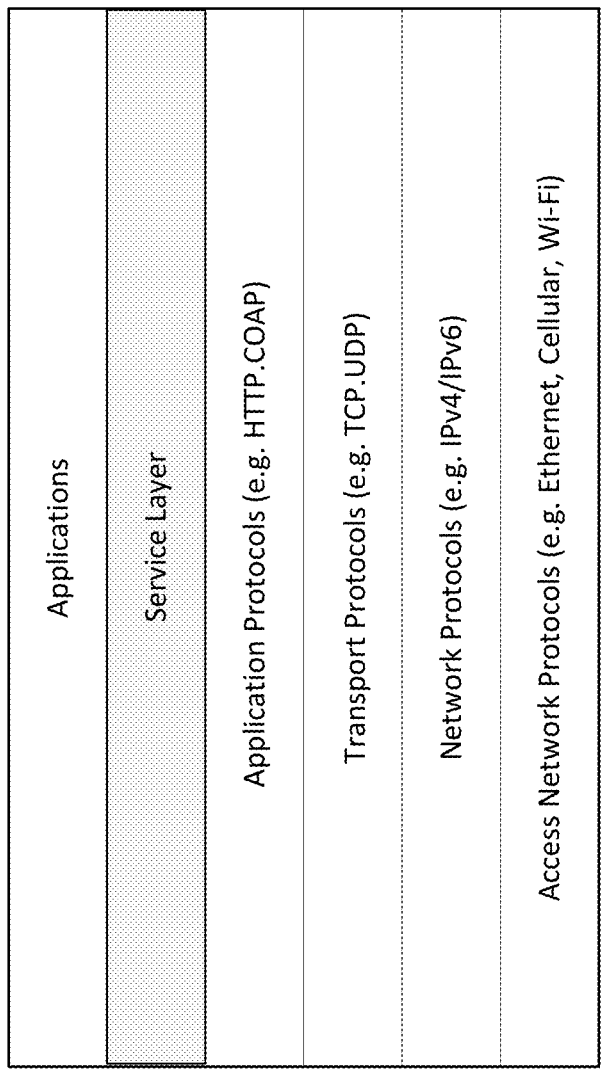
FIG. 1 illustrates a protocol stack supporting a middleware service layer.
Figure 2:
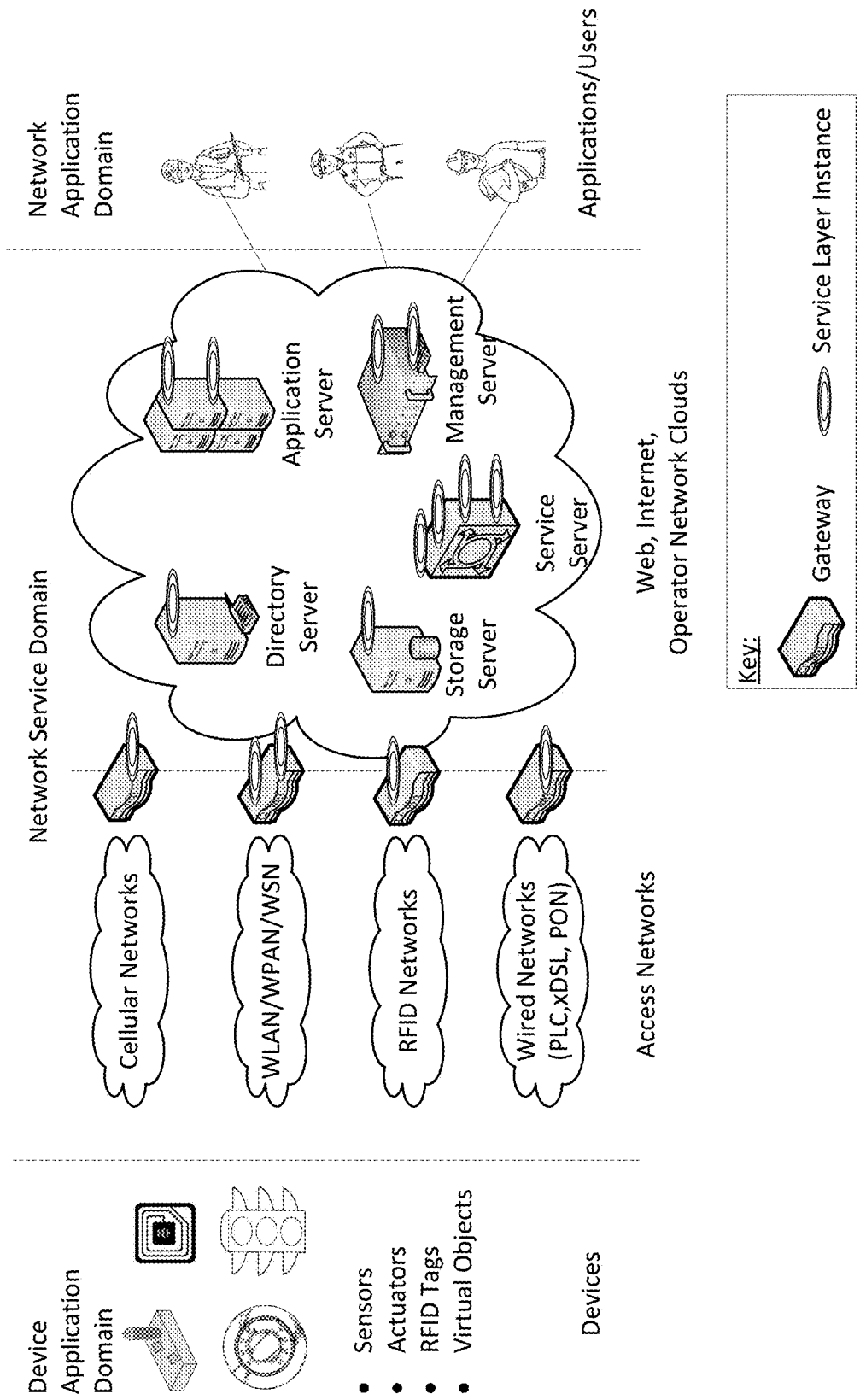
FIG. 2 illustrates middleware service layer deployment within a network.
Figure 3:
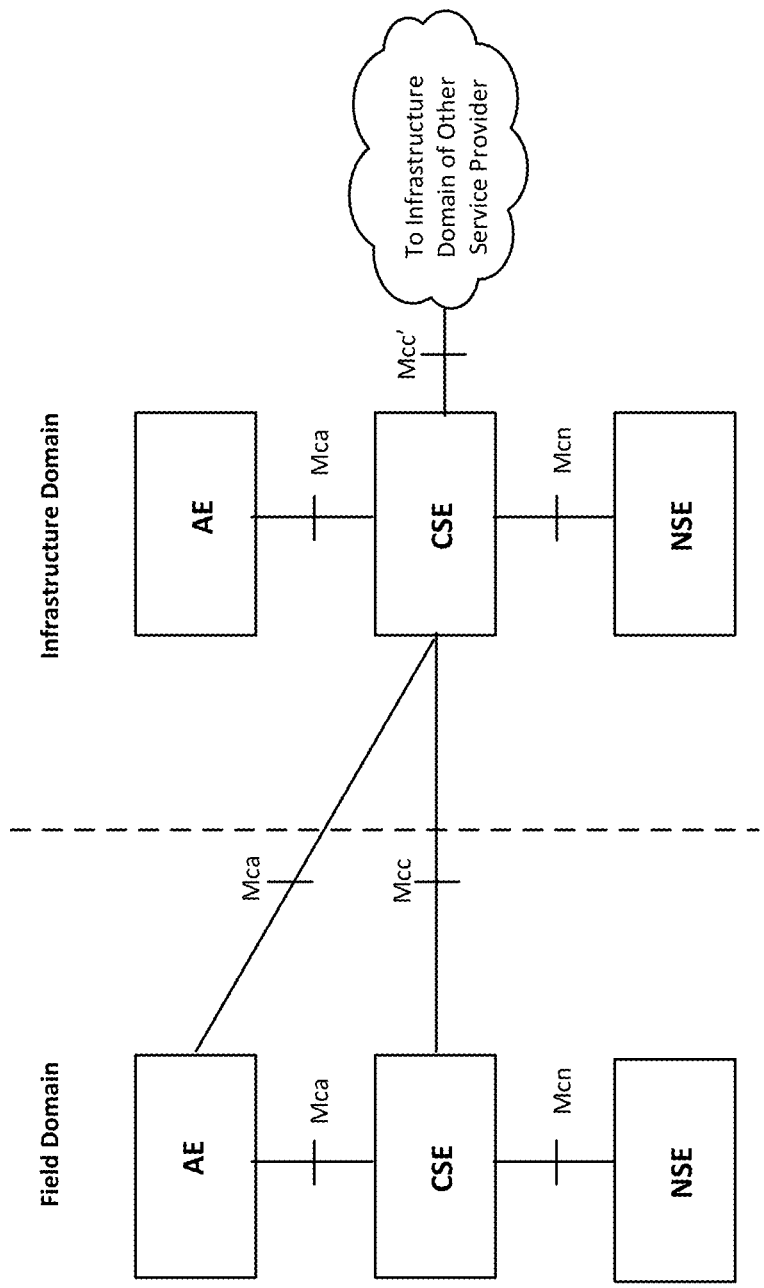
FIG. 3 illustrates oneM2M Architecture.
Figure 4:
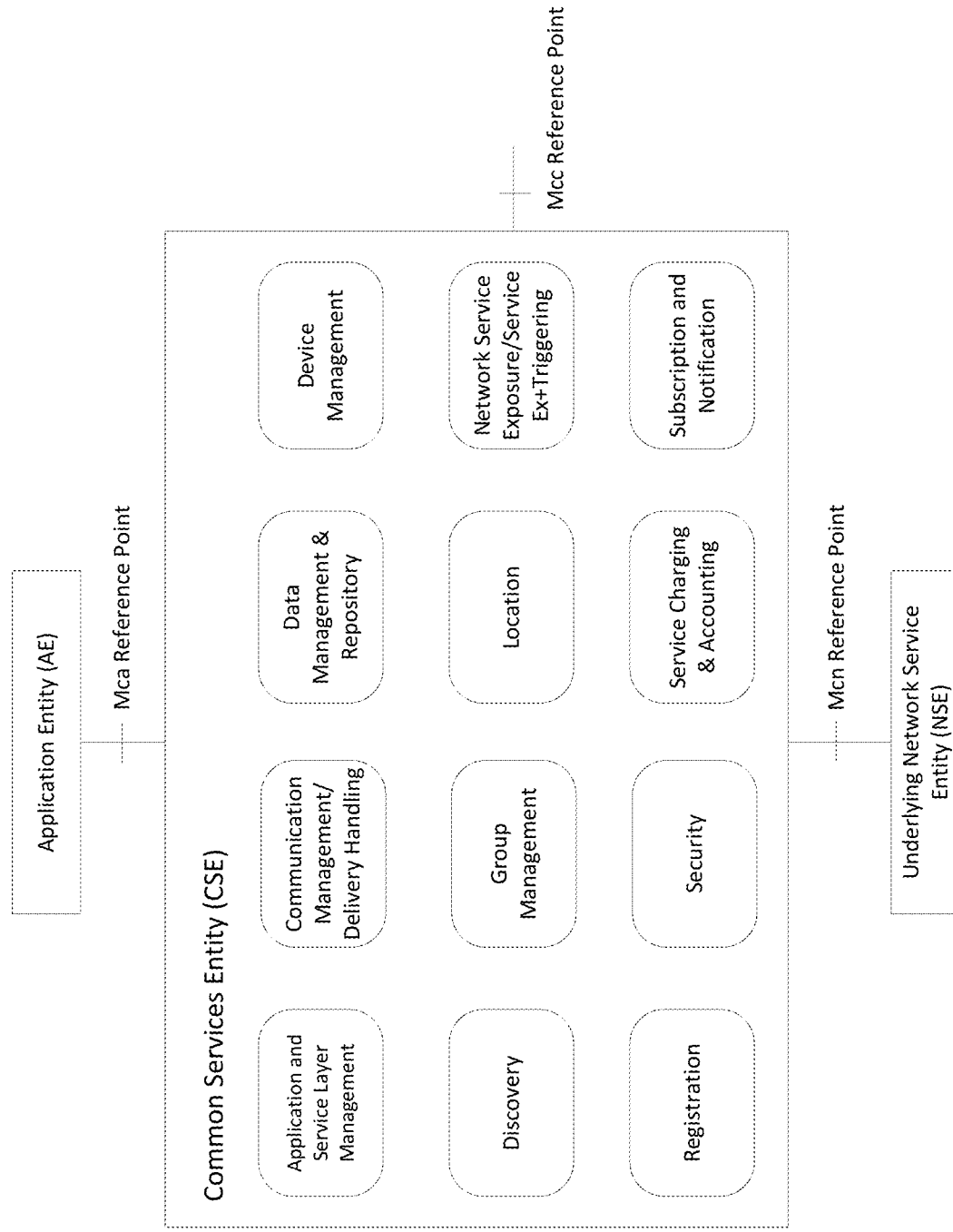
FIG. 4 illustrates oneM2M Common Service Functions.
Figure 5:
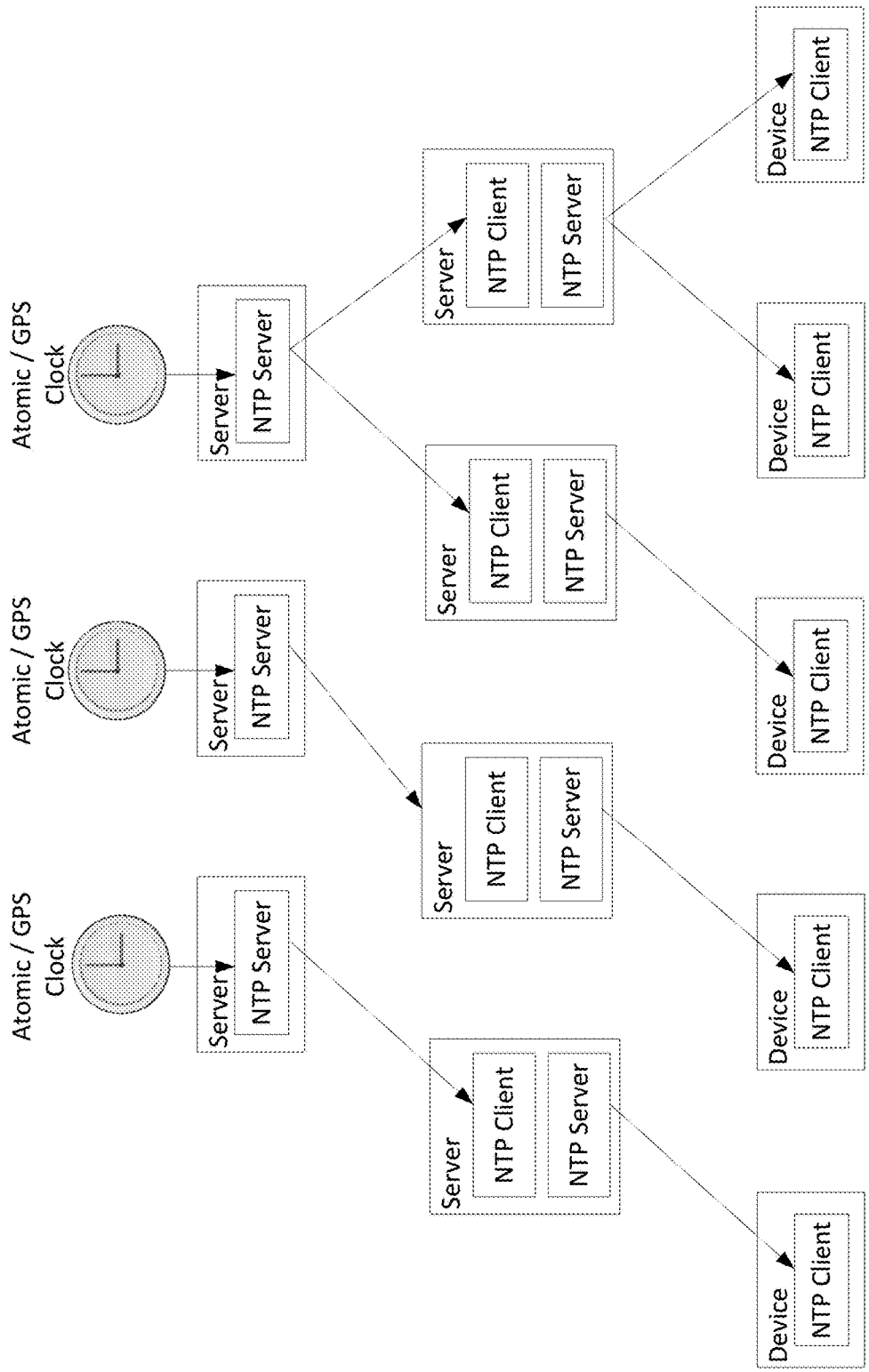
FIG. 5 illustrates NTP Hierarchical Layered System of Time Sources.
Figure 6:
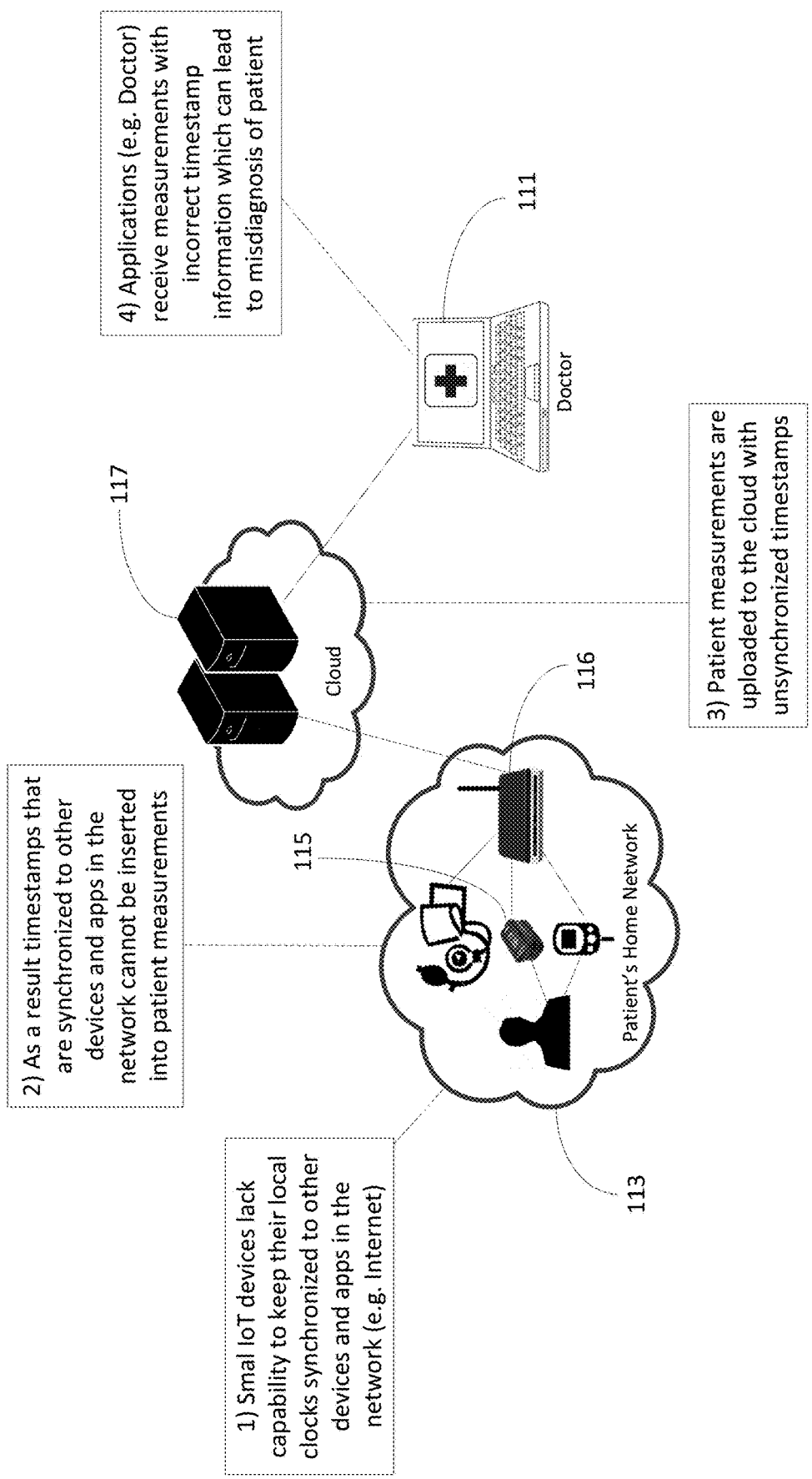
FIG. 6 illustrates Freshness-based Content Retrieval Procedure.

Discussed herein are several time synchronization mechanisms and procedures that may be realized as capabilities of an IoT Service Layer. These mechanisms and procedures may be used to synchronize time across multiple IoT related entities. Discussed below is an exemplary use case that may give additional perspective with regard to time synchronization. As shown in FIG. 6, via a web-based application 111, a doctor is remotely monitoring health measurements (e.g., blood insulin, blood pressure, pulse oxygen, and heart rate) of several of his patients that have portable medical devices (e.g., medical device 115). Medical device 115 may be connected to the patient's home network 113 and be a relatively resource constrained device. These measurements may be collected by small portable medical devices (e.g., medical device 115) that patients wear on their bodies or that they regularly attach to their bodies. Each measurement that is taken is timestamped by the medical device 115. The timestamp may use UTC absolute format (e.g., 20161003T112032) and be based on the local time reference of medical device 115. Patients may upload measurements for their doctor, by connecting medical device 115 to their home gateway 116. Home gateway 116 may connect to a cloud-based health service platform 117 that collects health measurements from the various patient gateways and their connected devices. Web-based application 111 allows the doctor to access the cloud-based health service platform 117 to retrieve health measurements associated with his patient's devices (e.g., medical device 115).

With continued reference to FIG. 6, in this situation, due to the resource constrained nature of medical device 115, it does not support time synchronization protocols such as NTP, PTP, or GPS. Hence its local clock is not synchronized to the time used by other nodes in the system (e.g., gateway 116, cloud servers, or application 111). As a result, when medical device 115 is used to take data measurements, the timestamps that are inserted into these measurements by medical device 115 is based on its local unsynchronized clock. In addition, it is not uncommon for patients to store and buffer several measurements onto medical device 115 or other devices throughout the busy day or week before connecting medical device 115 to its gateway 116 to be uploaded to cloud-based health service platform 117 for the doctor to access the measurements via we-based application 111. The aforementioned situation limits the ability of gateway 116 to compensate and adjust timestamps inserted by medical device 115, even when the local time of gateway 116 is synchronized to the rest of the system.

This use case illustrates multiple time synchronization related challenges in IoT networks. One challenge involves synchronizing the time references across multiple entities (devices, gateways, servers, or applications) in the network such that they share a common time reference. Another challenge is synchronizing the time stamping of the data which is produced and hosted by these entities. Note the current oneM2M architecture is based on the notion that CSEs and AEs are time synchronized with respect to one another. This synchronization is preferred since oneM2M defines several attributes and parameters which are time based and exchanged between different CSEs and AEs. However, mechanisms to provide this synchronization have yet to be considered.

Many IoT deployments lack support for end-to-end time synchronization of both devices as well as data in networks consisting of resource constrained sensor and actuator type devices, IoT gateways, IoT cloud services and applications. Due to their resource constrained nature, many IoT devices, as well as networks they reside, in lack support for a reference time or clock that may be efficiently and effectively propagated and synchronized to all the entities, in an end-to-end manner across IoT network deployments. As a result, maintaining synchronization of the local clocks on these entities with an adequate level of precision that satisfies even general use case synchronization requirement may prove to be challenging. This leads to a situation where a lack of time synchronization between IoT devices and other entities (gateways, services, or applications) is a problem in IoT deployments. Although, there are existing time synchronization mechanisms such as NTP, PTP, and GPS, these solutions may not be available or best-suited for all types of IoT deployments. For example, many resource constrained sensor and actuator type devices do not support an NTP client and lack awareness and connectivity to NTP servers. Support for NTP on resource constrained IoT devices may add overhead such as a separate set of credentials and a separate DTLS session that may need to be established and maintained between the NTP client and NTP server.

Without adequate time synchronization at the device level, applications hosted on different devices may be unable to maintain synchronization with applications hosted on other devices in the network. This lack of synchronization may prevent applications from properly interacting with one another for situations where synchronization is preferred. For example, in some situations the applications communicate with one another based off of a schedule. A lack of synchronization between the applications may result in one application not sending a message to another application in the proper scheduled time window or waking up at the proper time in order to receive a message.

A lack of time synchronization may also prevent applications from effectively timestamping data (e.g., sensor measurements) which they share with other applications. If applications are not synchronized with one another and one application timestamps data that is shared with another application, the application accessing the data may not be able properly interpret the timestamp due to its local time reference being out of sync with the time reference of the application that originated the data. This may have serious implications for many use cases. For example, if a doctor thinks he is looking at a health sensor measurement (e.g., a blood pressure reading) for one of his patient's having a timestamp with a value that says it is 5 minutes old, but in reality the measurement is 5 days old, then this may prevent the doctor from providing proper care to the patient.

Deployment of network-based IoT service platforms may assist lighter weight IoT devices and applications. For example, IoT service platforms provide data storage services, event detection, access control, discovery, charging, or device management. However these IoT services platforms lack functionality to provide IoT devices with lightweight time synchronization capabilities for synchronizing their local time with the rest of the entities in an IoT network deployment. To make matters worse, these IoT services platforms may have a pre-requisite that the light weight IoT devices and applications must support some other means to ensure their time remains synchronized with the rest of the network such that they properly interface to the IoT service platform.

Figure 7:
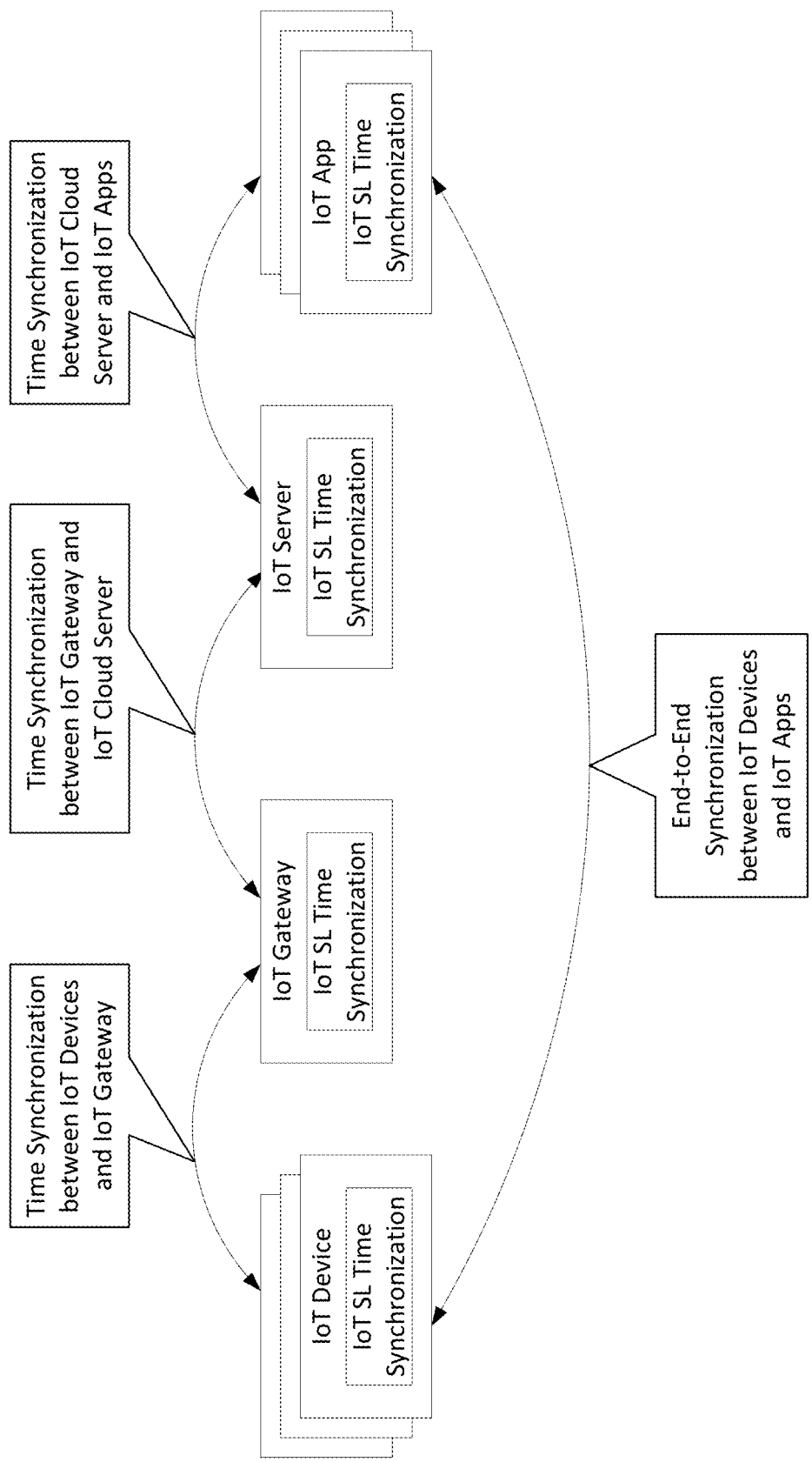
FIG. 7 illustrates End-to-End Time Synchronization in an IoT Network.

Disclosed are several time synchronization mechanisms and procedures that may be realized as capabilities of an IoT Service Layer. These mechanisms and procedures may be used to synchronize time across multiple IoT related entities, such as a network of resource constrained sensor and actuator type devices, IoT gateways, IoT cloud services and IoT applications as shown in FIG. 7. As a result, end-to-end time synchronization between IoT endpoint devices and IoT applications communicating to these devices through IoT cloud services and IoT gateways may be achieved. Disclosed herein are SL mechanisms to support synchronization of time across IoT network deployments which may be used together or independently. The mechanisms include: 1) customizable SL beaconing; 2) SL time advertising; 3) SL time compensation; and 4) SL based network latency determination, among others.

It is understood that the entities performing the steps illustrated herein, such as FIG. 8-FIG. 34, may be logical entities. The steps may be stored in a memory of, and executing on a processor of, a device, server, or computer system such as those illustrated in FIG. 36C or FIG. 36D. In an example, with further detail below with regard to the interaction of M2M devices, SL registrant 122 of FIG. 17 or registrant 231 of FIG. 29 may reside on M2M terminal device 18 of FIG. 36A, while registrar 232 of FIG. 29 or SL 121 of FIG. 17 may reside on M2M gateway device 14 of FIG. 36A.

Figure 8:
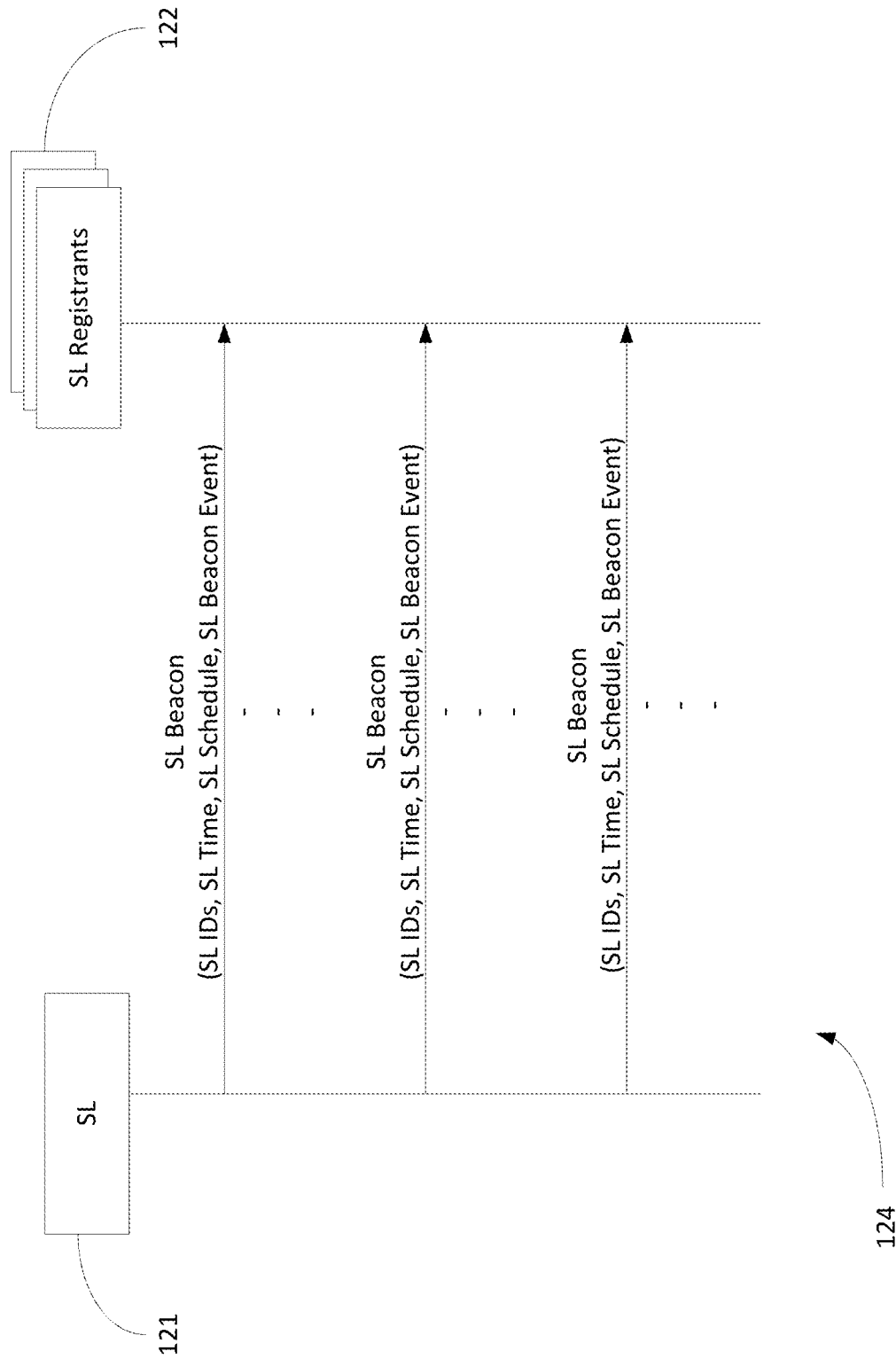
FIG. 8 illustrates SL beaconing.
Figure 9:
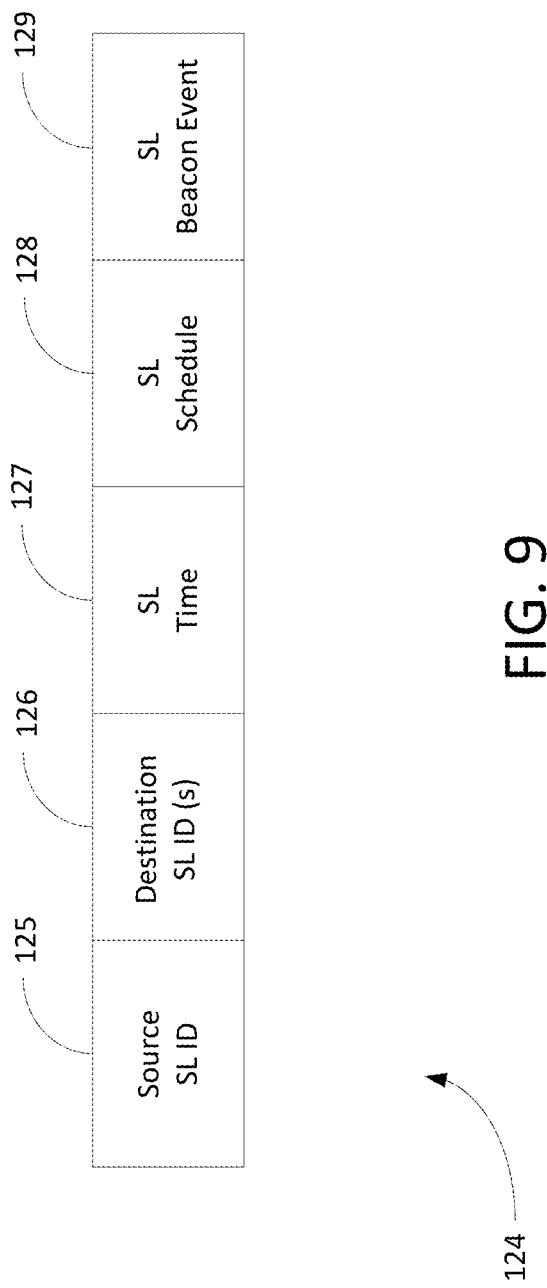
FIG. 9 illustrates SL beacon Format.

Disclosed below is customizable SL beaconing. As shown in FIG. 8, SL 121 may be configured to send SL beacons 124 to one or more of its SL registrants 122. SL 121 may be configured by one or more of its registrant (e.g., SL registrant 122) to send SL beacon messages to themselves or to other SL registrants in the network that the registrants wish to communicate with in a time synchronized manner. SL 121 may send beacons at customized frequencies (e.g., every 5 minutes) or in response to customized conditions or events (e.g., a certain synchronization offset has been exceeded) to one or more of its SL registrants 122. These customizations may be specified by one or more SL registrants 122. FIG. 9 illustrates an exemplary SL beacon format. As discussed in more detail below, SL beacon 124 may include informational elements, such as source SL ID information 125, destination SL ID 126, SL time 127, SL schedule 128 (also known herein as SL communication schedule), or SL beacon event 129. SL registrant 122 may use information from beacon 124 to program sleep and low power schedules. Table 1 provides more details with regard to SL beacon informational elements.

TABLE 1

| SL beacon Informational Elements | |
|---|---|
| Attributes | Description |
| Source SL ID | Identifier of the SL issuing SL beacon |
| Destination SL ID(s) | Identifier of one or more targets of the SL beacon. SL beacons may be sent to one or more specific SL registrants, a group of SL registrants, or may be multi-casted or broadcasted with a network of SL registrants. |
| SL Time | Local time value of the SL that issued SL beacon. This local time is captured when the SL issues SL beacon. |
| SL Communication Schedule | Indicates when a given SL registrant is permitted to send SL requests to the SL. This element may consist of information such as SL identifiers and designated times when SL communication is scheduled and permitted to occur. This schedule may also be used by a registrant to determine when it may enter a low power sleep state and hence not send or receive SL requests. The SL identifier component may be expressed in the format of an individual SL registrant identifier such as application or device identifier. A SL group identifier may also be indicated. An identifier that uses a wildcard may be used to specify multiple SL registrants (e.g., AE* or *). The time component may include information such as specific times, time ranges or time slots in which specified SL registrants are permitted to issue SL requests to the SL or enter a low power sleep state. Alternatively, it may also include specific times, time ranges, or time slots in which SL registrants are permitted to issue SL requests that target other specified SL registrants or group of registrants. The time component may be made to coincide with a sleep, or low power mode of the SL or the SL registrant. |
| SL beacon Event | Event which triggers the issuing of the SL beacon. Some types of events may include: Periodic Event - Beacon is sent as a result of a periodic event (e.g., beacon interval) Loss of Synchronization - Beacon is sent as a result of detection in a loss of synchronization exceeding a defined threshold and between the SL issuing SL beacon and one or more SL registrants. |
| Not Cacheable Flag | In order to avoid the situation where a registrant receives an out of date beacon. This message may include a flag to indicate that it is not cacheable. Caching services may use this flag as an indication that the message should be discarded if the SL registrant is not available (e.g., awake) to receive it. |
| Number of Hops | Specifies the number of SL hops beacon is allowed to propagate from the SL that originates SL beacon. This may be used to keep beacons localized within a certain domain or from flooding the network with beacons. This field may be decremented by an intermediate SL when it forwards SL beacon. For example, when receiving a SL beacon with number of hops equal to zero, SL beacon shall not be forwarded. |

SL 121 may send SL beacons 124 to its SL registrants 122 to synchronize their local times to its own local time. When receiving a SL beacon 124, SL registrant 122 may extract a SL Time component that may include the local time of SL 121 that issued SL beacon 124. This time may be compared against the local time of SL registrant 122 and an offset may be determined. This offset may then be used by SL registrant 122 to synchronize its local time to the local time of SL 121 that issued SL beacon 124. This may be achieved by adding or subtracting the determined offset from the local time of SL registrant 122 depending on whether the local time of SL 121 leads or lags the local time of SL registrant 122. If it leads SL registrant 122, the offset may be added. If it lags SL registrant 122, the offset may be subtracted. Depending on the synchronization precision that is preferred between SL registrant 122 and SL 121 that issued SL beacon, SL registrant 122 may take the network transmission time of the SL beacon 124 into account when determining the offset. One such exemplary method is captured with the discussion of latency determining and tracking disclosed herein.

After SL registrant 122 synchronizes its local time to the local time of SL 121 issuing SL beacon 124, SL registrant 122 may reply after receiving the SL beacon 124 by sending a message to SL 121 indicating that its local time has been adjusted and by how much the time has been adjusted. SL 121 may use the size of the adjustment to determine if the interval between beacons should be increased or decreased. For example, a large adjustment may be an indication that the clock of SL registrant 122 is inaccurate and drifts quickly, thus a smaller beacon interval may be beneficial. A small adjustment may be an indication that the clock of SL registrant 122 is accurate and does not drift too quickly, thus a larger beacon interval may be acceptable. The received SL beacon 124 may also include a value that represents the accuracy of the clock of SL registrant 122. For example, the message may include an indication that the clock of SL registrant 122 had an accuracy of 20 PPM.

SL 121 may also send SL beacons 124 to its registrants to schedule when each of the SL registrants 122 initiates SL requests. In doing so, SL 121 may coordinate the communication patterns of its SL registrants 122. These patterns may be made to coincide with SL 121 or SL registrant 122's sleep or low power modes of operation. When receiving SL beacon 124, SL registrant 122 may extract a SL Schedule 128 element that may contain a communication schedule specifying when a specified SL registrant 122 is permitted to send requests to SL 121. Using this information, SL registrant 122 may schedule when it initiates SL requests. By examining the SL Schedule 128 element, SL registrant 122 may detect whether or not its own SL identifier (or a wildcard) is included and therefore whether it is allowed to communicate with SL 121. If allowed, SL registrant 122 may next check if a schedule component is included by SL 121 and if so when the schedule allows SL registrant 122 to communicate with SL 121. SL registrant 122 may also check whether the SL Schedule 128 element includes schedule information for other SL registrants that may be targeted by SL registrant 122. If present, SL registrant 122 may then use this schedule information to schedule when it initiates requests to other SL registrants via SL requests.

Figure 10:
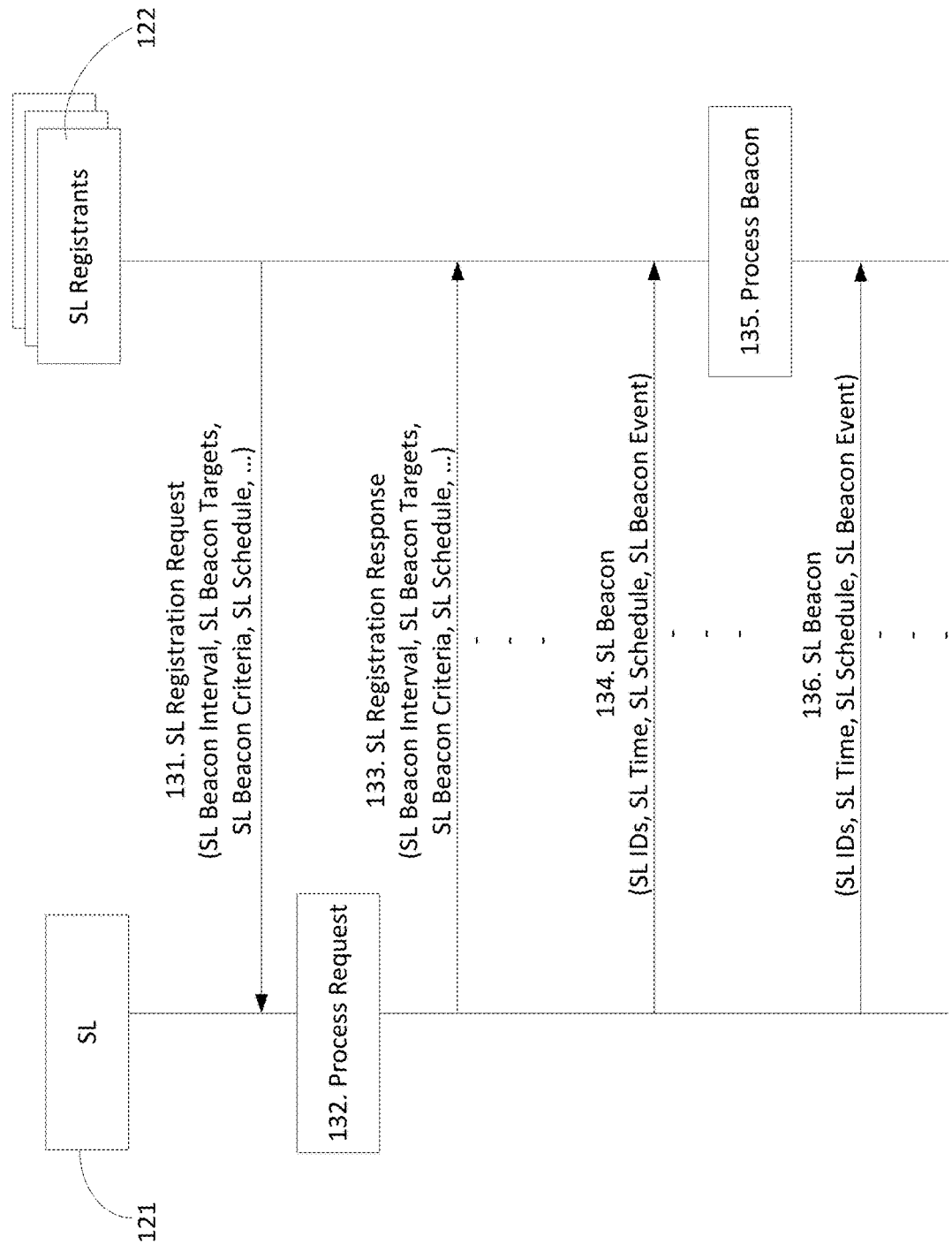
FIG. 10 illustrates SL beacon Configuration during SL Registration.

Discussed below is SL beaconing during SL registration. One disclosed method for configuring SL 121 to send SL beacons 124 to SL registrant 122 is to allow SL registrant 122 to configure SL 121 for beaconing when it registers to SL 121. Different SL registrants may configure SL 121 to send different beacons at different times and frequencies based off of the SL registrant 122's time synchronization and communication scheduling preferences. As shown in FIG. 10, SL registrant 122 may specify SL beacon 124 configuration information to SL 121 as part of a registration request it sends to SL 121.

This SL beacon 124 configuration may include one or more of the disclosed informational elements shown in Table 2. SL 121 may also use this information to determine the preferred communication scheduling times requested by SL registrant 122. SL 121 may then choose to accept the requested information or override it with settings that it deems more appropriate (e.g., based off of system policies). In response, SL 121 may return the accepted and agreed upon SL beacon 124 configuration information which it may have modified with respect to the information in the original request (e.g., may reduce SL beacon interval to a value that it deems more acceptable). If the modified beacon configuration is not suitable to SL registrant 122, SL registrant 121 may take corrective action such as attempting to register to another SL. SL 121 may then use this information to determine if and when to send beacons to SL registrant 122 that comply with the time synchronization preferences of SL registrant 122. SL 121 may then customize and send SL beacons 124 to SL registrant 122 that meet these preferences. Upon receiving SL beacon 124, SL registrant 122 may process it in a similar manner as defined previously. Although not shown in FIG. 10, SL 121 may also send beacons to other SL registrants that have been configured within the list of SL beacon Targets.

TABLE 2

SL Registration Request Beaconing Configuration Parameters

| Attributes | Description |
|---|---|
| SL beacon Interval | Requested frequency for SL to send SL beacons. For example, this may be specified in terms of time based on a defined unit such as milliseconds. Values such as 1 or 10 or 100 would equate to 1 msec, 10 msec, or 100 msec. |
| SL beacon Targets | Requested targets for SL to send SL beacons to. For example, this may be specified as a list of SL identifiers such as SL applications identifiers (e.g., App123). If two registrants are pre-provisioned to communicate with one another (e.g., door lock actuator and door lock application), then one of the registrants may act as the master and configure beacons to be sent to the other registrant such that both receive the same beacon configuration and remain synchronized with one another. |
| SL beacon Criteria | Requested criteria for SL to generate and issue beacons. For example: Periodic - Beacon is being sent as a result of a periodic event Loss of Synchronization - Beacon is sent as a result of detecting a loss of synchronization exceeding a defined threshold and between the SL issuing SL beacon and one or more SL registrants. |
| SL Communication Schedule | Requested communication schedule specifying when SL registrant would like to send (requested times to send) requests to SL. For example, this may be specified in terms of frequency based on a defined unit such as milliseconds. Values such as 1, 10, or 100 would equate to communicating every 1 msec, 10 msec, or 100 msec. Alternatively this may be specified in terms of a slotted time offset schedule based on the reception of the SL beacon. For example, registrant may communicate to SL 100 msec following the reception of the SL beacon. |
| Desired Accuracy | The amount of acceptable difference between the SL and SL registrant clocks. For example, this may be specified in terms of an offset (e.g., 100 usecs) or in terms of a PPM (e.g., 300 PPM) |
| Registrant's Time Precision | The accuracy precision of the SL registrant's clock (e.g., 20 PPM). |

FIG. 10 illustrates an exemplary method for SL beacon Configuration during SL Registration. Discussed below are exemplary steps associated with FIG. 10. At step 131, one or more SL registrants 122 issue a registration request to SL 122. The registration request of step 131 may include one or more SL beacon 124 configuration parameters listed in Table 2, such as a specified SL beacon interval, one or more SL beacon targets, one or more SL beacon criteria, or a SL communication schedule. At step 132, SL 121 processes the registration request of step 131, which may have one or more SL beacon 124 configuration parameters. SL 121 inspects each of these parameters and determines whether to accept or modify them. This decision may be based on local policy such as the max frequency that SL 121 issues beacons, the type or ID of SL registrant 122 that is registering and its corresponding pre-configured settings for this type or ID, or the location of a SL registrant 122 and location specific policy settings that SL 121 is configured with.

At step 133, SL 121 returns a registration response to SL registrant 122. As shown in Table 3, the response may include any SL beacon configuration parameters that were modified (e.g., overridden) such that SL registrant 122 is aware of these overridden changes. The parameters of Table 3 may be sent if different than requested.

TABLE 3

SL Registration Response Beaconing Configuration Parameters

| Attributes | Description |
|---|---|
| SL beacon Interval | Accepted frequency for SL to send beacons. |
| SL beacon Targets | Accepted targets for SL to send beacons to. |
| SL beacon Criteria | Accepted criteria for SL to generate and issue a beacon. |
| SL Schedule | Accepted communication schedule specifying when a given SL registrant is permitted to send requests to SL. |
| Desired Accuracy | The amount of acceptable difference between the SL and SL registrant clocks. |

At step 134, based on the SL beacon 124 configuration of SL registrant 122, SL 121 generates SL beacons 124 at the configured SL beacon interval or based on the configured SL beacon criteria. Within SL beacon 124, SL 121 may have included information such as the current local time of SL 121, SL communication schedule which SL registrant 122 should adhere to when issuing requests to SL 121, and an indication of an event which triggered SL beacon 124, such as detecting that SL registrant 122's local time is no longer synchronized to the local time of SL 121. One method in which a SL may detect that the local time of SL registrant 122 is no longer synchronized to its own (SL 121) local time is to compare time stamp information originating from SL registrant 122. This time stamp information may be provided to SL 121 by SL registrant 122 by advertising it to SL 121 or by including it within SL message parameters as discussed in more detail herein (e.g., FIG. 12 or FIG. 13, respectively).

At step 135, upon receiving SL beacon 124 of step 134, SL registrant 122 processes it by extracting SL beacon information. Using this information, SL registrant 122 may synchronize its local time to the local time of SL 121. SL registrant 122 may also adjust its SL communication schedule such that it issues requests adhering to the specified schedule. SL registrant 122 may also inspect the type of event that triggered SL beacon 124 and use this information to conditionally adjust its local time or communication schedule. At step 136, SL 121 continues to send SL beacons 124 at the configured beacon frequency interval.

The exemplary method of FIG. 10 illustrates how SL registrant 122 may provide SL beacon configuration parameters to SL 121 during registration. However, SL beacon 124 configuration parameters may be provided to SL 121 by SL registrant 122 at other times such as after registration, as part of other messages or as part of a beacon configuration message.

Alternatively, SL 121 may recognize that SL registrant 122 prefers SL beacon 124 (based on configuration or an indication in the registration of SL registrant 122) and send a message to SL registrant 122 informing it of SL beacon 124 configuration.

After observing the size of time adjustments of SL registrant 122, SL 121 or SL registrant 122 may determine that SL beacon 124 configuration needs to change. SL 121 or SL registrant 122 may then send a new beacon configuration message. SL registrant 122 may be configured to reply to some or all SL beacons with information about the size of the time adjustments that it is making based on the received SL beacon 124.

Discussed below is SL beaconing via a dedicated SL resource Type. This disclosed method for configuring SL 121 to send beacons to one or more SL registrants 122 is to allow SL registrant 122 to configure SL 121 via a dedicated SL resource type responsible for configuring and controlling beaconing functionality in SL 121. This SL beacon resource type may be used by SL registrants 122 to customize a frequency of SL beacon 124 to control how often SL 121 sends a beacon targeting SL registrant 122 itself or other specified SL registrants in a network. Hence, each SL beacon resource may be used to configure SL 121 to send SL beacons to one or more SL registrants 122. This SL beacon resource type may include one or more of the disclosed attributes shown in Table 2.

SL beacon resources may be created by SL registrants 122, by management entities in the network, or autonomously by SL 121 itself (e.g., at start up). In one example, a SL beacon may be advertised by a given instance of a SL (e.g., published within a <beacon> resource) such that it is made available for the purposes of coordinating a schedule for when SL registrants 122 should communicate with one another based on communication patterns with SL 121. SL 121 may support multiple SL beacon resources having different SL beacon interval values. These different SL beacon resources may be used to support different levels of precision and synchronization. For example, loose synchronization may call for less frequent SL beacons 124 whereas tight synchronization may call for more frequent SL beacons 124.

Once created, a SL beacon resource may be discovered (if applicable) and subscribed to by one or more SL registrants 122. SL registrant 122 may discover one more existing SL beacon resources via a SL discovery query. This SL discovery query may be based on criteria such as finding a SL beacon resource having a SL beacon Interval, SL Schedule, or SL beacon Criteria values that match the time synchronization or communication scheduling preferences of SL registrant 122. Once a suitable SL beacon 124 has been discovered, SL registrant 122 may add its SL ID 125 to the SL beacon targets attribute to configure SL 121 to start sending it SL beacons 124 matching the corresponding configuration. Including SL ID 125 of SL registrant 122 in SL beacon Targets attribute results in SL 121 sending a corresponding SL beacon 124 to SL registrant 122 each time SL beacon Criteria have been met. SL 121 may support authorization policies to guard against SL registrant 122 adding or removing other SL registrant IDs from the list other than its own, if needed. The SL beacon Criteria may indicate the conditions that need to be met for SL 121 to send SL beacon 124. Some examples include SL 121 detecting that the offset between local time of SL registrant 122 and local time of SL 121 has exceeded a specified threshold. SL beacon 124 resource may also include a SL Schedule 128 attribute which may include a communication schedule as well as a SL beacon Interval which defines the frequency in which SL beacon 124 is to be sent.

Figure 11:
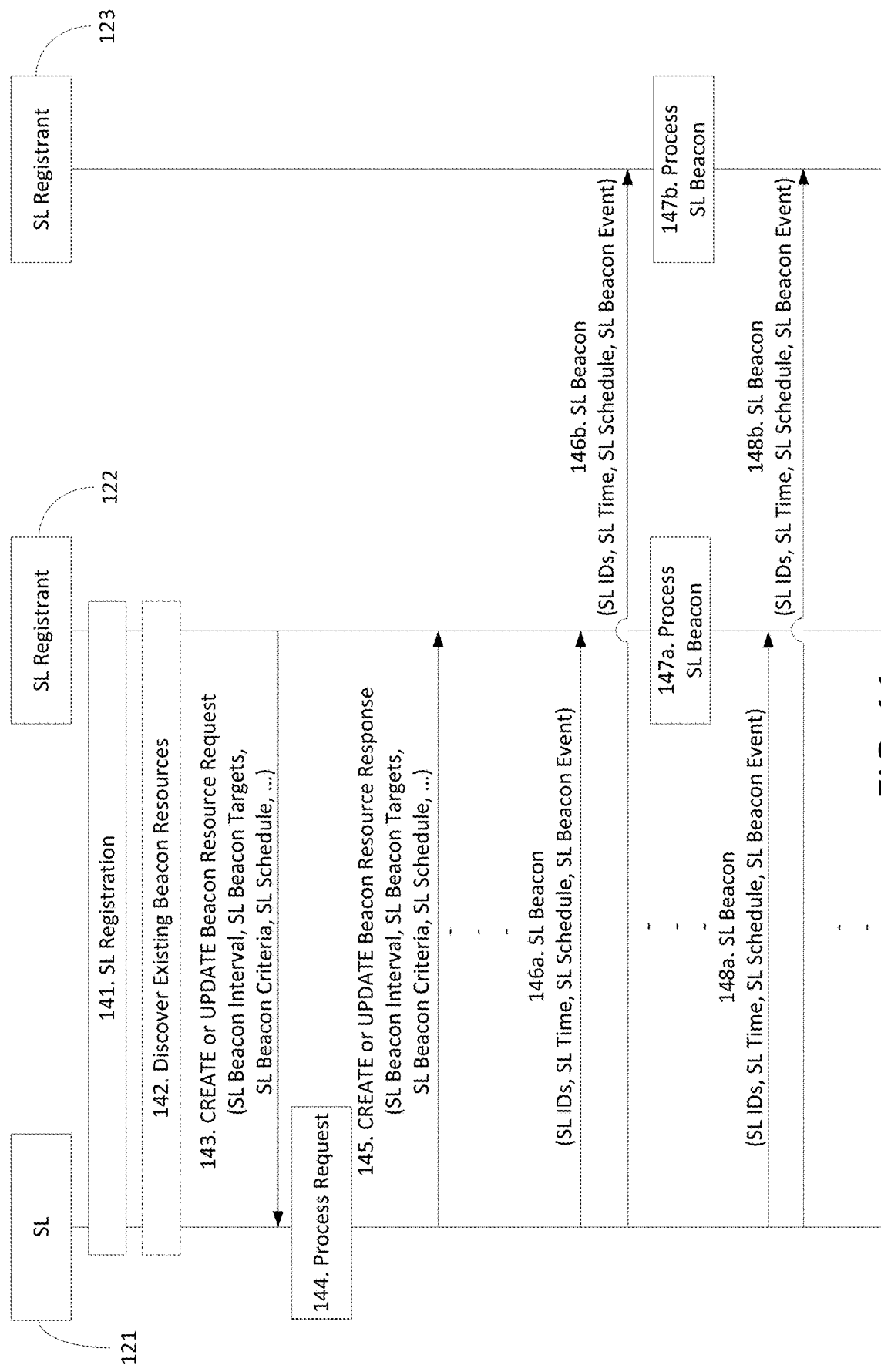
FIG. 11 illustrates SL beacon Configuration via Dedicated SL beacon Resource Type.

FIG. 11 illustrates an exemplary method in which SL registrant 122 configures SL 121 to send a periodic SL beacon to itself and another entity in the network (e.g., SL registrant 123). This configuration may be done by using a separate request to configure a dedicated SL resource responsible for controlling the SL beaconing functionality. At step 141 of FIG. 11, SL registrant 122 issues a registration request to SL 121. The registration request may not include SL beacon configuration parameters. At step 142, SL registrant 122 may issue a discovery request to find existing SL beacon resources that are available at SL 121, which is the registrar for SL registrant 122. This discovery request may include filter criteria such as a specific beacon interval that SL registrant 122 prefers receiving beacons at or a SL communication schedule which SL registrant 122 preferred for sending requests to SL 121.

With continued reference to FIG. 11, At step 143, SL registrant 122 may update an existing SL beacon resource or create a new one. This request may include one or more SL beacon configuration parameters such as a specified SL beacon Interval, one or more SL beacon targets, one or more SL beacon criteria, or a SL communication schedule. The addition of SL beacon targets may be controlled or secured by SL 121. For example, SL 121 may support authorization policies and checks to ensure SL registrant 122 is only allowed to add itself or an allowed set of other registrants which SL registrant is allowed to communicate with to the SL beacon target list. In doing so, the SL may guard against malicious attempts to flood SL registrant 122 with SL beacon requests it is not interested in receiving.

At step 144 of FIG. 11, SL 121 processes the SL beacon update or create request having one or more SL beacon configuration parameters. SL 121 may inspect one or more of the parameters listed in Table 2 and determine whether to accept or modify them. This decision may be based on local policy such as the maximum frequency that SL 121 issues SL beacons 124, the type or ID of SL registrant 122 that is registering and the SL 121's corresponding pre-configured settings for this type or ID, or the location of SL registrant 122 and location specific policy settings that the SL is configured with, among other things.

At step 145, SL 121 returns a SL beacon update or create response to SL registrant 122. As provided in Table 3, the response that SL 121 returns may be any SL beacon configuration parameters that were modified (e.g., overridden) such that SL registrant 122 is aware of these overridden changes. At step 146 (step 146*a* or 146*b*), based on the SL beacon configuration of a given SL beacon resource, SL 121 generates SL beacons 124 at the configured SL beacon interval or based on the configured SL beacon criteria. SL beacon 124 may be sent to each corresponding SL registrant (e.g., SL registrant 122 at step 146*a* and SL registrant 123 at step 146*b*) specified in the SL beacon target list. Note that SL registrant 123 beacon configuration steps are not shown but are contemplated to have taken place in advance. Within SL beacon 124, SL 121 includes information such as the current local time of SL 121, the SL communication schedule which the SL registrant 122 (or SL registrant 123) should adhere to when issuing requests to SL 121, or an indication of an event which triggered SL beacon 124 (e.g., detection that the local time of SL registrant 122 or SL registrant 123 is no longer synchronized to the local time of SL 121).

At step 147 (step 147*a* or 147*b*), upon receiving SL beacon 124, SL registrant 122 (or SL registrant 123) may process SL beacon 124 by extracting the SL beacon information. Using the SL beacon information, SL registrant 122 (or SL registrant 123) may synchronize its local time to the local time of SL 121. SL registrant 122 (or SL registrant 123) may also adjust its SL communication schedule such that it issues requests adhering to the specified schedule. SL registrant 122 (or SL registrant 123) may also inspect the type of event that triggered SL beacon 124 and use this information to conditionally adjust its local time or communication schedule. At step 148 (step 148*a* or 148*b*), SL 121 continues to send SL beacons at the configured beacon frequency interval defined within the corresponding beacon resource.

Figure 12:
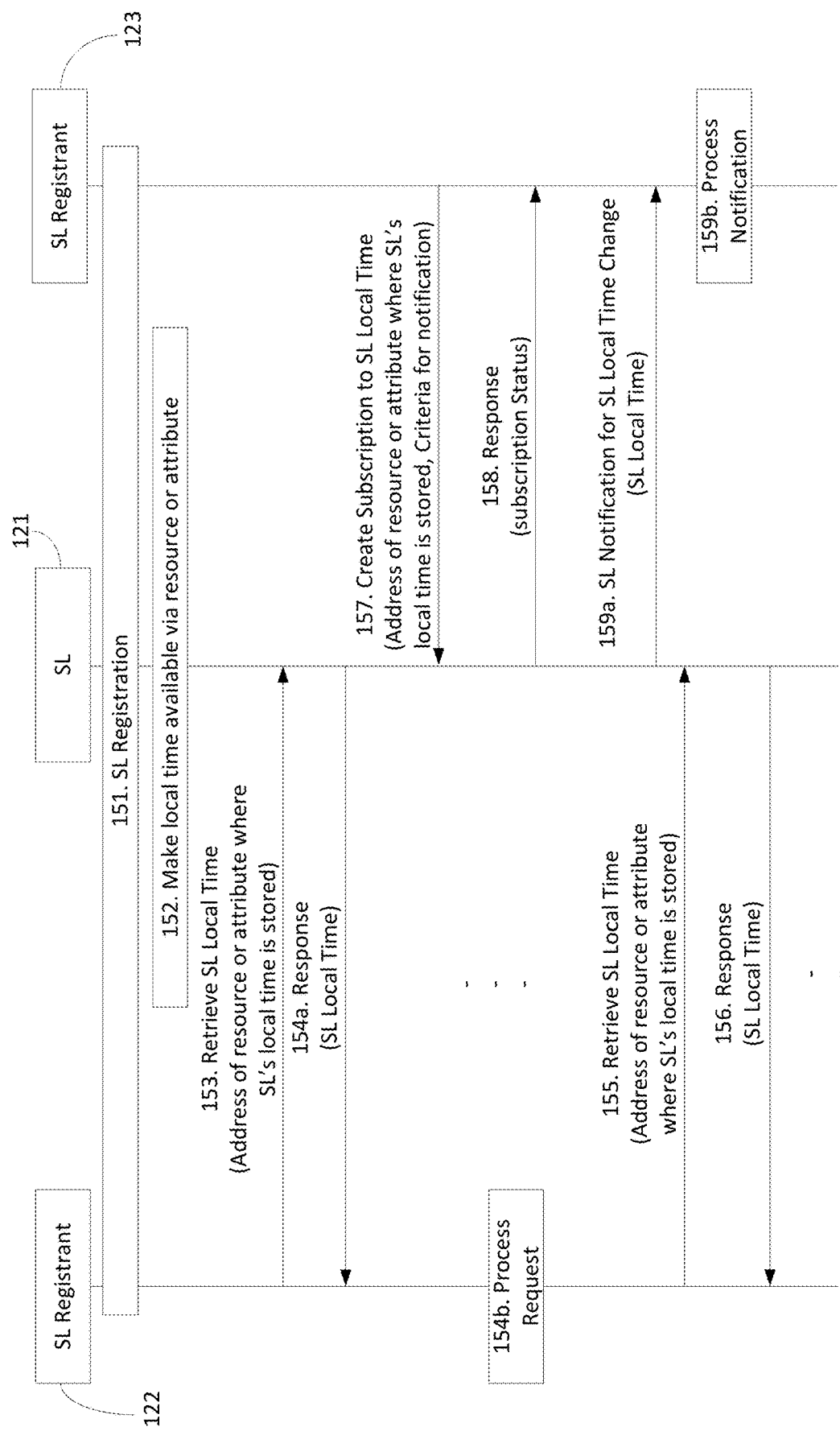
FIG. 12 illustrates SL Time Advertisement Resource.

Discussed below is SL time advertisement resource or attribute. With reference to FIG. 12, a SL instance (e.g., SL 121) may advertise its current local time to make it available to SL registrants (e.g., SL registrant 122 or SL registrant 123) to access in a lightweight manner. This may be done by supporting a resource or attribute which SL 121 allows to be retrieved or subscribed to. A specialized SL resource may be defined for this, or an existing resource may be leveraged by simply adding an additional attribute to it. This resource or attribute may be made available to SL registrants to sample or subscribe to in order to receive notifications at specified intervals or under specified conditions. As a result, SL registrant 122 (or SL registrant 123) may receive current time information of SL 121 and use this information to synchronize local time of SL registrant 122 to that of SL 121.

When a retrieve request to this resource is received, SL 121 may determine its local time (e.g., via system call such as GetSystemTime in Windows or date in Linux or System.currentTimeMillis( ) in Android) and return the result in a response back to the originator of the request with this local time value. SL 121 may also support updating this resource or attribute on a regular basis that may trigger notifications to be sent to SL registrant 122 or SL registrant 123 that have setup prior subscriptions to this resource. The response or notification may include the local time of SL 121. Upon receiving this response or notification, SL registrant 122 or SL registrant 123 may compare this value against its own local time value to determine the offset between them. Using this offset, SL registrant 122 may then adjust its local time to match the local time of SL 121. This may result in a lightweight mechanism for SL registrant 122 or SL registrant 123 to synchronize their local time to the local time of SL 121, which they are registered to.

There are situations in which the time advertisement resource or attribute may be sampled in an on-demand manner when synchronization is deemed necessary. For example, when SL 121 or SL registrant 122 needs to time stamp data that it is sending to another SL or SL registrant 123 it may first sample the time advertisement resource or attribute of the targeted SL or SL registrant 123 to determine its local time. It may then synchronize the time stamp to the local time of the targeted SL or SL registrant 123 that it sends the request to. In a similar manner SL registrant 122 may advertise its current local time to SL 121 in which it is registered with by updating a SL hosted resource or attribute. In doing so, SL registrant 122 may inform its registrar SL of its current local time.

Note, depending on the level of precision needed, SL registrant 122 may choose to also compensate for the network round trip latency of the retrieve request and response. This may be done using a technique such as using a SL ping request, as disclosed in more detailed herein, to measure and compensate for the network latency. This latency may then be taken into account when determining the offset and synchronizing the local times. This compensation may be called for when a higher level of precision is needed however, which may be contingent on the type of use case or deployment scenario.

FIG. 12 illustrates an exemplary method associated with a SL time advertisement resource as discussed above. At step 151, SL registrant 122 and SL registrant 123 register to their SL registrar, which is SL 121. At step 152, SL 121 makes its local time available to its registrants via a local resource or attribute that may be retrieved or subscribed to. At step 153, SL registrant 121 retrieves the current local time of SL 121 by issuing a retrieve request that targets the resource or attribute that SL 121 supports for publishing its time to. It is contemplated herein (but not shown in FIG. 12) that SL registrant 122 may advertise it current local time to SL 121 by updating a resource or attribute hosted upon SL 121 and use for tracking the current local time of SL registrant 122. At step 154 (step 154*a* and step 154*b*), SL 121 receives the retrieve request of step 153 from SL registrant 122 and processes the request. The SL samples its current local time (e.g., by issuing a system call to its local operating system to fetch the local system time). SL 121 then forms a retrieve response that includes the current local time and returns this response to SL registrant 122. Upon receiving the response of step 154*a*, SL registrant 122, extracts the current local time of SL 121. Based on this time, SL registrant 122 may adjust its local time to synchronize it with the local time of SL 121.

Step 155 and step 156 are steps 153 and 154 repeated as needed by SL registrant 122 based on the deployment use case preferences. For example, SL registrant 121 may periodically repeat these steps at a configured rate to ensure its local time stays synchronized to it the local time of SL 121 within a certain level of precision. The rate may be adjusted based on the observed offset between the time of SL 121 and the time of SL registrant 122. At step 157, SL registrant 123 subscribes to the current local time of SL 121, which is its registrar SL, by issuing a subscription request that targets the resource or attribute that SL 121 supports for publishing its time (SL 121) to. Within this subscription request, SL registrant 122 may specify criteria such as how often it would like to receive notifications (requested times to receive). For example, if SL 121 is using an operating system such as Android, the AlarmManager class may be used to configure an alarm based on the specified criteria and the alarm may be used to trigger the notifications.

At step 158, SL 121 receives the subscription request from SL registrant 123, creates the subscription, and returns a subscription response to SL registrant 123 indicating that the subscription has been successfully created. At step 159, SL 121 begins to monitor and detect if and when the notification criteria have been met. As described in step 157, the features of the operating system may be used to monitor and detect if the notification criteria have been met (e.g., the AlarmManager class of an Android operating system). When the notification criteria (e.g., specified time duration has elapsed), the SL samples its current local time (e.g., by issuing a system call to its local operating system to fetch the local system time). SL 121 then forms a notification that includes the current local time or the amount of time that has elapsed since the subscription request and sends this notification to SL registrant 123. Upon receiving the notification, SL registrant 123, extracts the current local time or the elapsed time from the notification. Based on this time, SL registrant 123 may adjust its local time to synchronize it with the local time of SL 121. SL 121 continues to monitor the notification criteria and generates a new notification each time the specified time duration has elapsed.

With reference to step 159, it is contemplated herein that the notification may be used to trigger actions other than, or in addition to, synchronizing the local time. For example, the notification may indicate that the time is a certain value or a specific amount of time has elapsed and the registrar SL may use the notification to trigger a new sensor reading or send a new status update.

Discussed below are time synchronization message parameters. Disclosed is a lightweight mechanism for time synchronization based on the definition of SL request and response messaging parameters that may be used to exchange time information between a SL and its SL registrants within SL messages. These parameters may be inserted within existing SL request and response messages (e.g., may be piggybacked). The disclosed SL messaging parameters may include the following: current local time, current time offset, updated time, SL ping request time, SL ping response time, SL communication schedule, or SL elapsed time. Current Local Time is the Local time value captured and inserted into SL message before it is sent by SL 121 or SL registrant 122. Current time offset is the difference in time between SL 121 and SL registrant 122 that is determined and inserted into a SL message before it is sent. Updated time is a time value that is inserted into a SL message for the purposes of instructing the recipient of the message to change its local time to the value specified. SL ping request time is the local time at an originator of the SL ping request when SL ping request is sent. SL ping response time is the local time at target of the SL ping request (e.g., the originator of the SL ping response) when SL ping response is sent. The SL communication schedule is time(s) at which SL registrant 122 is scheduled to communicate with its registrar SL 121. SL elapsed time is the time that has elapsed since a subscription request was received or since the last notification for a particular subscription was sent.

These SL message parameters may be used to advertise as well as compare the local times of SL 121 and its registrants, determine an offset, or adjust local times of SL 121 or its registrants such that they remain synchronized with one another. These disclosed SL message parameters may be included in SL request as well as SL response messages. The parameters may also be included in messages originated by SL 121 or originated by SL registrants 122. The SL parameters may be included within dedicated time synchronization messages or they may be inserted in other types of SL messages as extra content.

When this feature is enabled, SL 121 may choose to embed timing information in all messages it exchanges with a given registrant. Alternatively, SL 121 may selectively embed timing information in select messages such as one every n seconds or one in every n messages. In doing so, SL 121 may send adequate information to SL registrant 122 to allow it to maintain proper synchronization, but no more than necessary and that may introduce unnecessary overhead. In addition, SL registrant 122 may also do the same in the messages it initiates and sends to SL 121.

Figure 13:
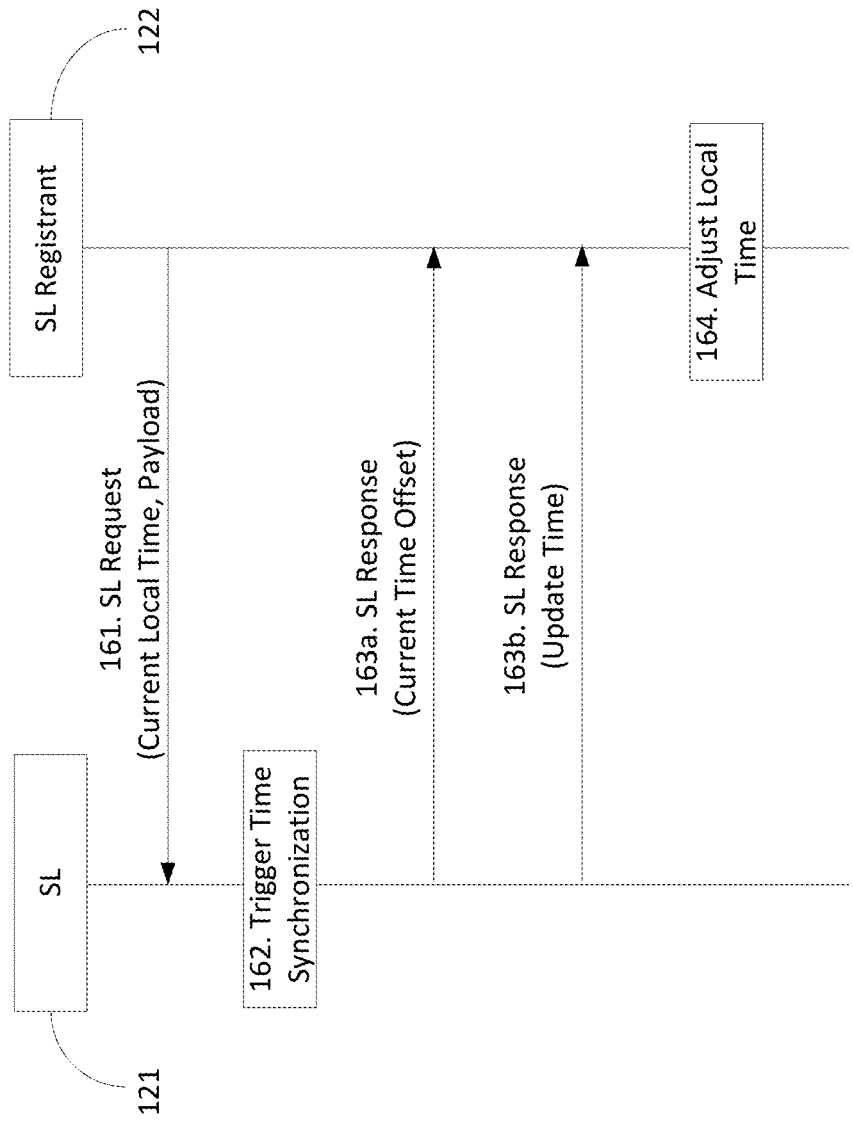
FIG. 13 illustrates SL Time Synchronization Message Parameters.

FIG. 13 illustrates an exemplary method that includes SL time synchronization request and response parameters. At step 161, SL registrant 122 issues a request to SL 121. Note this request may be modified conventional SL request which is used to carry other SL information. Within the request of step 161, SL registrant 122 may include SL time synchronization parameters that may be inserted by SL registrant 122 such as the current local time of SL registrant 122. At step 162, SL 121 processes the request of step 161, which has one or more SL time synchronization parameters. SL 121 may inspect each of these parameters and determine how to respond to SL registrant 122. This determination of how to respond may be based on local policy or configuration such as the preferred time synchronization precision for a given registrant.

At step 163, if SL 121 determines that the current local time of SL registrant 122 prefers adjusting to synchronize it with its own time, then SL 121 may return the amount of offset preferred to SL registrant 122 to correct its local time such that it is synchronized with SL 121 (step 163a). Alternatively in step 163b, SL 121 may return an updated time to the SL registrant 122. At step 164, based on the SL response of step 163, SL registrant 122 may adjust its current local time using current time offset or updated time parameters included in the response that SL 121 returns to SL registrant 122. Note that SL protocols may call for a response to be received for each message; if no response is received, then the message may be resent. Special care should be taken when resending messages that include SL time parameters that are listed above. When a message is resent, the values of the SL time parameters may not be simply resent, but updated before the retransmission is sent.

Discussed below is SL based time correction (also referred to as compensation herein). Disclosed are methods for enabling a SL to perform time correction actions on behalf of its SL registrants. SL 121 may be configured and subsequently triggered to perform time correction services for its registrants (e.g., SL registrant 122) on an individual basis. SL registrant 122 may indicate whether or not it wants SL 121 to perform time correction on its behalf. SL registrant 122 may also specify additional information such as the level of synchronization that must be maintained between itself and SL 121 (e.g., allowable synchronization offset). This may be done in a RESTful manner by supporting a resource or attribute used to indicate to SL 121 whether to perform such actions. This resource or attribute may be configured by SL registrant 122 during registration to the SL 121 or sometime thereafter via a separate request. Based off of the configuration of this resource or attribute, SL 121 may determine if and when to perform SL time correction for SL registrant 122.

Alternatively, SL 121 may support an independent and autonomous capability to determine if and when to perform time correction for SL registrant 122. This capability may be invoked based on different types of trigger conditions that the SL 121 may autonomously detect. Some trigger conditions may include whether the amount of offset between the local time of a SL registrant 122 and the local time of SL 121 is exceeded, or whether SL registrant 122 is of a certain type, or whether SL registrant 122 is hosted on a particular type of device or platform, or whether SL registrant 122 is hosted within a certain network domain or geographical region. For each of these scenarios, SL 121 may detect whether the proper condition exists and in turn whether to autonomously trigger itself to perform time correction for SL registrant 122.

To perform SL time correction, SL 121 may first determine the local time at SL registrant 122. One method is to use the disclosed SL time synchronization message parameters as defined in herein. Another method is to rely on SL registrant 122 publishing its current local time to a designated resource or attribute hosted by SL 121. Using the time information of SL registrant 122, SL 121 may process the request and perform time correction, if applicable. SL 121 may compare the local time of SL registrant 122 against its own local time value and determine an offset. An offset may be positive or negative depending on whether the local time of SL registrant 122 leads or lags local time of SL 121.

Depending on the level of precision needed, when SL 121 is performing time correction for SL registrant 122, SL 121 may choose to take into account the amount of time it takes for a SL message to travel between itself and SL registrant 122 which originates the message (e.g., the network latency). By doing this, SL 121 may factor this network latency into the timestamp information specified in the message originating by the corresponding SL registrant 122. This enables SL 121 to determine a more precise determination of the amount of time correction called for to synchronize with its own local time. One method to allow SL 121 to calculate this network traversal time is for SL 121 to explicitly measure this time. SL 121 may measure and keep track of network traversal time between itself and each of its SL registrants 122.

Once an offset is determined, SL 121 may determine whether time correction processing is preferred or not based on one or more conditions. For example, how large of an offset exists. If a large enough offset exists, the SL 121 may choose to perform time correction processing, otherwise it may choose not to. This offset threshold may be configured by SL registrant 122 that originates the request (e.g., during its initial SL registration). Alternatively, this offset threshold may be configured by a local SL policy.

For the case where SL 121 determines that time correction processing is preferred, it may perform actions such as adjusting any time-based SL metadata within the request by the corresponding determined offset. For example, if the request is to create a new SL resource having a SL expiration time with an absolute time stamp value of 20161003T112032, and the determined offset for this request is 36000 seconds (i.e., 10 hours), then time correction processing may be performed by adjusting the expiration time to a new value of 20161003T212032.

In addition to performing time correction processing on metadata within the request, SL 121 may also perform similar actions on the application data contained within the request as well. To perform this processing on the data however, SL 121 (the designated SL instance) should first have an awareness and understanding of the data. For this, SL 121 may leverage semantic capabilities to be able to parse and understand the data and locate individual elements in the data that call for time correction processing. For example, if the data within a request contains two fields; a blood pressure sensor reading and the timestamp of when the reading was measured, then using semantic capabilities the SL may parse the application data and determine that an update to the second field is needed to compensate and correct for the offset in time. As a result, SL 121 may update this second field by adjusting the time value based on the determined offset.

Figure 14:
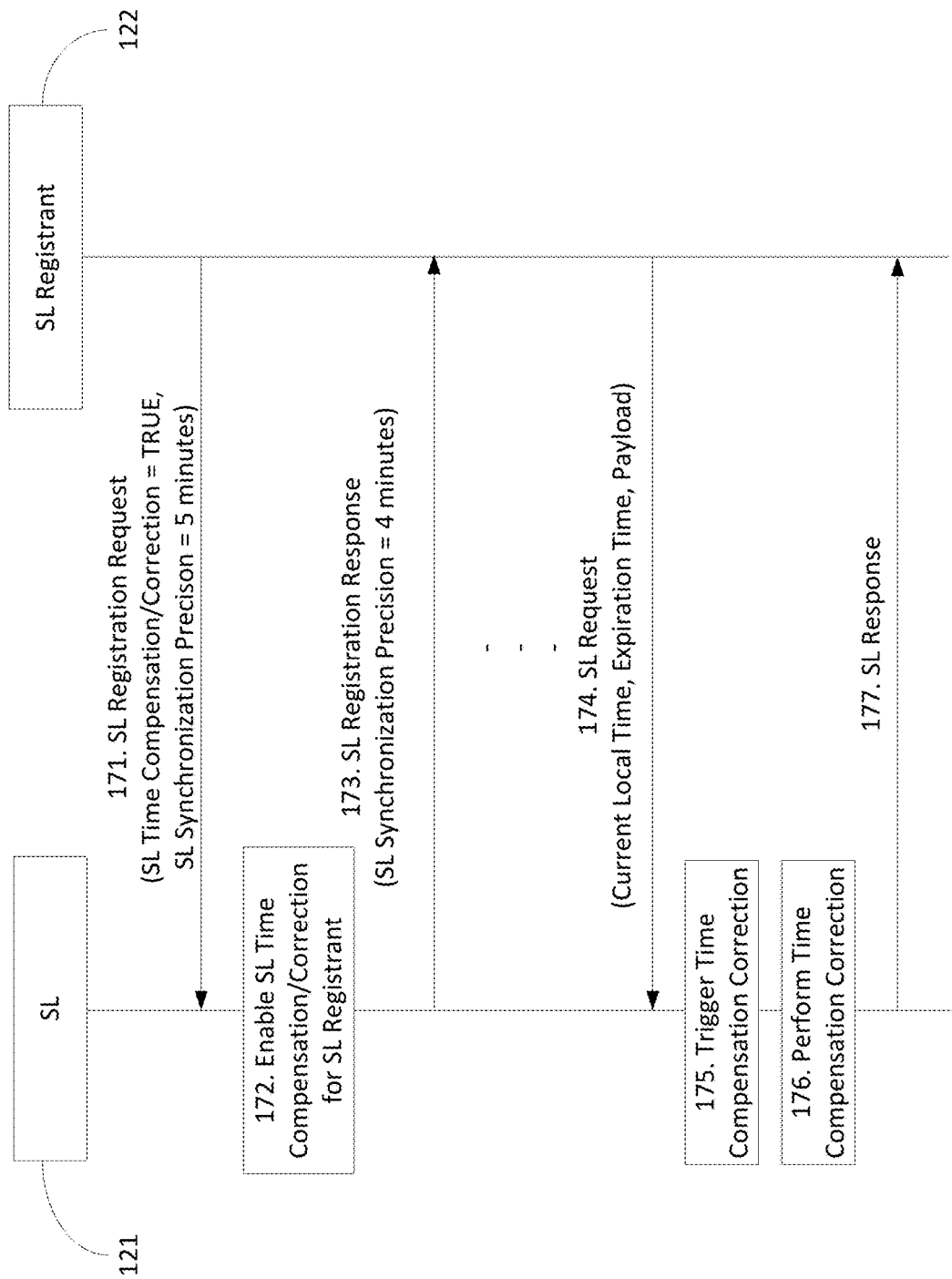
FIG. 14 illustrates SL Based Time Correction.

FIG. 14 illustrates an exemplary method for SL based time correction. At step 171, SL registrant 122 issues a registration request to SL 121. The registration request of step 171 may include one or more SL time correction configuration parameters or attributes such as a flag (indicator) to enable SL time correction or a SL synchronization precision setting that specifies how tightly (e.g., allowed offset between SL 121 time and SL registrant 122 time)

synchronized SL registrant 122 must remain to SL 121. Also applicable may be the current time information of SL registrant 122. In oneM2M, parameters are affiliated with messages and attributes are affiliated with resources. At step 172, SL 121 processes a registration request having one or more SL time correction configuration parameters. SL 121 inspects each of these parameters and determines whether to accept or modify them. This decision may be based on local policy such as whether or not SL 121 is enabled to provide SL time correction actions for SL registrant 122 or the maximum level of SL synchronization precision that SL 121 may provide to SL registrant 122. This determination may be based on SL configuration and policy settings which may be generic across all SL registrants 122 or specific to an individual or group of SL registrants.

At step 173, SL 121 returns a registration response to SL registrant 122. In the response SL 121 returns SL time correction configuration parameters that may be modified (e.g., overridden) such that SL registrant 122 is aware of these overridden changes. For example, the registration response may include a denial of the enablement of SL time correction services for SL registrant 122 by SL 121 or modified parameters (e.g., modified from the request of step 171) which indicate a requested SL synchronization precision. At step 174, SL registrant 122 issues a request to SL 121. Within the request, SL registrant 122 may include its current local time. Also included in the request are time-based SL parameters as well as application data that may also have time-based information contained within it. For example, the expiration time of the request or the content carried within the request. Expiration time is an example of a time-based parameter which the SL may need to update if the SL detects a correction is needed due to offset.

At step 175, upon receiving the request, SL 121 may process it by extracting the ID of the originator. SL 121 may check whether SL registrant 122 has SL time correction functionality enabled or not. At step 176, if enabled, SL 121 then extracts and compares the current local time of SL registrant 122 against its own current local time and determines an offset. SL 121 then uses this offset to compensate and correct any time-based information included in the request. At step 177, SL 121 returns response to SL registrant 122. The response may include an indication that the contents of the request of step 174 were time-corrected or time-stamped. The response may also provide the timestamp that was applied to the data or the calculated offset between the time in the request and the applied timestamp. The idea for time stamping is for the SL 121 to apply a time stamp for the case where the SL registrant did not include any time information at all. This is different from time correction in which SL registrant inserts a time stamp and SL 121 corrects it by updating it. Note that it may not be necessary to request time correction services during registration. Rather, the SL registrant may add information to each SL request to indicate time correction is preferred. It is contemplate herein that an application may have a different time that the device it is residing on. In this disclosure some of the methods disclosed involve the application synchronizing its time to SL 121 it is registered to. In these cases, the application's time would be different than the time of the device it is installed on.

Discussed below is SL network latency determination and tracking. To support more precise SL time synchronization, compensation, or correction functionality, methods and systems and disclosed that may be supported by SL 121 or its SL registrants 122. To more precisely determine the offset between the local time of SL 121 and the local time of its SL registrants 122, the network transmission latency of a SL message that flows between SL 121 and SL registrant 122 may be taken into account when determining the time offset.

To accurately measure and track the network transmission latency, this disclosure discloses SL ping functionality. Note, as an alternative to the SL ping messages, existing SL request and response messages may be used instead. In this case, SL ping parameters may be carried as message parameters in existing SL request and response messages rather than dedicated SL ping request and response messages.

Figure 15:
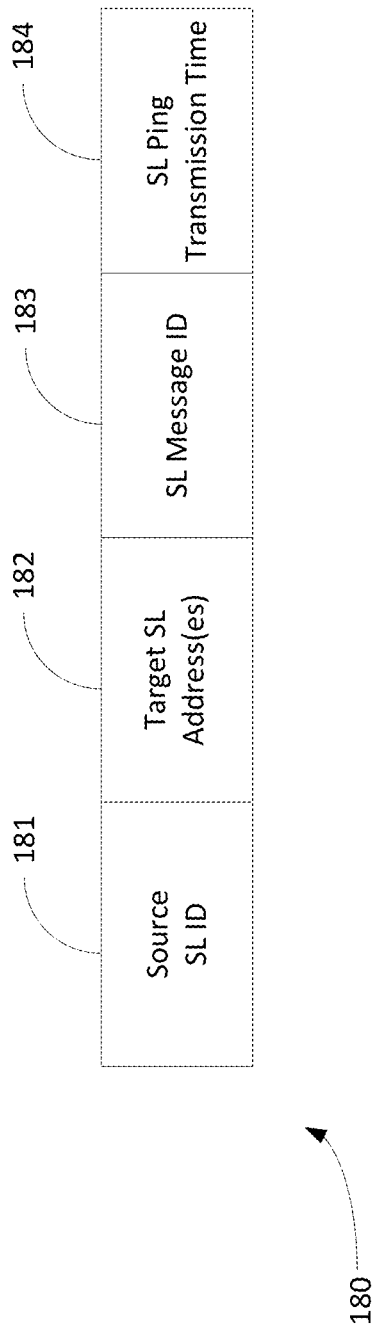
FIG. 15 illustrates SL Ping Request.
Figure 16:
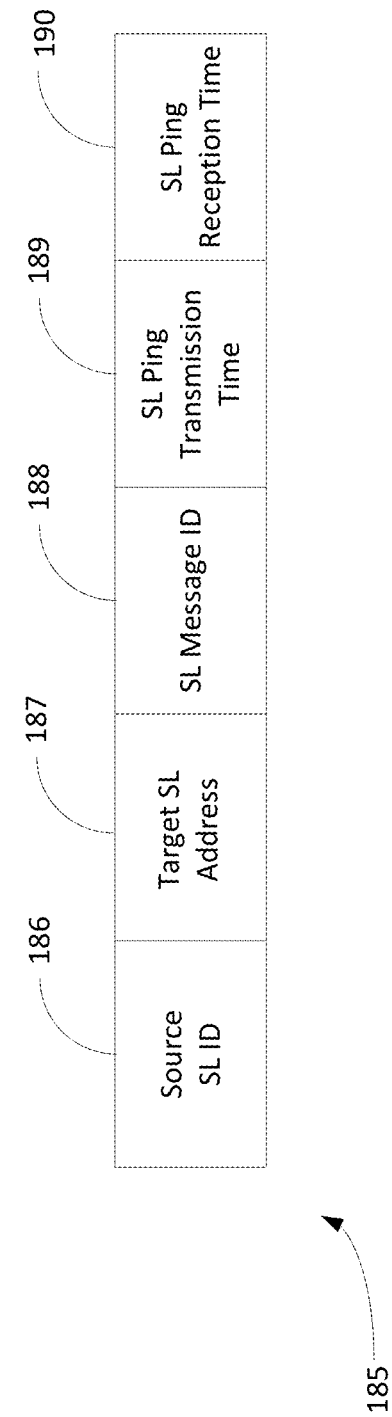
FIG. 16 illustrates SL Ping Response.

The SL ping mechanism may include a SL ping request containing information as disclosed in FIG. 15 and a SL ping response containing information as disclosed in FIG. 16. The SL ping mechanism may also include SL defined endpoints which SL ping requests may be targeted towards. FIG. 15 illustrates an exemplary SL ping request 180. SL ping request 180 may include source SL ID 181, target SL address 182, SL message ID 183, or SL ping transmission time 184. FIG. 16 illustrates an exemplary SL ping response 185. SL ping response 185 may include source SL ID 186, target SL address 187, SL message ID 188, SL ping transmission time 189, or SL ping reception time 190.

Depending on the underlying transport protocol (e.g., HTTP, CoAP, MQTT, etc), a SL endpoint may be addressed in several different ways. For example, for client-server transport protocols, such as HTTP and CoAP, the SL ping endpoint may be realized as a URI of a SL resource. For example, a SL defined ping resource or ping attribute may be defined and used as a target for SL ping requests. For pub/sub transport protocols, such as MQTT, the SL ping endpoint may be realized as a topic within a corresponding topic space. Table 4 provides addition information regarding SL ping informational elements.

TABLE 4

SL Ping Informational Elements

| Attributes | Description |
|---|---|
| Source SL ID | Identifier of the SL or SL registrant issuing the SL ping request or response |
| Target SL Address(s) | SL addresses of one or more targets of the SL ping. SL pings may be sent to one or more specific SL registrants, a group of SL registrants, or may be multi-casted or broadcasted with a network of SL registrants. SL pings may also be targeted to a SL by a SL registrant. |
| SL Message ID | Identifier of the SL ping message. Use when processing a SL ping response to correlate it with a corresponding ping request. |
| SL Ping Transmission Time | Local time value of the SL or SL registrant that issued the SL ping. This local time is captured when the SL issues the ping. This time is also echoed back in the SL ping response such that the originator does not need to maintain the state of a SL ping request. |
| SL Ping Reception Time | Local time value of the SL or SL registrant that received the SL ping which is included in the SL ping response. |

Figure 17:
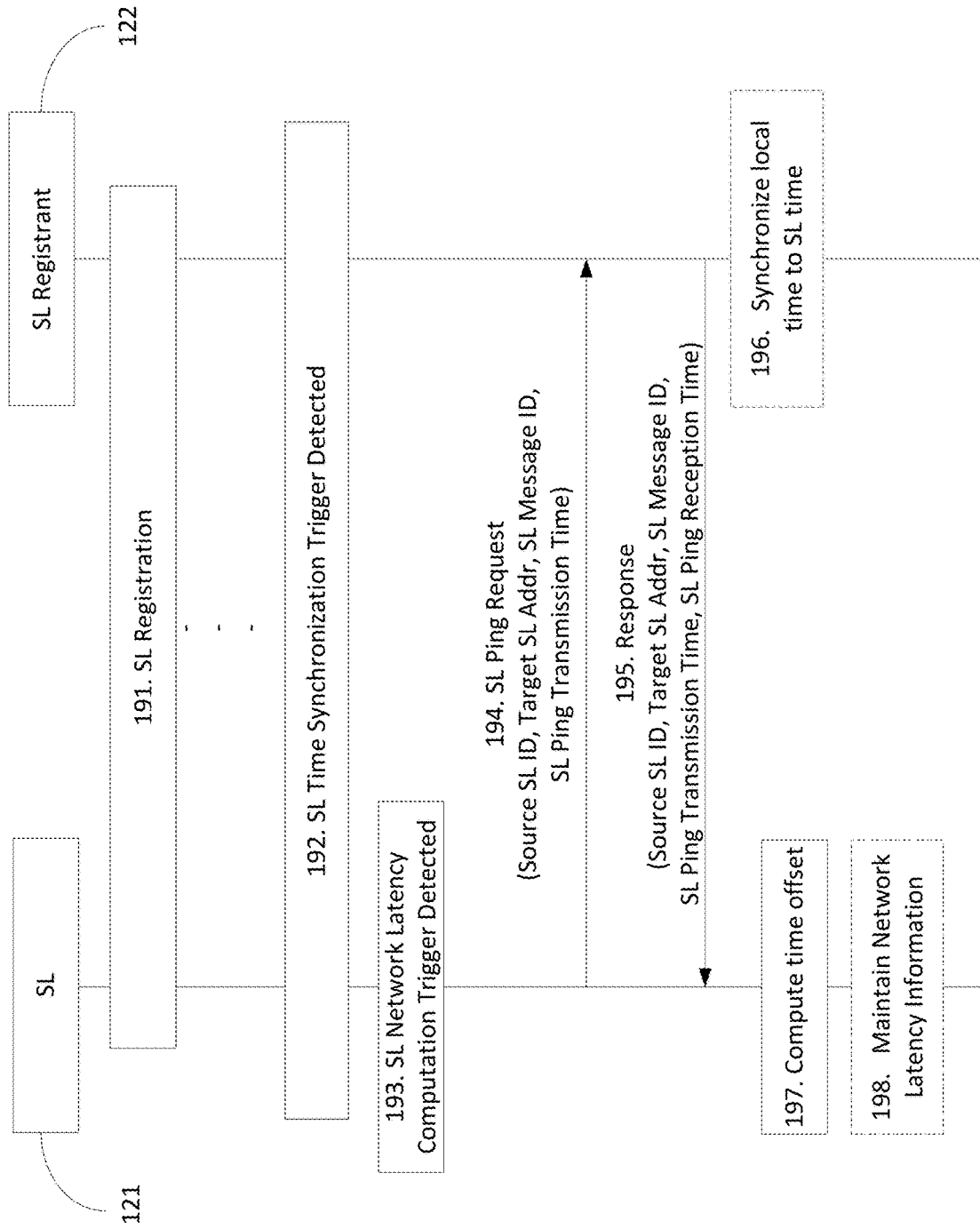
FIG. 17 illustrates SL Network Latency Determination and Tracking.

As shown in FIG. 17, the SL ping may be used to measure the round-trip network transmission latency between SL 121 and its SL registrants 122. Although not shown in FIG. 17, the SL ping may also be used by a SL registrant 122 to measure the network transmission latency between itself and SL 121 it registers to as well as other SL registrants that SL registrant 122 may communicate with (measured indirectly through SL 121). The round-trip SL ping network transmission latency may be used to determine the one-way network transmission latency (e.g., divide round trip network transmission time in half).

SL 121 or SL registrant 122 may support functionality to initiate a SL ping request based of different types of trigger events. For example, a SL ping request may be triggered in a reactive manner if/when a SL synchronization is being performed. Alternatively, a SL ping request may be triggered in a proactive manner. One such proactive manner may send SL ping requests in a periodic manner and keep track of the results such that they are available if/when SL synchronization offset calculations need to be performed. For example, SL 121 may initiate SL ping requests to each of its SL registrants 122 on a regular basis and keep track of the network transmission times associated with each one. In doing so, these results may be ready and available to the SL 121 if/when it needs to perform SL synchronization processing. SL 121 may also initiate a SL ping when its location or the location of the device it is pinging (e.g., SL registrant 122) changes. For example, SL 121 may subscribe to a location resource or attribute and initiate a SL ping based on changes to that resource.

The SL ping request may be targeted towards a SL ping endpoint (e.g., URI or topic space). After receiving the SL ping request, the targeted SL endpoint may process it by forming a SL ping response that includes a SL reception time based on its own current local time stamp as well as echoing back the information contained in the SL ping request. The response may then be returned to the originating SL endpoint. Upon receiving the response, the originating SL endpoint may timestamp the response based on its current local time. Using this timestamp and the SL transmission timestamp of when the SL ping request was originated (which is included in the ping response), the originating SL endpoint may determine the round trip latency between itself and the targeted SL endpoint. The originating SL endpoint may also determine the offset of its own current local time to the local time on the targeted SL endpoint. For example, using this offset, the originating SL endpoint may perform actions such as adjusting its local time to synchronize it with the targeted SL endpoint.

Depending on the level of time synchronization precision preferred between SL 121 and one or more of its SL registrants 122, the SL ping mechanism may or may not need to be used when determining the offset between the local time of SL 121 and the local time of its SL registrants 122. Its level of called for precision may be specified to SL 121 by individual SL registrants 122, configured by SL policies, or may be implemented as pre-defined thresholds in SL 121.

The SL ping mechanism differs from an IP (e.g., ICMP) ping mechanism since it does not rely on IP-based addressing. For service layer deployments, SL 121 or its SL registrants 122 may not connect to one another over non-IP based networks. In addition, in SL deployments IP addresses of targeted SL entities may not always be known and instead only SL identifiers may be known. In many networks ICMP-based ping functionality is disabled due to security reasons (e.g., flooding denial of service attacks). For these reasons, supporting a SL based ping mechanism may be beneficial since it provides a higher level addressing above IP-based addressing, it does not rely on ICMP based pinging which may be disabled, and it may be supported over secure SL interfaces and connections and therefore may not suffer from the same security threats and attacks as IP-based pings.

FIG. 17 illustrates an exemplary method for SL network latency determination and tracking. At step 191, SL registrant 122 registers to SL 121. At step 192, SL 121 detects a trigger to perform time synchronization between its local time and the local and the local time of one of its SL registrants 122. This trigger may occur based on events such as detecting that an incoming message from the SL registrant 122 contained local time information of SL registrant 122 and the offset between the local time of SL registrant 122 and the local time of SL 121 exceeded a defined threshold. At step 193, SL 121 detects a trigger to perform SL network latency determination between itself and the corresponding SL registrant 122. This trigger may occur based on events such as detecting that the preferred level of synchronization precision is in the range where the network latency must also be taken into account to achieve the preferred level of precision. The event may be that SL 121 detects that its location has changed, that the location of SL registrant 122 has changed, that a certain amount of time has elapsed, that new nodes have been added to the underlying network, or that new SL registrants have registered with SL 121, that SL registrants 122 have de-registered with SL 121, or that other SL registrants have changed location.

At step 194, SL 121 sends a SL ping request to SL registrant 122. SL 121 includes information such as its SL ID, the SL ID or Address of the SL ping endpoint of SL registrant 122 (e.g., assigned URI or topic space designated for SL ping requests), a SL message ID and the time when the SL ping request was originated by the SL (based on the SL's local time reference). At step 195, SL registrant 122 receives the SL ping request. SL registrant 122 builds a SL ping response by including the information from the SL ping request and by adding a SL ping reception time (based on the local time reference of SL registrant 122). This SL ping reception time may be later used by the SL 121 to gain insight into the local time of SL registrant 122. Based on this information, SL 121 may determine the offset between the local time of SL registrant 122 and its own. Based on this determined offset, SL 122 may use this information when it performs SL time correction functionality on behalf of SL registrant 122 as described herein.

At step 196, SL registrant 122 may synchronize its local time to the local time of SL 121 contained in the SL ping request. At step 197, SL 121 receives the SL ping response. SL 121 records the time it received SL ping response (based on the local time reference of SL 121). SL 121 then compares this received time against the SL ping transmission time included in the SL ping response. The difference between these two values is the round-trip network latency between SL 121 and the targeted SL registrant 122. At step 198, SL 121 may store the network latency information for SL registrant 122 such that it may re-use this information for any future SL time synchronization processing that may be called for in the near future.

Figure 18:
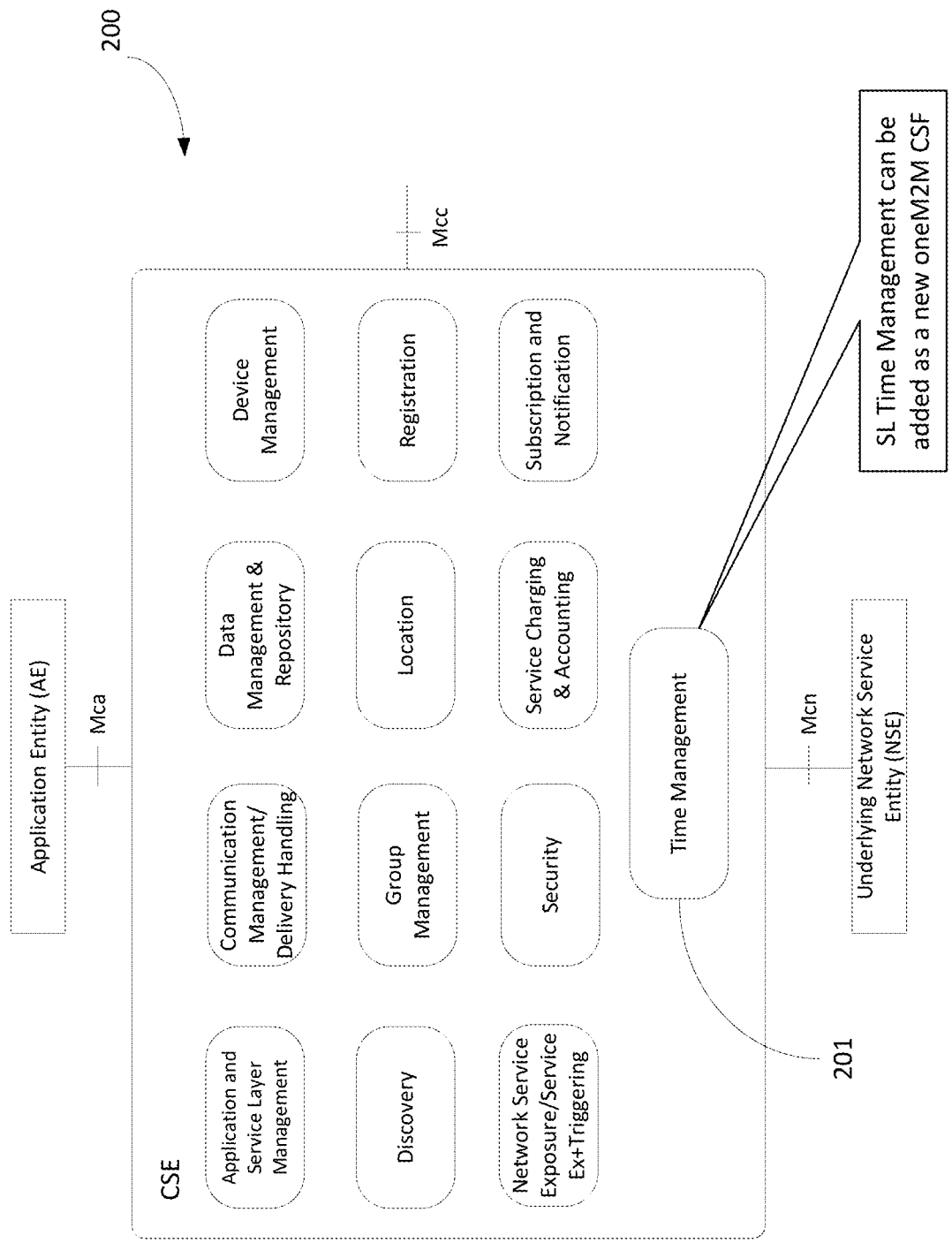
FIG. 18 illustrates Architecture example of Service Layer Time Management CSF in OneM2M.

Discussed below are oneM2M examples with regard to service layer time synchronization. Within the oneM2M architecture, SL time synchronization functionality may be realized as a dedicated Time Management Common Service Function (CSF) of a Common Services Entity (CSE). FIG. 18 illustrates an exemplary common service entity architecture 200 with time management common service function 201.

Figure 19:
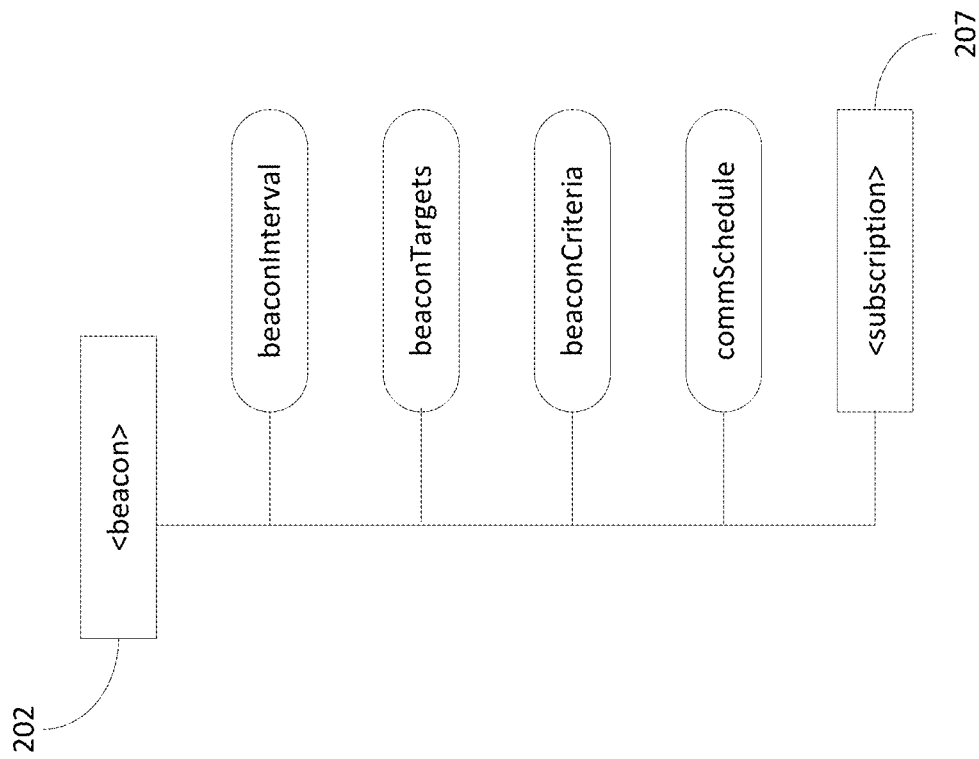
FIG. 19 illustrates oneM2M <beacon> Resource Type.

A oneM2M <beacon> 202 resource type as shown in FIG. 19 may be used for SL time synchronization as discussed herein. The <beacon> 202 resource type may enable a CSE to support customizable SL beacon functionality as discussed herein. The <beacon> 202 resource type may include one or more of the disclosed attributes shown in Table 5. The <beacon> 202 resource may also support a <subscription> 207 child resource to allow AEs to subscribe and be notified of updates to the <beacon> attributes (e.g., attributes listed in Table 5).

TABLE 5

SL beacon Resource Attributes

| Attributes | Description |
| --- | --- |
| beaconInterval | See description in Table 2 - SL beacon Interval |
| beaconTargets | See description in Table 2 - SL beacon Targets |
| beaconCriteria | See description in Table 2 - SL beacon Criteria |
| commSchedule | See description in Table 2 - SL Communication Schedule |

Figure 20:
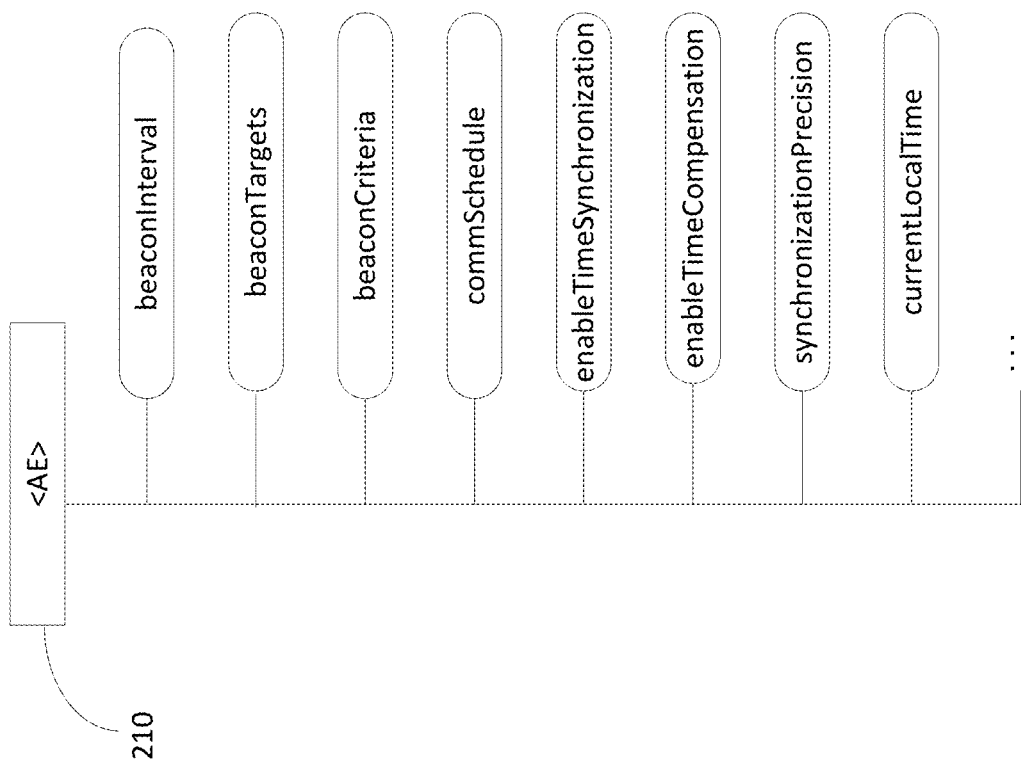
FIG. 20 illustrates oneM2M <AE> Resource Enhancements for SL Time Synchronization.

The oneM2M <AE> resource attributes, as shown in FIG. 19, allow an AE to configure a CSE to send it customized beacons, which may be an alternative to a dedicated <beacon> resource. These new attributes (e.g., beaconInterval, beacontargets, beaconCriteria, or commSchedule) may also allow an AE to configure a CSE to perform time correction on its behalf as discussed herein. The new attributes may be configured by an AE when registering to a CSE or any time thereafter. Alternatively, the new attributes (or a subset of them) may also be added to the <CSEBase> resource type to allow a CSE to advertise its beacon capabilities to its registrants. In doing so, registrants may discover beacon capabilities of a CSE. For example, AEs may discover beacon capabilities of one or more available CSEs and based off this information determine which CSE they wish to register to. FIG. 20 illustrates an exemplary oneM2M <AE> 210 resource that includes enhancements for SL time synchronization as discussed herein. Beacon functionality split between <AE> and <beacon> resource types may be linked together by adding a beaconLink attribute (not shown in FIG. 20) to the <AE> resource which links to a specified <beacon> resource. Table 6 provides additional information associated with oneM2M <AE> Resource Enhancements for SL Time Synchronization Attributes.

TABLE 6 oneM2M <AE> Resource Enhancements for SL Time Synchronization Attributes

| Attributes | Description |
| --- | --- |
| beaconInterval | See description in Table 2 - SL beacon Interval |
| beaconTargets | See description in Table 2 - SL beacon Targets |
| beaconCriteria | See description in Table 2 - SL beacon Criteria |
| commSchedule | See description in Table 2 - SL Communication Schedule |
| enableTimeSynchronization | May be used to enable or disable time synchronization by the Hosting CSE for the corresponding AE. When enabled, the hosting CSE may enable time synchronization functionality such as beaconing, advertising its current local time, or embedding time information in SL messages. |
| enableTimeCompensation | May be used to enable or disable time correction functionality by the Hosting CSE for the corresponding AE. |
| synchronizationPrecision | May be used to define the level of precision preferred for synchronization. This may be defined in terms of an offset/threshold such as 10 msec. The Hosting CSE shall then monitor the offset between its local time and the local time of the corresponding AE to detect if and when this threshold has been exceeded. |
| currentLocalTime | May be used to store the current local time of an AE. For example, this attribute may be periodically updated by an AE. An update to this attribute may trigger the Hosting CSE to perform a synchronization precision check to determine whether the offset between the AE's local time and its own local time has exceeded the synchronizationPrecision threshold. If it has, the Hosting CSE may take corrective action such as sending a beacon, returning timing information in the response to the update, or performing time compensation for future requests it receives from the AE. |
| localTimePrecision | May be used to store the time precision capabilities of the platform that the AE is hosted on. For example, this may be expressed in term of precision level of the clock used by the AE (e.g., usecs) or in terms of a PPM value, etc. |

Figure 21:
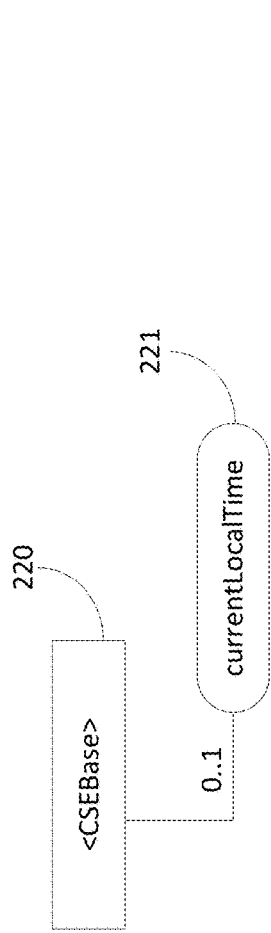
FIG. 21 illustrates currentLocalTime attribute.

FIG. 21 illustrates an exemplary a oneM2M currentLocalTime 221 resource attribute under <CSEBase> 220. The currentLocalTime 221 resource attribute enables CSEs as well as AEs to publish their current local time and support the SL time synchronization functionality disclosed herein. The currentLocalTime 221 resource attribute may be supported by various types of oneM2M defined resources including <CSEBase> 220, <AE> (not shown), and <remoteCSE> resource types (not shown), as well as others. Table 7 provides additional information with regard to currentLocalTime 221 resource attribute.

TABLE 7 currentLocalTime attribute

| Attributes | Description |
| --- | --- |
| currentLocalTime | The value of the current local time on the node hosting the corresponding CSE or AE. This attribute may be implemented as a virtual attribute. In the case of a virtual attribute, when the CSE receives a retrieve request to the CSEbase or the currentLocalTime attribute, it may trigger an action to sample it current local time (e.g., make an OS call to get system time) and return this value in the response. |

Figure 22:
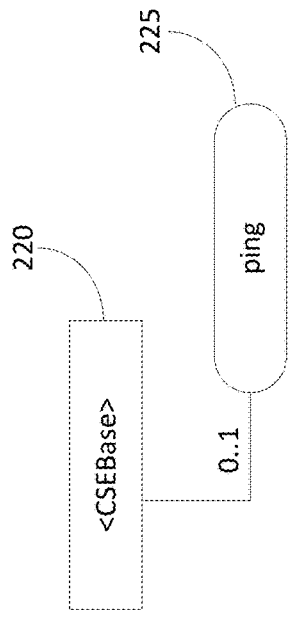
FIG. 22 illustrates ping attribute in <CSEBase>.
Figure 23:
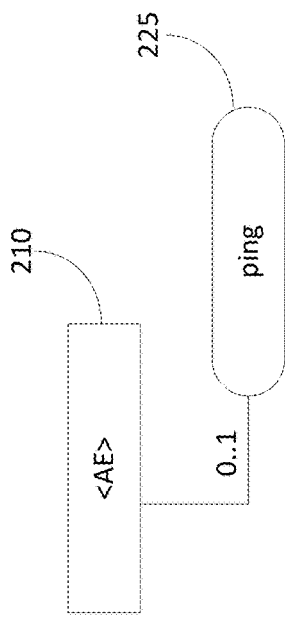
FIG. 23 illustrates ping attribute in <AE>.

To support the SL ping mechanism defined herein disclosed is a oneM2M ping 225 resource attribute as shown in FIG. 22. The ping 225 resource attribute may serve a SL ping endpoint targeted by SL ping requests. This attribute may be defined as a virtual attribute which results in SL ping functionality being executed when this attribute is targeted by an incoming request. For example an AE may ping a CSE by sending a SL ping request to a CSE's ping attribute. The CSE may process the SL ping request and return a SL ping response to the AE. The ping 225 resource attribute may be supported by various types of oneM2M defined resources including the <CSEBase> 220 and <AE> 210 resource types as well as others if applicable. Supporting a ping 225 attribute in an <AE> 210 resource type as shown in FIG. 23 enables a hosting CSE to support re-targeting a SL ping request to an AE. This enables SL ping requests to function in an end-to-end manner across multiple service layer hops and measure network latency across a potentially diverse network topology spanning different types of underlying networks and domains. Table 8 provides additional information with regard to ping 225 attribute.

TABLE 8 ping attribute

| Attributes | Description |
|---|---|
| ping | When a RETRIEVE request targets this attribute, the hosting CSE may return a SL Ping response to the originator. For the case, of an <AE> ping attribute, the Hosting CSE may first re-target the SL ping request to the corresponding AE. This may be done using a oneM2M NOTIFY request. When the Hosting CSE receives a response from the AE, it may return a SL Ping response to the originator. |

Existing oneM2M subscription functionality allows an AE to subscribe to the disclosed currentLocalTime attribute and receive updates whenever the attribute is updated. However, the existing oneM2M subscription functionality does not support a mechanism to allow a subscriber to define a frequency that it wishes to receive notifications for an attribute like currentLocalTime which may be updated more often than a subscriber would like to be notified (requested times to be notified). For example, a CSE may update its currentLocalTime attribute every second, however a subscribing AE may only want to receive a notification every ten seconds to synchronize its local time to the local time of the CSE and meet the time synchronization called for of its deployment use case. However, another AE may want to receive a notification every 500 milliseconds from the CSE to synchronize its local time to the local time of the CSE to meet its deployment use case time synchronization called for.

The disclosed enhancement to the existing oneM2M subscription functionality allows a subscriber to define a frequency that it wishes to receive notifications for an attribute like currentLocalTime which may be updated more often than a subscriber would like to be notified (requested times to be notified).

A new type of condition is defined for the oneM2M subscription eventNotificationCriteria. The new condition is defined as a currentLocalTimeInterval. This condition may be used by a subscriber to indicate the frequency interval that it wishes to receive notifications containing updated currentLocalTime values from a Hosting CSE. This new condition may be expressed in a specified time unit such as microseconds. For example a subscription to the currentLocalTime attribute having a currentLocalTimeInterval configured with a value 5000, may result in the hosting CSE sending a notification to the subscribing AE every 5000 microseconds. Each notification may contain an updated value of the Hosting CSE's currentLocalTime.

Alternatively a more generic eventNotificationCriteria condition may be defined. The currentLocalTimeInterval condition may be made more generic and not only used for the currentLocalTime but also used for other types of attributes which may also be updated more often than a subscriber would like to be notified. For example, a more generic attributeInterval condition may be defined. The attributeInterval may be defined to allow the subscriber to request a notification for changes to the subscribed resource not more often than a specified value. This value may be expressed in terms a duration (e.g., 10 seconds since the prior notification was sent) or a time of day (e.g., not before 10 p.m.). This condition may be applicable to one or more attributes specified by the attribute condition of the eventNotificationCriteria.

Note, the disclosed currentLocalTimeInterval and the more generic version attributeInterval differ from the existing oneM2M rateLimit and schedule functionality of a subscription. The rateLimit and schedule functionality of a subscription may only be used to throttle and schedule the sending of notifications to a subscriber after the notifications have already been generated by a Hosting CSE. These features cannot be used by a Hosting CSE to determine when to generate a notification for a given subscription. Hence for attributes like currentLocalTime that may be frequently updated, the rateLimit and schedule features cannot be used by a Hosting CSE to efficiently control the generation of notifications.

To support SL time synchronization functionality in oneM2M disclosed herein is additional oneM2M request and response parameters as shown in Table 9. These new message parameters enable a CSE and AE to exchange time information and support the SL time synchronization request and response message parameters and procedures and as well as the SL ping message parameters and procedures.

TABLE 9 oneM2M Time Synchronization Request and Response Message Parameters

| Message Parameter | Description |
|---|---|
| Current Local Time | The local time at originator when message was sent |
| Current Time Offset | The difference in times between an originator and target that is determined and inserted into message before it is sent |
| Updated Time | A time value that is inserted into message for the purposes of instructing the recipient of the message to change its local time to the value specified |
| Ping Request Time | The local time at originator when SL ping request is sent |
| Ping Response Time | The local time at target when SL ping response is sent |
| Communication Schedule | The time(s) at which a registrant is scheduled to communicate with its registrar CSE. |

To realize the disclosed SL time synchronization mechanisms and procedures disclosed in this disclosure, the following oneM2M procedures are defined.

oneM2M customizable beaconing time synchronization procedures oneM2M resource-based time synchronization procedures oneM2M message parameter-based time synchronization procedures oneM2M time correction procedures oneM2M network latency determination procedures Discussed below are customizable beaconing time synchronization procedures. There are multiple scenarios that may be considered. In a first scenario (FIG. 24), a registrant AE/CSE configures its registrar CSE to send it a customized beacon. The configuration is performed as part of the AE/CSE registration request. In a second scenario (FIG. 25), a registrant AE/CSE discovers an existing CSE beacon resource and subscribes to the resource. Within the subscription, the registrant specifies criteria for when the CSE should send it a beacon. The CSE in turn sends beacon notifications to the registrant when the beacon notification criteria are met. In third scenario (FIG. 26), a registrant AE/CSE creates a beacon resource on a CSE. The registrant configures the beacon resource to meet its own custom preferences (e.g., beacon interval). As a result, the CSE sends the registrant customized beacons.

Figure 24:
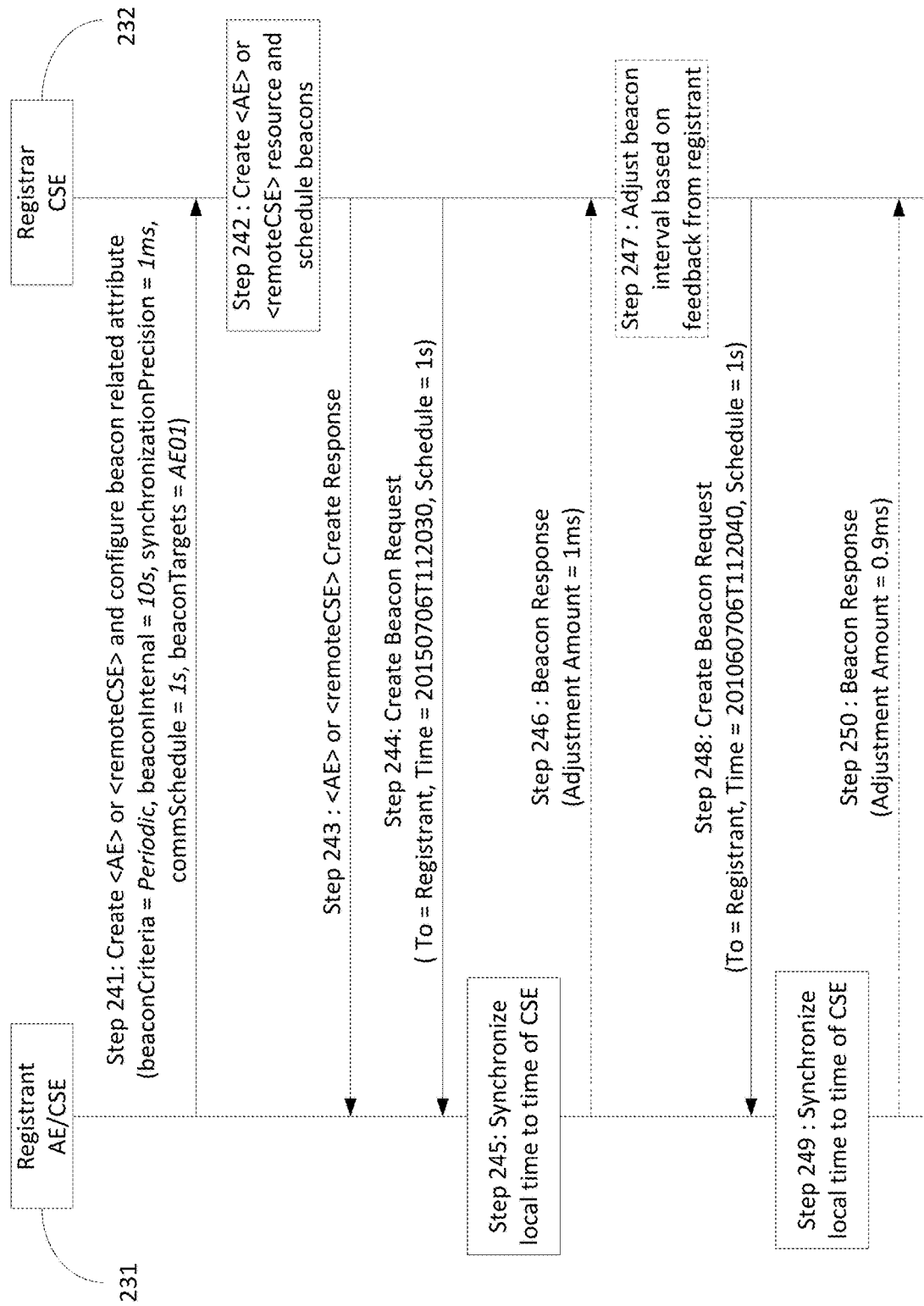
FIG. 24 illustrates Scenario #1—Registrant configures the CSE to send it a customized beacon.

FIG. 24 illustrates a first scenario where registrant configures the CSE to send it a customized beacon. At step 241, registrant 231 (e.g., an AE) registers to registrar 232 (e.g., a CSE) by issuing a CREATE request for an <AE> or <remoteCSE> resource. Within this request, registrant 231 includes beacon configuration resource attributes to configure the CSE to send it customized beacons. The types of beacon configuration attributes that may be specified include beaconCriteria, beaconInterval, synchronizationPrecision, commSchedule and beaconTargets. Details for these attributes are captured in Table 6. At step 242, registrar 232 creates the <AE> or <remoteCSE> resource and also configures customized beacons to be sent to registrant 231. At step 243, registrar 232 responds to registrant 231. At step 244, registrar 232 generates a SL beacon request. The request is a CREATE that is targeted to registrant 231. The request may include the local time of registrar 232 and may also include a communication schedule that registrant 231 is to abide by when initiating requests to registrar 232.

With continued reference to FIG. 24, at step 245, registrant 231 receives and processes the beacon by synchronizing its local time to the time of the registrar 232. At step 246, registrant 231 may prepare a response to the beacon request. Included in the response is the amount of adjustment made to the local time of registrant 231. At step 247, registrar 232 receives the beacon response and processes it. Using the adjustment information in the response along with the synchronizationPrecision setting specified in step 241, registrar 232 may adjust the beacon interval to reduce or increase the beacon interval. If the amount of adjustment exceeds the synchronizationPrecision, the beaconInterval may be reduced to send beacons more often and keep registrant 231 more closely synchronized to registrar 232. Otherwise it may be increased to send beacons less often since registrant 231 is sufficiently synchronized to registrar 232.

At step 248 of FIG. 24, registrar 232 sends out another beacon request. This beacon is based on the updated beaconInterval. At step 249, registrant 231 receives and processes beacon by synchronizing its local time to the time of registrar 232. At step 250, registrant 231 may prepare a response to beacon request. Included in the response is the amount of adjustment made to the local time of registrant 231.

Figure 25:
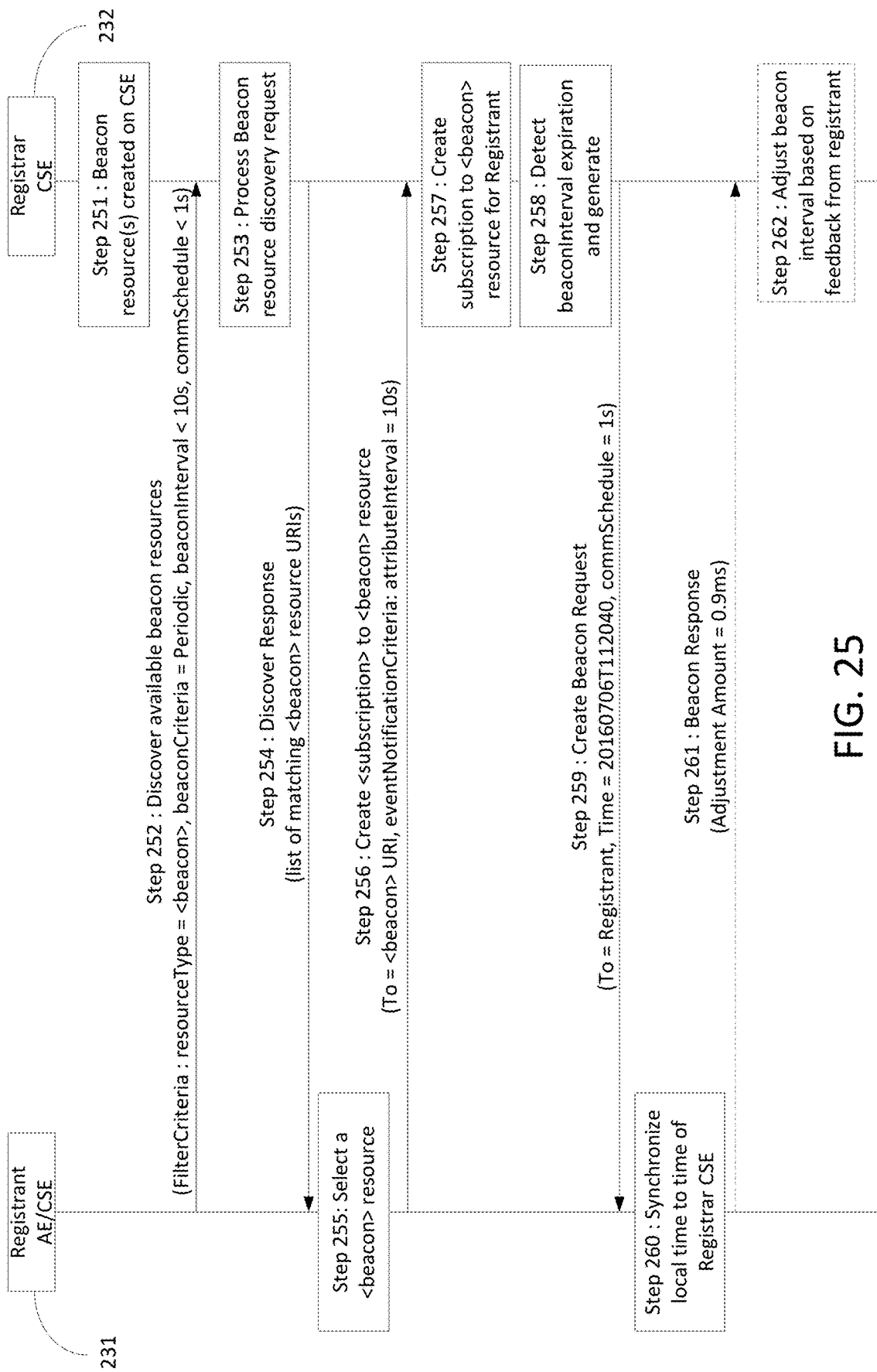
FIG. 25 illustrates Scenario #2—Registrant discovers an existing CSE beacon resource and subscribes to it.

FIG. 25 illustrates the second scenario where registrant discovers an existing CSE beacon resource and subscribes to it. At step 252, one or more <beacon> resources are created on registrar 232. The resources may be locally created by registrar 232 itself (e.g., based on configured policies) or they may be generated by other AEs or CSEs. These resources may have varying beacon configurations, such as various beaconIntervals. At step 252, registrant 231 performs a discovery request to registrar 232 to find available <beacon> resources which match its specified beacon configuration filter criteria. The discovery filter criteria may include beacon configuration information such as a specified beaconCriteria (e.g., periodic) or a beaconInterval threshold (e.g., <10 s), or a commSchedule threshold (e.g., <1 s).

At step 253, registrar 232 receives the request and processes it by searching its local resources to see if it hosts any <beacon> resources and if any of them match the specified discovery criteria. At step 254, registrar 232 generates a beacon discovery response. The response contains the URIs of any matching <beacon> resources it finds. At step 255, registrant 231 receives and processes the beacon discovery response. It selects a beacon resource (if present). At step 256, registrant 231 sends a request to subscribe to the <beacon> resource in order to start receiving beacons from registrar 232. The request may include an eventNotificationCriteria that specifies an interval at which it wishes to receive beacon notifications (e.g., every 10 s). At step 257, registrar 232 receives the subscription request and creates the subscription for registrant 231.

At step 258, registrar 232 detects that the specified interval (e.g., 10 s) has been exceeded and generates a notification to be sent. At step 259, registrar 232 sends the beacon notification to registrant 231. The beacon contains the current local time of registrant 231 CSE and a communication schedule for which registrant 231 is to use when initiating requests. At step 260, registrant 231 receives the beacon notification and synchronizes its local time to the time of the registrar 232 as specified in the beacon. At step 261, registrant 231 returns a beacon response to registrar 232. The response may include the amount of time registrant 231 adjusted its local time by synchronizing to the local time of registrar 231. At step 262, registrant 231 receives the beacon response and processes it. The adjustment time specified in the response may be used by registrant 231 to adjust the beacon interval for registrant 231. If the amount of adjustment exceeds the synchronizationPrecision (specified in the corresponding <beacon> resource), the beaconInterval may be reduced to send beacons more often and keep registrant 231 more closely synchronized to registrar 232. Otherwise the beaconInterval may be altered to send beacons less often since registrant 231 is sufficiently synchronized to registrar 232.

Figure 26:
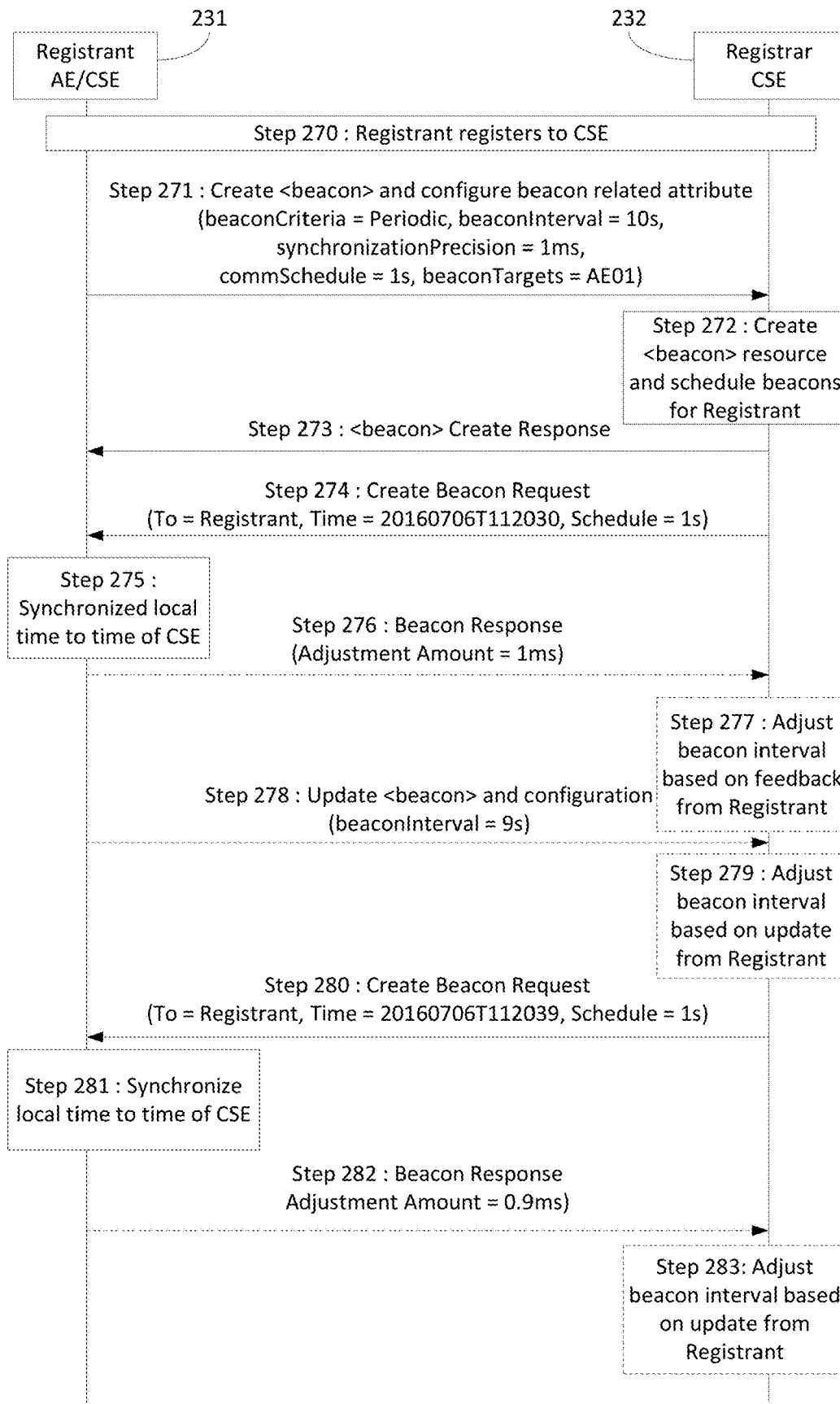
FIG. 26 illustrates Scenario #3—An AE creates a beacon resource on a CSE.

FIG. 26 illustrates an exemplary third scenario where an AE creates a beacon resource on a CSE. At step 270, registrant registers to CSE (registrar 232). At step 271, registrant 231 creates a customized beacon resource on registrar 232 by issuing a CREATE request for a <beacon> resource. Within this request, registrant 231 includes beacon configuration resource attributes to configure the CSE to send it customized beacons. The types of beacon configuration attributes that may be specified include beaconCriteria, beaconInterval, synchronizationPrecision, commSchedule, or beaconTargets. Details for these attributes are captured in Table 6. At step 272, registrar 232 creates the <beacon> resource and also configures customized beacons to be sent to registrant 231. At step 273, registrar 232 responds to registrant 231 (e.g., an AE or CSE) with a <beacon> CREATE response. At step 274, registrar 232 generates a SL beacon request. The request is a CREATE that is targeted to registrant 231. The request includes the local time of the registrar CSE 232 and may also include a communication schedule that registrant 231 is to abide by when initiating requests. At step 275, registrant 231 receives and processes the beacon by synchronizing its local time to the time of the registrar 232. At step 276, registrant 231 may prepare a response to SL beacon 124 request. Included in the response is the amount of adjustment made to the local time of registrant 231.

At step 277, registrar 232 may receive the beacon response and processes it. Using the adjustment information in the response along with the synchronizationPrecision setting specified in step 271, registrar 232 may adjust the beacon interval to reduce or increase the beacon interval. If the amount of adjustment exceeds the synchronizationPrecision, the beaconInterval may be reduced to send beacons more often and keep registrant 231 more closely synchronized to registrar 232. Otherwise it may be increased to send beacons less often since registrant 231 is sufficiently synchronized to the registrar 232. At step 278, registrant 231 may prepare a <beacon> UPDATE request to re-configure some parameters of the <beacon> resource such as the beaconInterval. At step 279, registrar CSE may receive the beacon UPDATE request and processes it by making updates to the <beacon> attributes. At step 280, registrar CSE send out another beacon request. This beacon is based on the updated beaconInterval. At step 281, registrant 231 receives and processes the beacon by synchronizing its local time to the time of registrar 232. At step 282, registrant 231 may prepares a response to the beacon request. Included in the response may be the amount of adjustment made to local time of registrant 231. At step 283, step 277 may be repeated.

A oneM2M CSE may be enhanced to make its current local time available to its registrants via a SL resource or attribute. Registrants may in turn retrieve this resource or attribute in a periodic or on-demand basis. Registrants may also subscribe to changes in this resource or attribute and receive notifications when these changes occur. This subscription may include a threshold criteria to throttle notifications based on a specified time duration or frequency.

A oneM2M CSE may be enhanced to allow a registrant to publish its current local time to a CSE hosted resource or attribute. Below are summary of oneM2M based procedures for each of the above scenarios: 1) Registrant retrieves Registrar CSE's local time and synchronizes to it; 2) Registrant subscribes to changes in Registrar CSE's local time ; and 3) Registrant publishes its current local time to Registrar CSE.

Figure 27:
FIG. 27 illustrates method of retrieving Registrar CSE's local time and synchronizing to it.

FIG. 27 illustrates an exemplary method where a registrant retrieves a registrar's local time and synchronizes to it. At step 291, registrant 231 registers to registrar 232. At step 292, registrant 231 issues a RETRIEVE request to fetch the current local time of registrar 232. The request is targeted towards the currentLocalTime attribute of the <CSEBase> resource of the registrar 232. At step 293, registrar 232 receives and processes the RETRIEVE request by calculating its current local time (e.g., by making a system call to determine the local time of the platform it is hosted on). At step 294, registrar 232 responds to registrant 231 and includes its current local time value. At step 295, registrant 231 receives and processes the response by synchronizing its local time to the time of registrar 232.

Figure 28:
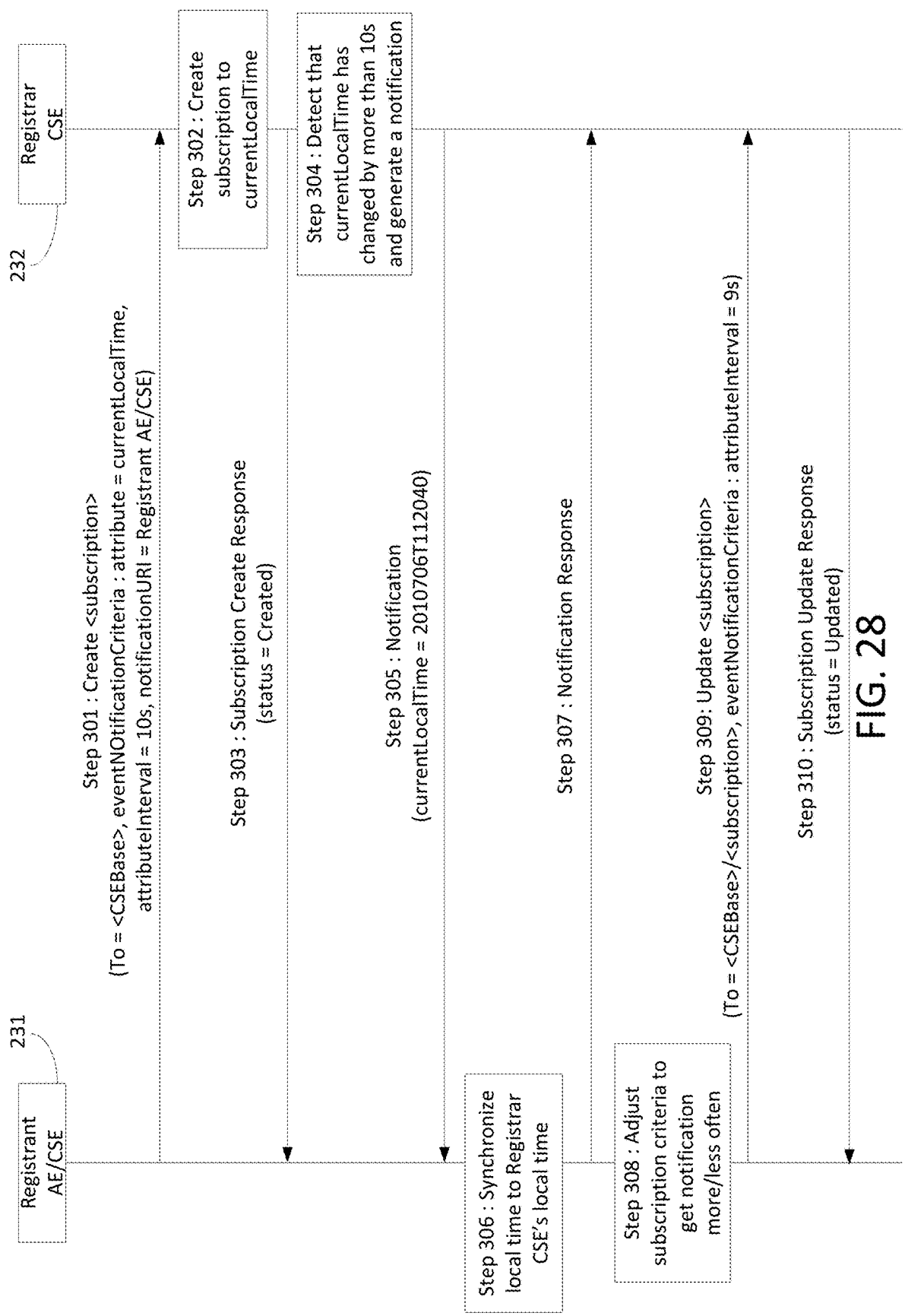
FIG. 28 illustrates method of subscribing to changes in Registrar CSE's local time.

FIG. 28 illustrates an exemplary method where registrant subscribes to changes in registrar's local time. At step 301, registrant 231 issues a CREATE request to subscribe to the currentLocalTime attribute of registrar 232 and receive notifications when its value changes by more than 10 s from the previous notification. At step 302, registrar 232 creates the <subscription> to currentLocalTime. At step 303, registrar 232 responds to registrant 231 with a <subscription> CREATE response. At step 304, registrar 232 detects that its currentLocalTime has changed by more than 10 s and generates a SL beacon notification. At step 305, the notification request is targeted to registrant 231. The request includes the local time of registrar 232. At step 306, registrant 231 receives and processes the notification by synchronizing its local time to the time of registrar 232. At step 307, registrant 231 sends a notification response. At step 308, registrant 231 prepares an UPDATE request to the currentLocalTime subscription to modify the interval that it is receiving notifications to every 9 seconds. At step 309, registrant 231 sends the UPDATE request. At step 310, registrar 232 processes the request, updates the currentLocalTime notification interval and returns a response to registrant 231.

Figure 29:
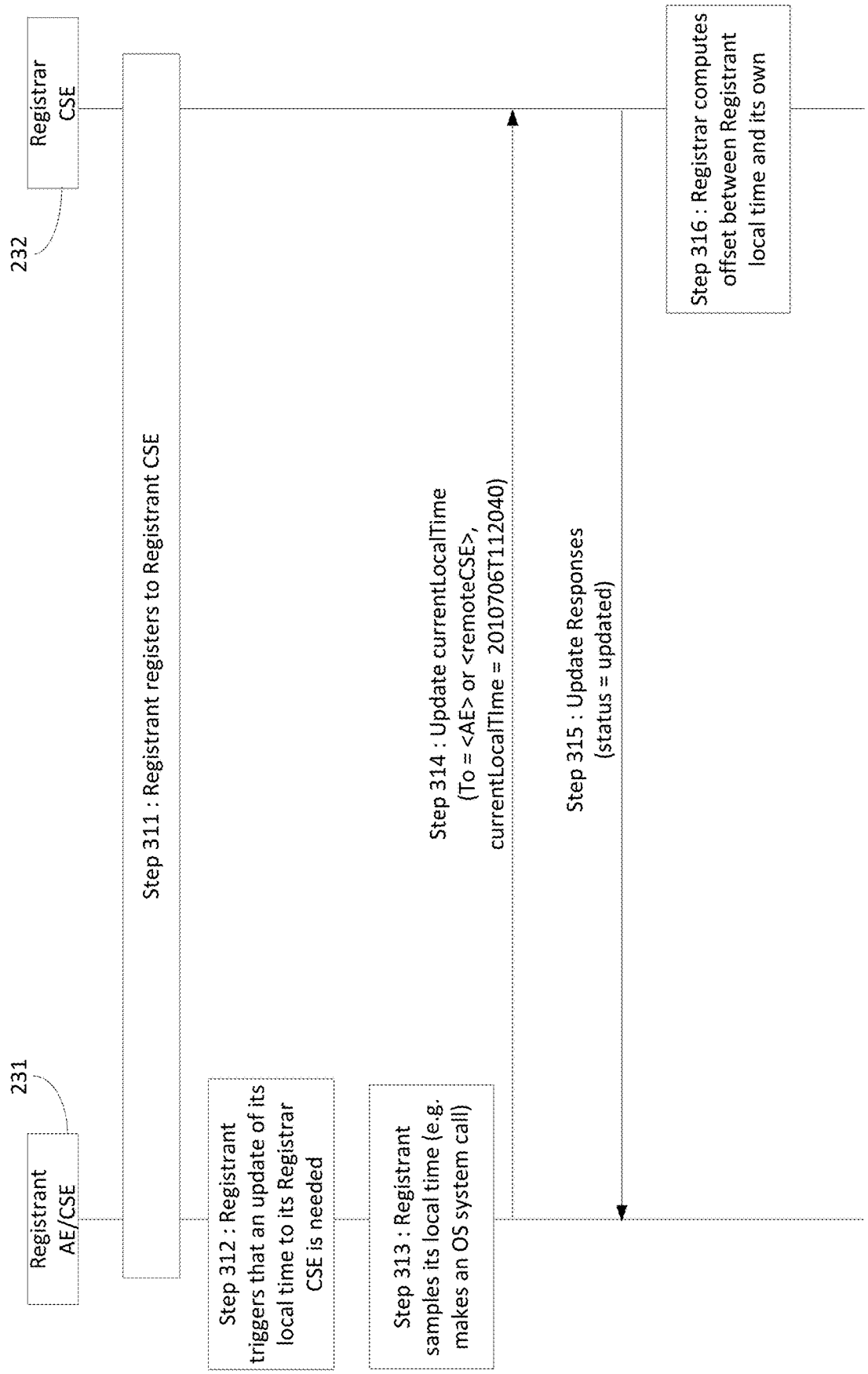
FIG. 29 illustrates method of publishing current local time to Registrar CSE procedure.

FIG. 29 illustrates an exemplary method where registrant publishes its current local time to registrar. At step 311, registrant 231 registers with registrar 232. At step 312, registrant 231 triggers an update of its local time to registrar 232. The trigger may be periodic in nature or event-based (e.g., detected loss of synchronization). At step 313, registrant 231 determines its local time (e.g., makes a system call to the platform it is hosted on). At step 314, registrant 231 sends an UPDATE request to registrar 232. This request targets the currentLocalTime that corresponds to registrant 231 (e.g., attribute of <AE> or <remoteCSE> that corresponds to registrant 231). Included in this request is the current local time value of registrant 231. At step 315, registrar 232 receives and processes the UPDATE request by updating its local copy of the currentLocalTime attribute of registrant 231. At step 316, registrar 232 determines offset between the local clock registrant 231 and its own local clock. Based on this offset, registrar 232 may determine whether to take subsequent actions (e.g., perform time correction).

A oneM2M CSE and AE may be enhanced to support time synchronization request and response message parameters as defined in Table 9. These parameters may be used to exchange time information between a CSE and its Registrants. This time information may be used to synchronize the local time references of a CSE and its registrants. The detailed oneM2M based procedures for these disclosed parameters are captured below.

Figure 30:
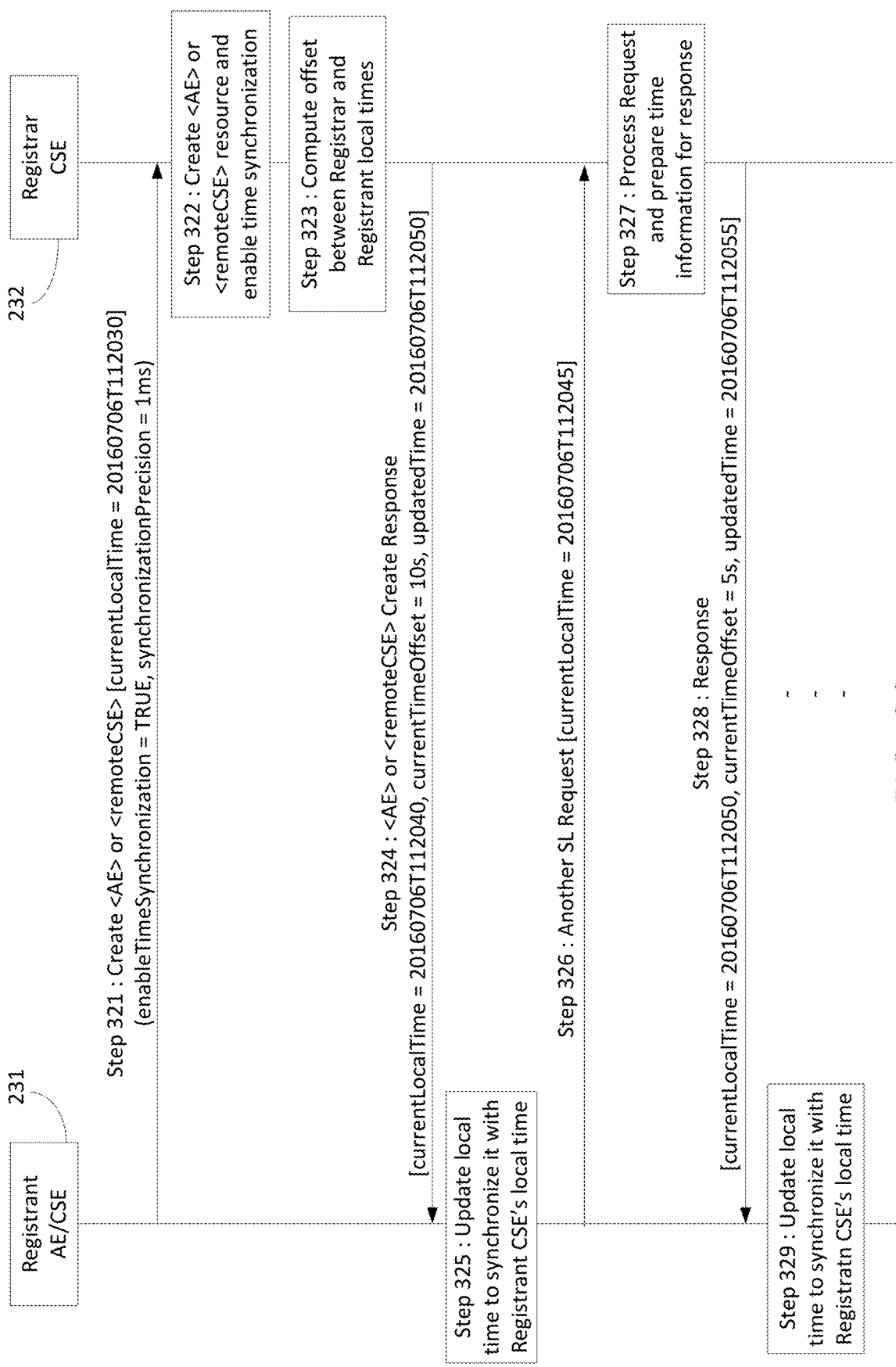
FIG. 30 illustrates use of SL time synchronization message parameters.

FIG. 30 illustrates an exemplary method that uses SL time synchronization message parameters. At step 321, registrant 231 registers to registrar 232 (e.g., CSE) by issuing a CREATE request for an <AE> or <remoteCSE> resource. Within this request, registrant 231 includes time synchronization parameters to configure registrar 232 to enable time synchronization processing as well as pass local time information of registrant 231 to registrar 232. The types of time synchronization parameters may include currentLocalTime, enableTimeSyncrhonization and synchronizationPrecision as defined herein. At step 322, registrar 232 creates the <AE> or <remoteCSE> resource and enables time synchronization functionality in registrar 232. At step 323, registrar 232 then determines the time offset between itself and registrant 231 by comparing the currentLocalTime information in the request to its own local time. At step 324, registrar 232 generates a response. In the response, registrar 232 includes time synchronization parameters which registrant 231 may use to synchronize its local time to the local time of registrar 232. The time parameters may include the currentLocalTime set the CSE's local time, the currentTimeOffset configured with the determined offset from step 323, or the updatedTime configured with a time value which registrar 232 would like (requests) registrant 231 to update its time with.

With continued reference to FIG. 30, at step 325, registrant 231 receives and processes the response by synchronizing its local time to the time of registrar 232 using the time synchronization parameters in the response. At step 326, registrant 231 sends a subsequent SL request to registrar 232 sometime later. In this request, registrant 231 may include time synchronization parameters such as its updated currentLocalTime value. At step 327, registrar 232 receives the new SL request of step 326. Registrar 232 processes it in the same manner as step 323. At step 328, registrar 232 sends out a response in the same manner as step 324. At step 329, registrant 231 receives and processes the response and processes it in the same manner as step 325.

A oneM2M CSE may be enhanced to perform time correction functionality on behalf of one its registrants. This correction may be performed by a CSE when it detects a lack of synchronization between itself and one of its registrants that exceeds a specified threshold. A CSE may use timing information that a registrant publishes within SL message parameters or that registrants publish to its corresponding currentLocalTime attribute. A CSE may use this information to calculate the amount of offset between its local time and the local time of the registrant. Based on this offset, a CSE may then correct or compensate for the offset by making adjustments to timing information contained within SL resources or SL messages created by the registrant. In doing so, a registrant's messages and resources may be synchronized to the local time of the CSE without burdening the registrant with having to maintain synchronization with the CSE. Further detailed oneM2M based procedures for these disclosed parameters are disclosed below.

Figure 31:
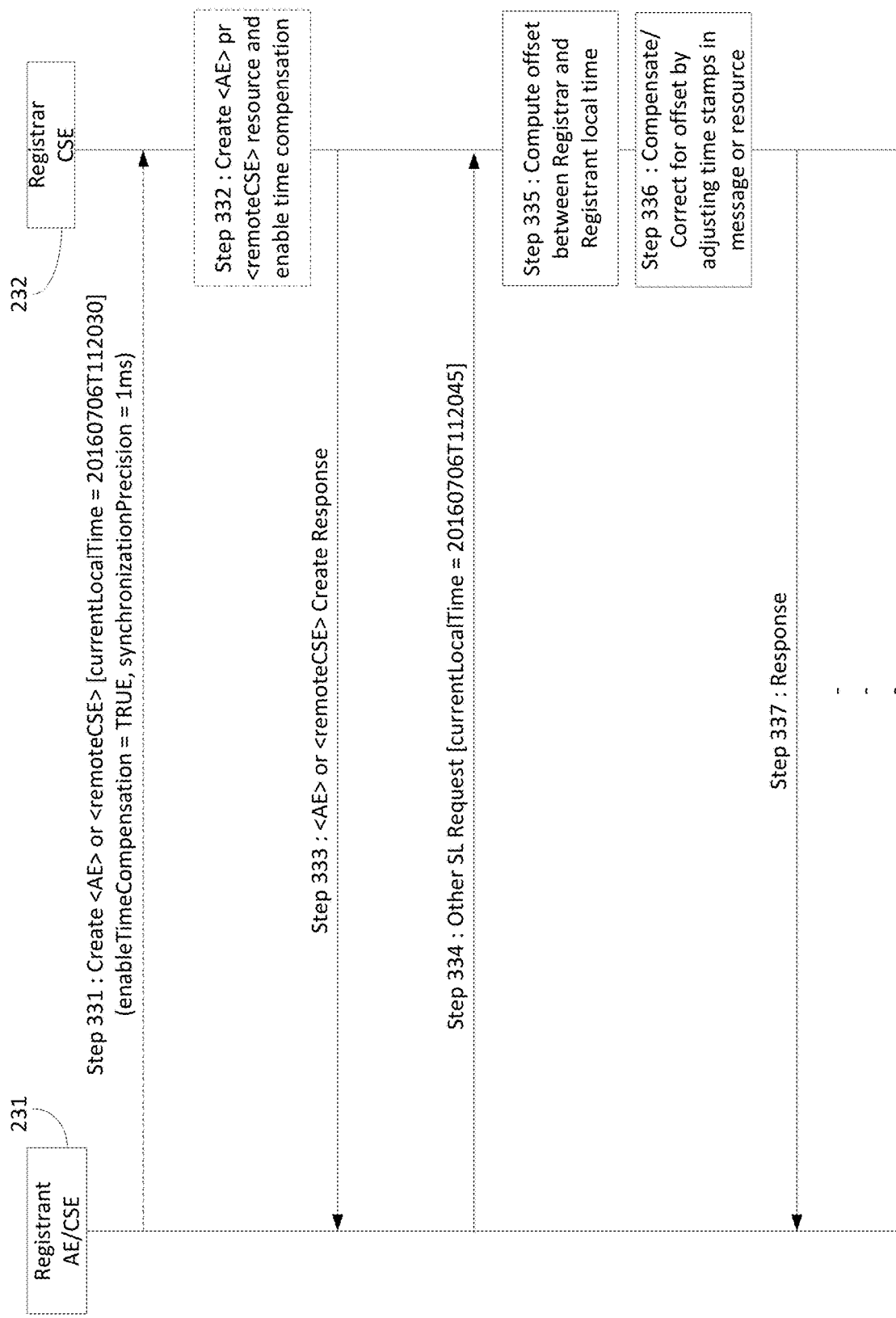
FIG. 31 illustrates CSE registrant time correction/compensation by CSE procedure.

FIG. 31 illustrates an exemplary method for time correction or compensation by a CSE. At step 331, registrant 231 registers to registrar 232 (e.g., a CSE) by issuing a CREATE request for an <AE> or <remoteCSE> resource. Within this request, registrant 231 includes time synchronization parameters to configure registrar 232 to enable time synchronization processing as well as pass local time information of registrant 231 to registrar 232. The types of time synchronization parameters may include currentLocalTime, enableTimeSyncrhonization and synchronizationPrecision as defined herein. At step 332, registrar 232 creates the <AE> or <remoteCSE> resource and enables time synchronization functionality in the CSE. At step 333, registrar 232 generates a response. At step 334, registrant 231 sends a subsequent SL request to registrar 232 sometime later. In this request, registrant 231 may include time synchronization parameters such as its updated currentLocalTime value.

With continued reference to FIG. 31, at step 335, registrar 232 then determines the time offset between itself and registrant 231 by comparing the currentLocalTime information in the request to its own local time. At step 336, registrar 232 then performs correction to the incoming request by adjusting any time stamp related metadata or data in the request by the determined offset. In effect, the incoming request is synchronized to the local time of registrar 232. At step 337, registrar 232 sends out a response. Metadata may be considered "data [information] that provides information about other data." Distinct types of metadata may include structural metadata or descriptive metadata. Structural metadata is data about the containers of data. Descriptive metadata may be used for discovery and identification, as information to search and locate an object (e.g., to locate application data/content).

As part of its time synchronization functionality, a oneM2M CSE or AE may support network latency determination. This network latency may be factored into the determination of the offset in times between a CSE and its registrants. An example of a oneM2M based procedures for network latency determination is disclosed below.

Figure 32:
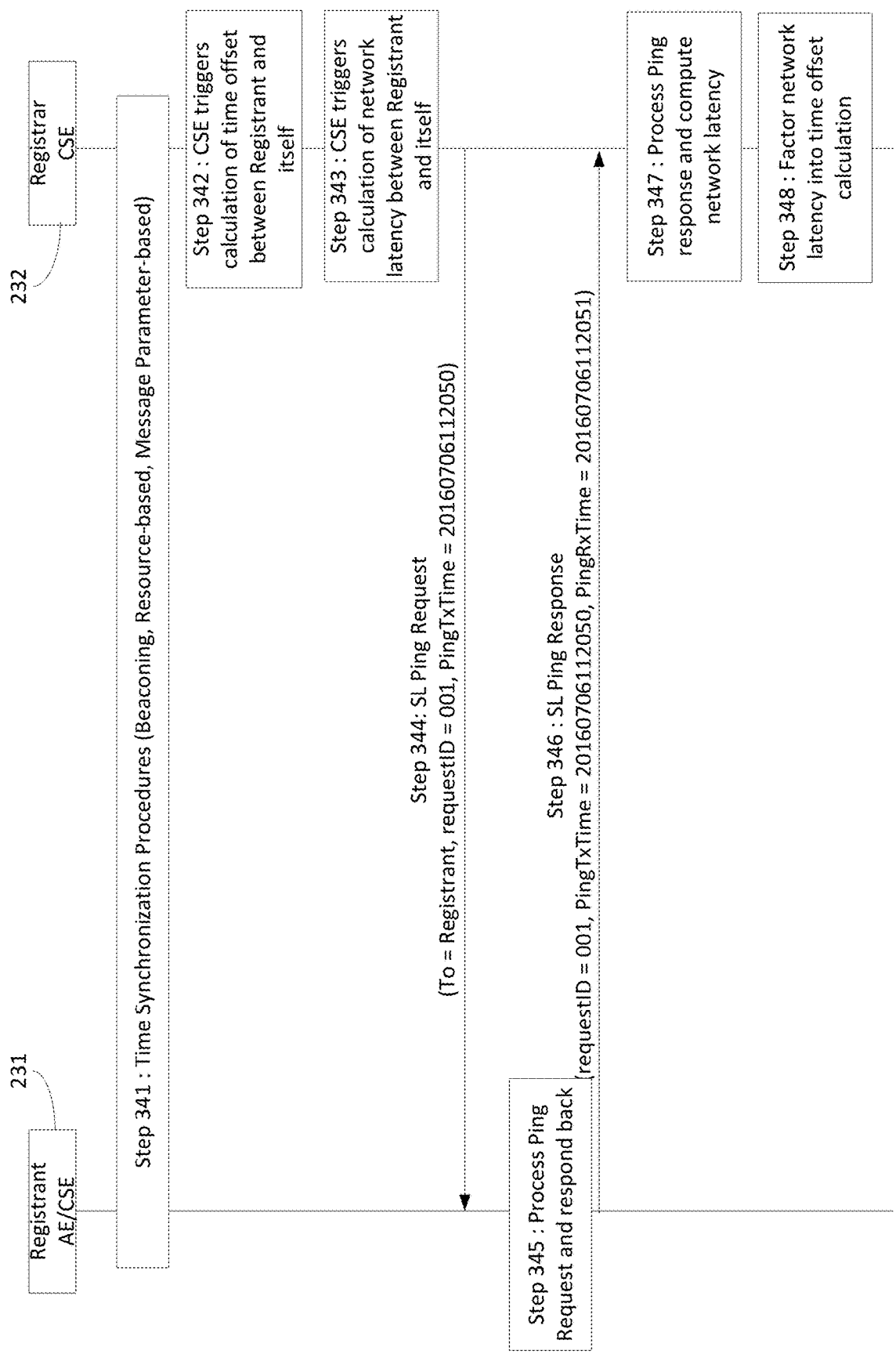
FIG. 32 illustrates CSE network latency determination procedure.

FIG. 32 illustrates an exemplary method for CSE network latency determination. At step 341, SL time synchronization procedures are performed such as the beacon-based, resource-based, or message parameter procedures disclosed herein. At step 342, per the beacon-based, resource-based, or message parameter procedures disclosed herein, whenever registrar 232 triggers the calculation of time offset to be performed between itself and one of its registrants registrar 232 may also trigger network latency calculation to be performed. At step 343, registrar 232 triggers network latency processing to be performed. At step 344, registrar 232 generates a SL Ping request. The request is targeted to registrant 231. The request includes the local time of registrar 232 stored in the PingTxTime parameter and request identifier configured in the requestID parameter. At step 345, registrant 231 receives and processes the ping request by echoing back the PingTxTime and requestID parameters. It also inserts a PingRxTime parameter and configures it with the local time of registrant 231 when it receives the ping request. At step 346, registrant 231 sends the ping response to registrar 232. At step 347, registrar 232 receives the ping response. Registrar 232 compares the time it received the ping response against the time it sent the ping request (which is contained in the ping response). From these two values, the CSE may determine a round trip network latency between itself and registrant 231. At step 348, registrar 232 may also determine the local time of registrant 231 by checking the PingRxTime. It may use this time coupled with the network latency to determine the offset between its local time and the local time of registrant 231.

Figure 33:
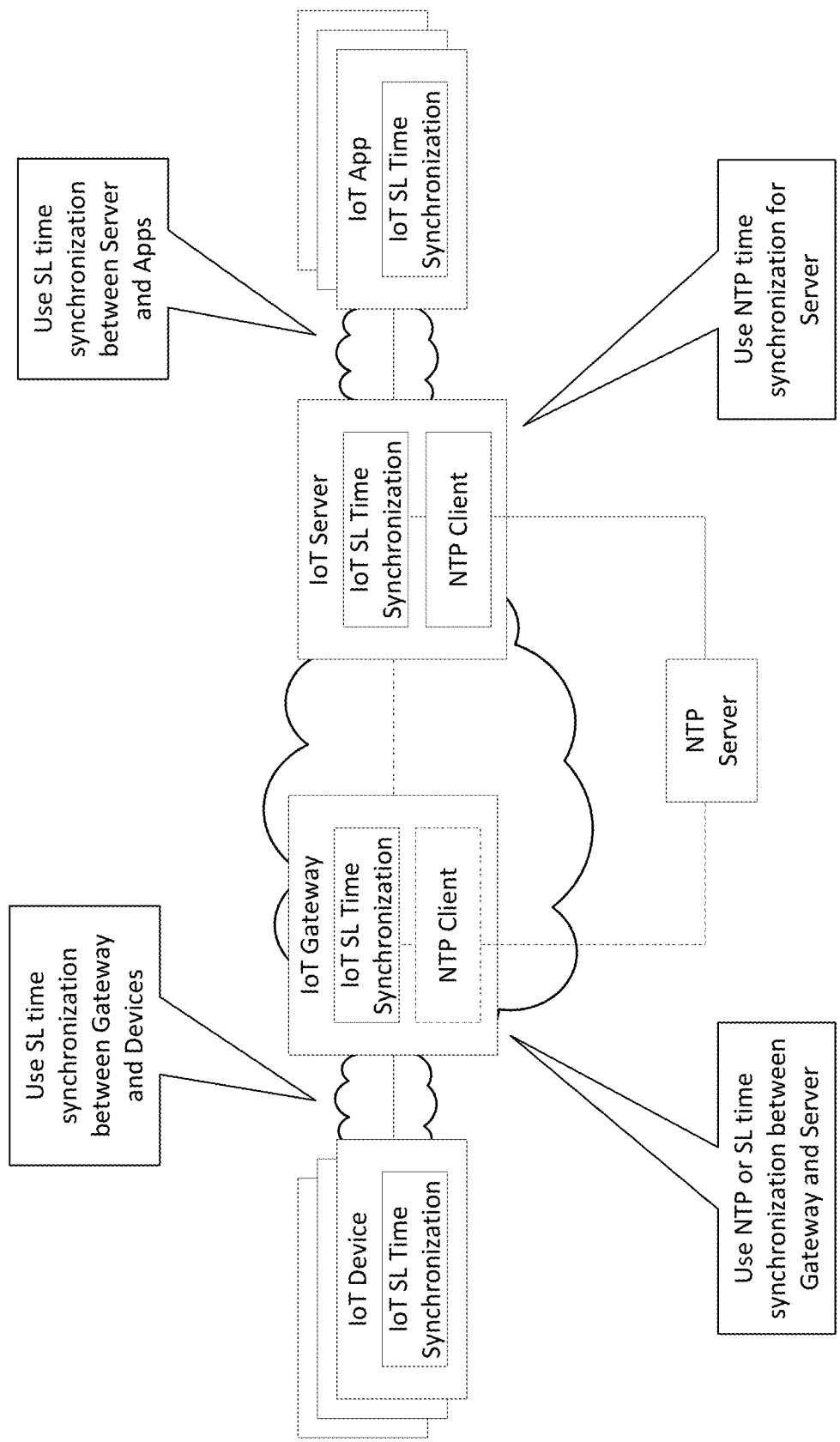
FIG. 33 illustrates NTP and SL Time Synchronization Deployment example.

Disclosed herein is SL time synchronization functionality deployed into a network that may also use NTP for time synchronization. As shown in FIG. 33, the example discloses using SL time synchronization functionality as a lighter weight option over NTP in portions of the deployed network and NTP in others. To synchronize the time of the IoT Server with the other servers in the general Internet or Web, the example discloses the use of NTP. To synchronize the time between the IoT gateway and IoT server, the example discloses using NTP or SL time synchronization functionality. To synchronize the time between the IoT devices and IoT gateway, the example discloses using SL time synchronization functionality. Similarly between the IoT Apps and IoT Server, the example disclosing using SL time synchronization functionality.

Without in any way unduly limiting the scope, interpretation, or application of the claims appearing herein, a technical effect of one or more of the examples disclosed herein is to provide adjustments to how time may be synchronized. One technical effect is that the IoT SL time synchronization mechanisms disclosed herein may be tightly integrated into IoT Service Layers and offered to IoT devices and applications together as part of other services. This may eliminate the need for dedicated time synchronization client and server functionality (e.g., NTP clients and servers) deployed in IoT applications, devices, gateways, and servers which may eliminate costly overhead and simplify deployments. In doing so, time synchronization may take place over the same SL interfaces that regular IoT SL messaging and communication occurs over. Another technical effect is that IoT SL time synchronization mechanisms disclosed herein may offer additional capabilities that existing time synchronization technologies cannot since the disclosed time synchronization mechanisms may take place higher in the protocol stack where more context and information is available. This enables IoT SL time synchronization mechanisms such as compensating and correcting for synchronization issues which may offload functionality and help minimize complexity for resource constrained IoT devices. Another technical effect is IoT SL time synchronization mechanisms may be lighter weight and more customizable for use in IoT deployments, which often have a diverse set of devices and applications with different time synchronization capabilities and preferences.

Figure 34:
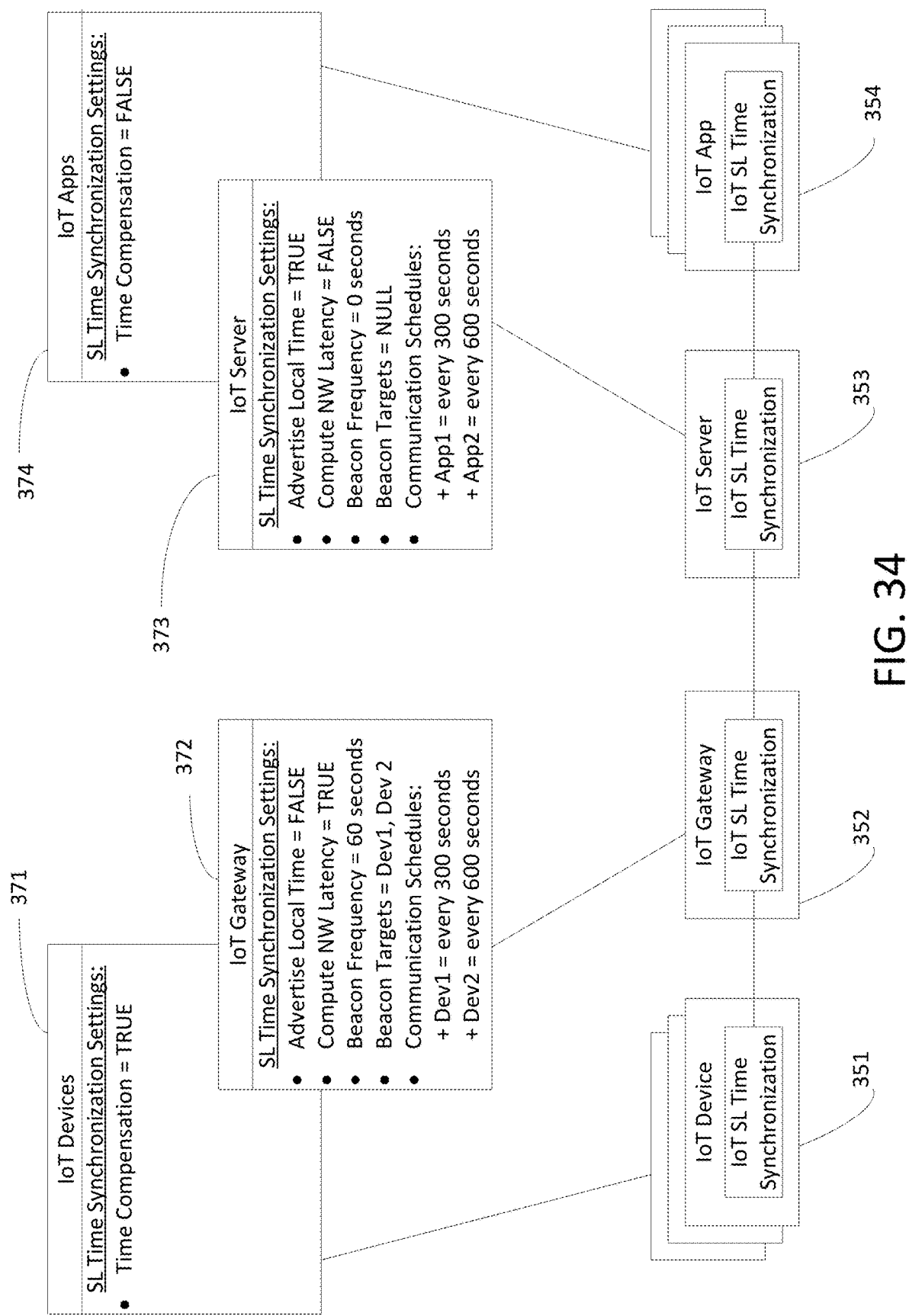
FIG. 34 illustrates User Interface for SL Time Synchronization Configuration.
Figure 35:
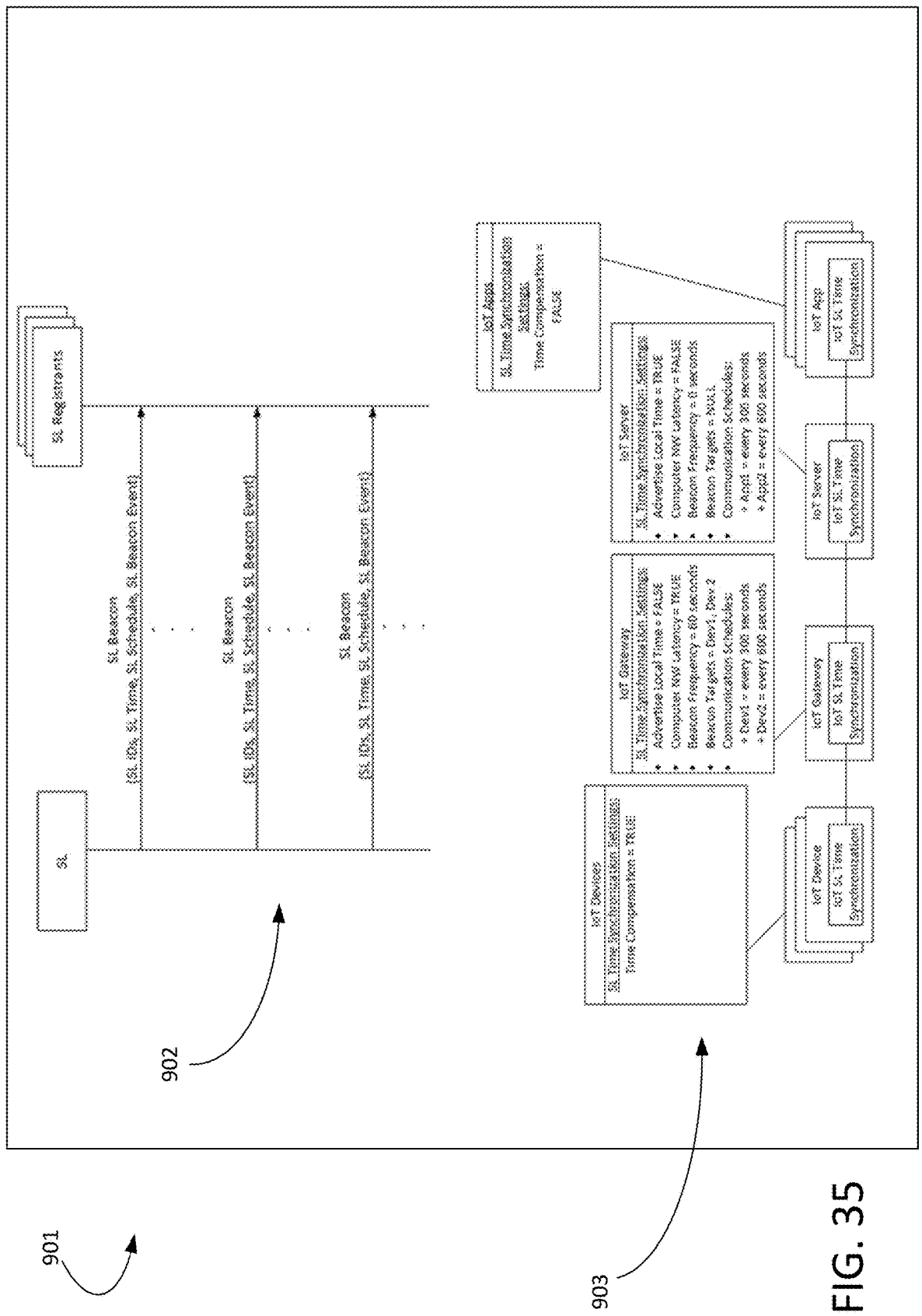
FIG. 35 illustrates an exemplary display (e.g., graphical user interface) that may be generated based on the methods and systems of SL time synchronization as discussed herein.

A user interface may be implemented for configuring or programming SL Time Synchronization Configuration Parameters within devices, gateways, servers and applications as shown in FIG. 34. Block 371, block 372, block 373, and block 374 may display setting that reside respective system elements IoT device 351, IoT gateway 352, IoT server 353, or IoT App 354. This use interface may be used to configure parameters such as the following:

SL beaconing functionality such as SL beacon policies that control SL beacon interval/frequency at which the SL issues beacons to the network devices and applications, the targeted devices and applications which beacons are sent to, the communication schedules for devices and applications included in SL beacons SL time advertisement functionality SL Network Latency determination and compensation SL Time correction functionality FIG. 35 illustrates an exemplary display (e.g., graphical user interface) that may be generated based on the methods and systems discussed herein. Display interface 901 (e.g., touch screen display) may provide text in block 902 associated with SL time synchronization, such as the parameters of Table 1 through Table 9. In another example, progress of any of the steps (e.g., sent messages or success of steps) discussed herein may be displayed in block 902. In addition, graphical output 903 may be displayed on display interface 901. Graphical output 903 may be the topology of the devices in a SL time synchronization, a graphical output of the progress of any method or systems discussed herein, or the like.

Figure 36A:
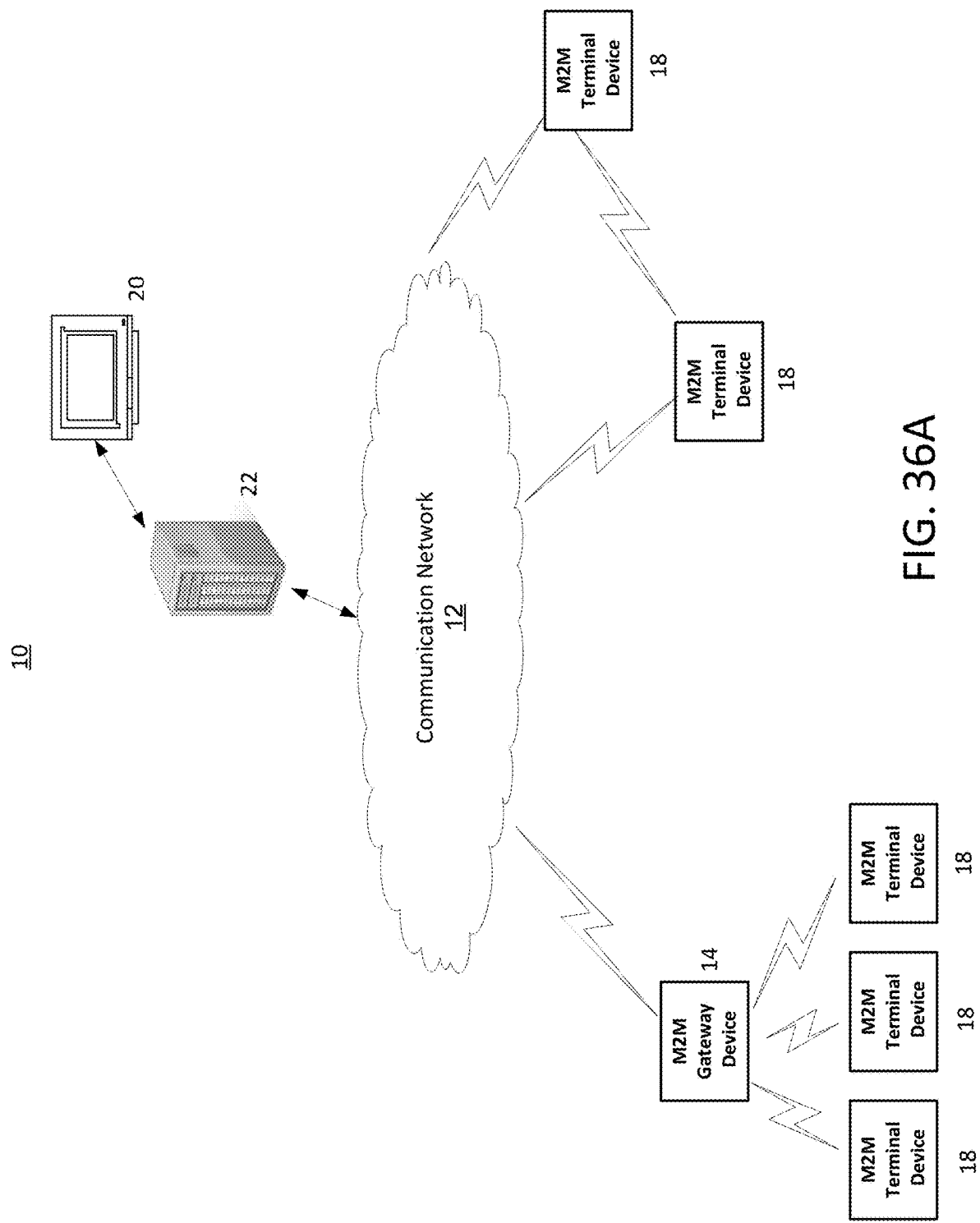
FIG. 36A illustrates an exemplary machine-to-machine (M2M) or Internet of Things (IoT) communication system in which the disclosed subject matter may be implemented.

FIG. 36A is a diagram of an example machine-to machine (M2M), Internet of Things (IoT), or Web of Things (WoT) communication system 10 in which one or more disclosed concepts associated with SL time synchronization may be implemented (e.g., FIG. 6-FIG. 35 and accompanying discussion). Generally, M2M technologies provide building blocks for the IoT/WoT, and any M2M device, M2M gateway or M2M service platform may be a component of the IoT/WoT as well as an IoT/WoT service layer, etc.

As shown in FIG. 36A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 36A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g., cellular and non-cellular) as well as fixed network M2M devices (e.g., PLC) to communicate through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Figure 36B:
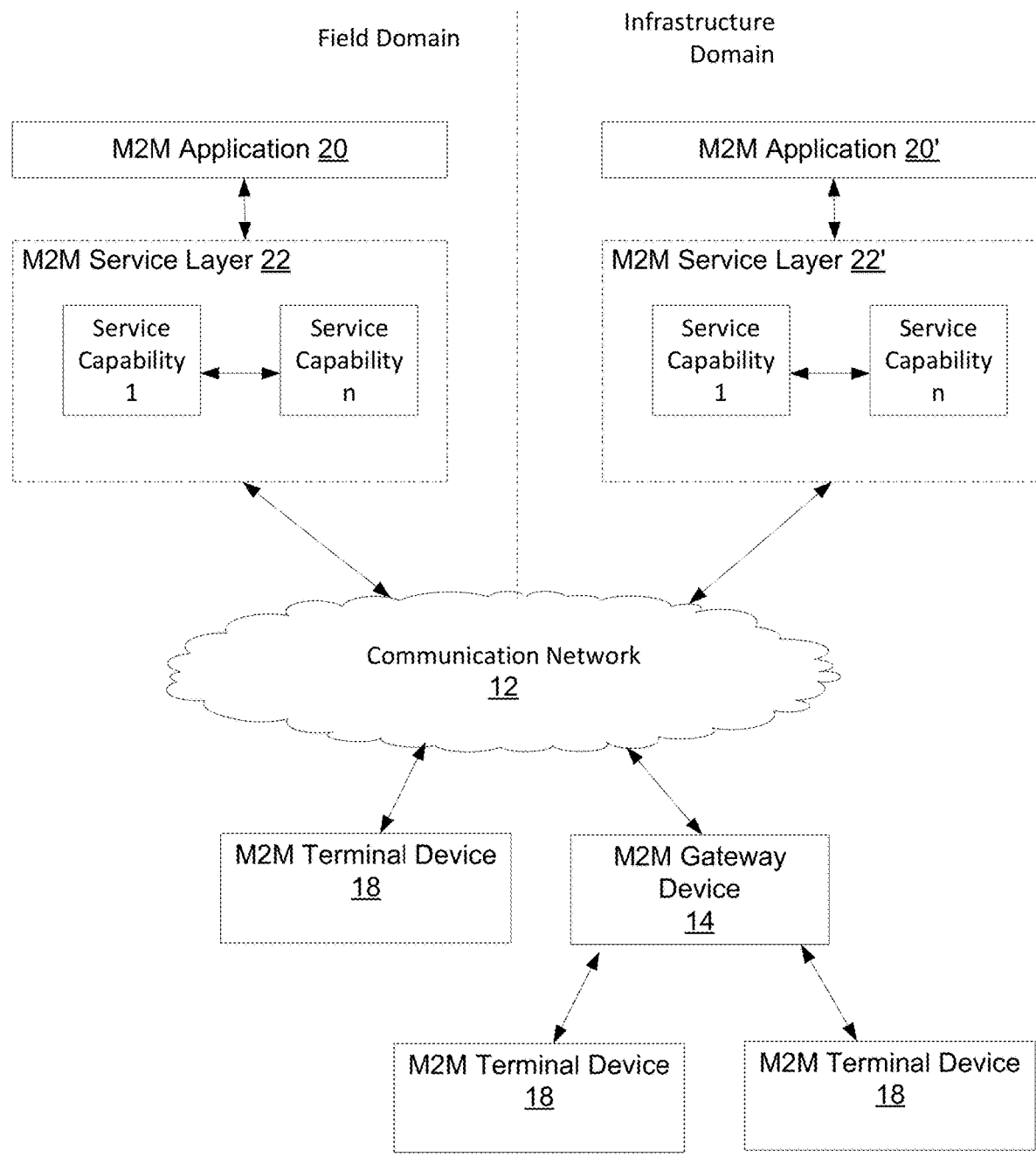
FIG. 36B illustrates an exemplary architecture that may be used within the M2M/IoT communications system illustrated in FIG. 36A.

Referring to FIG. 36B, the illustrated M2M service layer 22 (e.g., a CSE or SL 121 as described herein) in the field domain provides services for the M2M application 20 (e.g., registrant 231 or SL registrant 122), M2M gateway devices 14, and M2M terminal devices 18, and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring also to FIG. 36B, the M2M service layer 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some examples, M2M applications 20 and 20' may include desired applications that communicate using beacons or other SL time synchronization components, as discussed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

The SL time synchronization as disclosed herein of the present application may be implemented as part of a service layer. The service layer is a middleware layer that supports value-added service capabilities through a set of application programming interfaces (APIs) and underlying networking interfaces. An M2M entity (e.g., an M2M functional entity such as a device, gateway, or service/platform that is implemented on hardware) may provide an application or service. Both ETSI M2M and oneM2M use a service layer that may include the SL time synchronization as disclosed herein of the present application. The oneM2M service layer supports a set of Common Service Functions (CSFs) (i.e., service capabilities). An instantiation of a set of one or more particular types of CSFs is referred to as a Common Services Entity (CSE), which may be hosted on different types of network nodes (e.g., infrastructure node, middle node, application-specific node). Further, the SL time synchronization as disclosed herein of the present application may be implemented as part of an M2M network that uses a Service Oriented Architecture (SOA) or a resource-oriented architecture (ROA) to access services such as the SL time synchronization as disclosed herein of the present application.

As discussed herein, the service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer may provide applications r various devices with access to a collection of or a set of the above mentioned capabilities or functionalities, supported by the service layer, which may be referred to as a CSE or SCL. A few examples include but are not limited to security, charging, data management, device management, discovery, provisioning, and connectivity management which may be commonly used by various applications. These capabilities or functionalities are made available to such various applications via APIs which make use of message formats, resource structures and resource representations defined by the M2M service layer. The CSE or SCL is a functional entity that may be implemented by hardware or software and that provides (service) capabilities or functionalities exposed to various applications or devices (i.e., functional interfaces between such functional entities) in order for them to use such capabilities or functionalities.

Figure 36C:
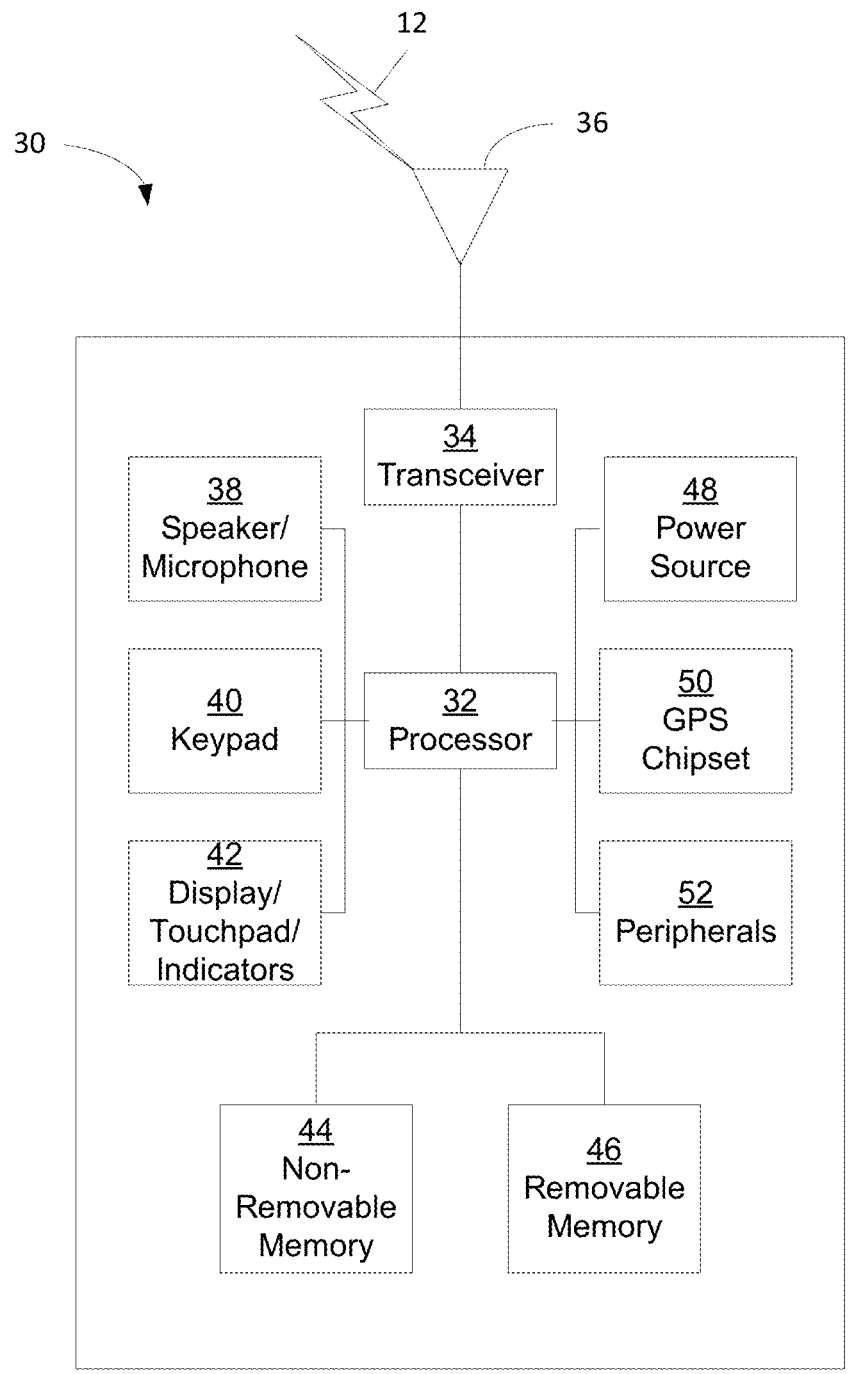
FIG. 36C illustrates an exemplary M2M/IoT terminal or gateway device that may be used within the communications system illustrated in FIG. 36A.

FIG. 36C is a system diagram of an example M2M device 30, such as an M2M terminal device 18 (which may include SL registrant 122 or medical device 115) or an M2M gateway device 14 (which may include one or more components of FIG. 6), for example. As shown in FIG. 36C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with the disclosed subject matter. M2M device 30 (e.g., medical device 115, registrant 231, IoT Device 351, SL 121, registrant 231, and others) may be an exemplary implementation that performs the disclosed systems and methods for SL time synchronization as disclosed herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, or any other functionality that enables the M2M device 30 to operate in a wireless environment. The processor 32 may be coupled to the transceiver 34, which may be coupled to the transmit/receive element 36. While FIG. 36C depicts the processor 32 and the transceiver 34 as separate components, it will be appreciated that the processor 32 and the transceiver 34 may be integrated together in an electronic package or chip. The processor 32 may perform application-layer programs (e.g., browsers) or radio access-layer (RAN) programs or communications. The processor 32 may perform security operations such as authentication, security key agreement, or cryptographic operations, such as at the access-layer or application layer for example.

The transmit/receive element 36 may be configured to transmit signals to, or receive signals from, an M2M service platform 22. For example, the transmit/receive element 36 may be an antenna configured to transmit or receive RF signals. The transmit/receive element 36 may support various networks and air interfaces, such as WLAN, WPAN, cellular, and the like. In an example, the transmit/receive element 36 may be an emitter/detector configured to transmit or receive IR, UV, or visible light signals, for example. In yet another example, the transmit/receive element 36 may be configured to transmit and receive both RF and light signals. It will be appreciated that the transmit/receive element 36 may be configured to transmit or receive any combination of wireless or wired signals.

In addition, although the transmit/receive element 36 is depicted in FIG. 36C as a single element, the M2M device 30 may include any number of transmit/receive elements 36. More specifically, the M2M device 30 may employ MIMO technology. Thus, in an example, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital memory card, and the like. In other examples, the processor 32 may access information from, and store data in, memory that is not physically located on the M2M device 30, such as on a server or a home computer. The processor 32 may be configured to control lighting patterns, images, or colors on the display or indicators 42 in response to whether the SL time synchronization in some of the examples described herein are successful or unsuccessful, or otherwise indicate a status of SL time synchronization and associated components. The control lighting patterns, images, or colors on the display or indicators 42 may be reflective of the status of any of the method flows or components in the FIG.'s illustrated or discussed herein (e.g., FIG. 6-FIG. 35, etc). Disclosed herein are messages and procedures of SL time synchronization. The messages and procedures may be extended to provide interface/API for users to request SL time synchronization-related resources via an input source (e.g., speaker/microphone 38, keypad 40, or display/touchpad 42) and request, configure, or query SL time synchronization associated with components, among other things that may be displayed on display 42.

The processor 32 may receive power from the power source 48, and may be configured to distribute or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with information disclosed herein.

The processor 32 may further be coupled to other peripherals 52, which may include one or more software or hardware modules that provide additional features, functionality or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The transmit/receive elements 36 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The transmit/receive elements 36 may connect to other components, modules, or systems of such apparatuses or devices via one or more interconnect interfaces, such as an interconnect interface that may comprise one of the peripherals 52.

Figure 36D:
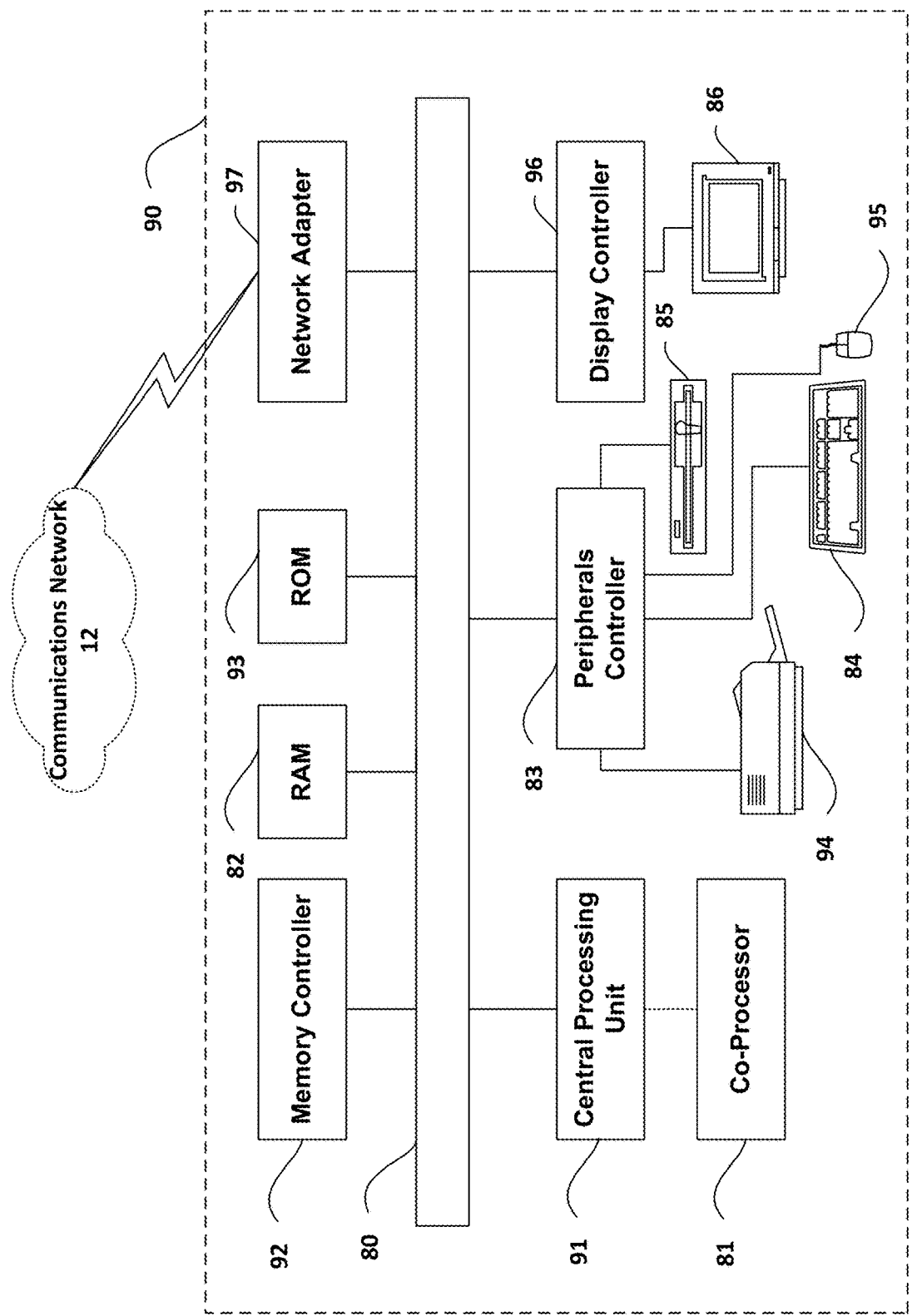
FIG. 36D illustrates an exemplary computing system in which aspects of the communication system of FIG. 36A may be embodied.

FIG. 36D is a block diagram of an exemplary computing system 90 on which, for example, the M2M service platform 22 of FIG. 36A and FIG. 36B may be implemented. Computing system 90 (e.g., M2M terminal device 18 or M2M gateway device 14) may comprise a computer or server and may be controlled primarily by computer readable instructions by whatever means such instructions are stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 or coprocessor 81 may receive, generate, and process data related to the disclosed systems and methods for SL time synchronization, such as sending SL beacons.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally include stored data that cannot easily be modified. Data stored in RAM 82 may be read or changed by CPU 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may include peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may include network adaptor 97 that may be used to connect computing system 90 to an external communications network, such as network 12 of FIG. 36A and FIG. 36B.

It is understood that any or all of the systems, methods and processes described herein may be embodied in the form of computer executable instructions (e.g., program code) stored on a computer-readable storage medium which instructions, when executed by a machine, such as a computer, server, M2M terminal device, M2M gateway device, or the like, perform or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals per se. As evident from the herein description, storage media should be construed to be statutory subject matter. Computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which may be used to store the desired information and which may be accessed by a computer. A computer-readable storage medium may have a computer program stored thereon, the computer program may be loadable into a data-processing unit and adapted to cause the data-processing unit to execute method steps when the computer program is run by the data-processing unit.

In describing preferred methods, systems, or apparatuses of the subject matter of the present disclosure—SL time synchronization—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. Although a SPARQL request or the like is mentioned throughout the disclosure it is contemplated herein that an associated RESTful operation may be used.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for means for time synchronization. A method, system, computer readable storage medium, or apparatus has means for sending a first service layer request, the first service layer request may include parameters associated with time correction; and responsive to sending the first service layer request, receiving a service layer response may include an adjusted time parameter of the one or more of the parameters associated with time correction. The method, system, computer readable storage medium, or apparatus has means for determining an offset based on the precision. The method, system, computer readable storage medium, or apparatus has means for determining an offset based on the precision; and based on the determined offset, determining whether to perform time correction. The method, system, computer readable storage medium, or apparatus has means for determining an offset based on the precision; based on the determined offset, determining to perform time correction; and responsive to determining to perform time correction, performing time correction on service layer metadata in the first service layer request. The method, system, computer readable storage medium, or apparatus has means for determining an offset based on the precision; based on the determined offset, determining to perform time correction; and responsive to determining to perform time correction, performing time correction on: 1) service layer metadata in the first service layer request, and time related information contained in content of the first service layer request. The method, system, computer readable storage medium, or apparatus has means for responsive to receiving the first service layer response, sending a second service layer request, the second service layer request may include current local time at the time of the second service layer request. The method, system, computer readable storage medium, or apparatus has means for receiving a second service layer response may include an offset for adjusting time for an application. The method, system, computer readable storage medium, or apparatus has means for responsive to sending the second service layer request, receiving a second service layer response may include an offset for adjusting time for an apparatus. The parameters associated with time correction include an indication to enable SL time correction. The parameters associated with time correction include an indication to enable SL time correction. The request is a request for registration with a service layer. The second service layer request further may include an expiration time of the second service layer request. The second service layer request further may include an expiration time of content of the second service layer request. The adjusted time parameter is for application. The adjusted time parameter is for an apparatus. The apparatus may include a mobile device. The apparatus may include an IoT device. The method, system, computer readable storage medium, or apparatus has means for receiving a time-stamp that was applied to the data or the calculated offset between the time in the request and the applied timestamp. The method, system, computer readable storage medium, or apparatus has means for receiving a response that includes an indication that contents of the first service layer request were time-corrected or time-stamped. The method, system, computer readable storage medium, or apparatus has means for receiving a first service layer request from a service layer endpoint, the first service layer request including data of an application and a time based parameter corresponding with the data of an application; based on the first service layer request, determining a synchronization offset; and adjusting time based parameters for the data of the application based on the determined synchronization offset. All combinations in this paragraph (including the removal or addition of steps) are contemplated in a manner that is consistent with the other portions of the detailed description.

What is claimed:

1. An apparatus hosting a first entity, the apparatus comprising:
a processor; and
a memory coupled with the processor, the memory comprising executable instructions that when executed by the processor cause the processor to effectuate operations comprising:
transmitting a service layer request to a service layer, the service layer request comprising data of an application and a time-based parameter corresponding with a local time of the first entity;
receiving, from the service layer in response to the service layer request, a service layer response with a time offset between the service layer and the first entity, wherein the time offset is determined based on the time-based parameter; and
adjusting the local time of the first entity by the time offset defined in the service layer response.

2. The apparatus of claim 1, wherein the time-based parameter further indicates time correction comprises an indication to enable service layer time correction.

3. The apparatus of claim 1, wherein the time-based parameter further indicates time correction comprises an indication of precision for service layer time correction.

4. The apparatus of claim 1, wherein the service layer request is a request for registration with a service layer of the apparatus.

5. The apparatus of claim 1, further operations comprising receiving a time-stamp applied to the data or the calculated offset between the time in the request and the applied timestamp.

6. The apparatus of claim 1, wherein the apparatus comprises a mobile device.

7. A method for a first entity, the apparatus comprising:
transmitting a service layer request to a service layer, the service layer request comprising data of an application and a time-based parameter corresponding with a local time of the first entity;
receiving, from the service layer in response to the service layer request, a service layer response with a time offset between the service layer and the first entity, wherein the time offset is determined based on the time-based parameter; and
adjusting the local time of the first entity by the time offset defined in the service layer response.

8. The method of claim 7, wherein the time-based parameter further indicates time correction comprises an indication to enable service layer time correction.

9. The method of claim 7, wherein the time-based parameter further indicates time correction comprises an indication of precision for service layer time correction.

10. The method of claim 7, wherein the service layer request is a request for registration with a service layer of the apparatus.

11. The method of claim 7, further operations comprising receiving a time-stamp applied to the data or the calculated offset between the time in the request and the applied timestamp.

12. A system, the system comprising: one or more processors; and
a memory coupled with the one or more processors, the memory comprising executable instructions that when executed by the one or more processors cause the processor to effectuate operations comprising:
receiving a service layer request from a service layer, the service layer request comprising data of an application and a time-based parameter corresponding with a local time of a first entity; and
sending, from the service layer in response to the service layer request, a service layer response with a time offset between the service layer and the first entity, wherein the time offset is determined based on the time-based parameter,
wherein the local time of the first entity is adjusted by the time offset defined in the service layer response.

13. The system of claim 12, wherein the time-based parameter further indicates time correction comprises an indication to enable service layer time correction.

14. The system of claim 12, wherein the time-based parameter further indicates time correction comprises an indication of precision for service layer time correction.

15. The system of claim 12, wherein the service layer request is a request for registration with a service layer of the apparatus.

16. The system of claim 12, further operations comprising sending a time-stamp applied to the data or the calculated offset between the time in the request and the applied timestamp.

17. The system of claim 12, wherein one or more of the operations of the system are executed by a mobile device.

18. The system of claim 12, wherein one or more of the operations of the system are executed by a server.

* * * * *